US012297056B2

(12) United States Patent
Lewis et al.

(10) Patent No.: US 12,297,056 B2
(45) Date of Patent: May 13, 2025

(54) CONSTRUCTION ELEMENTS AND MAINTENANCE METHODS FOR COMPRESSED AIR ENERGY STORAGE SYSTEMS

(71) Applicant: Hydrostor Inc., Toronto (CA)

(72) Inventors: Cameron Lewis, Toronto (CA); Davin Young, Toronto (CA); Lucas Thexton, Toronto (CA); Josh Burtney, Sudbury (CA)

(73) Assignee: Hydrostor Inc., Toronto (CA)

( * ) Notice: Subject to any disclaimer, the term of this patent is extended or adjusted under 35 U.S.C. 154(b) by 655 days.

(21) Appl. No.: 17/055,949

(22) PCT Filed: May 17, 2019

(86) PCT No.: PCT/CA2019/050679
§ 371 (c)(1),
(2) Date: Nov. 16, 2020

(87) PCT Pub. No.: WO2019/218084
PCT Pub. Date: Nov. 21, 2019

(65) Prior Publication Data
US 2021/0207586 A1    Jul. 8, 2021

Related U.S. Application Data

(60) Provisional application No. 62/672,785, filed on May 17, 2018.

(51) Int. Cl.
B65G 5/00        (2006.01)
F02C 6/16        (2006.01)
(Continued)

(52) U.S. Cl.
CPC ............. *B65G 5/00* (2013.01); *F02C 6/16* (2013.01); *F03D 9/17* (2016.05); *F04B 41/02* (2013.01); *F17C 1/007* (2013.01); *F17C 5/06* (2013.01)

(58) Field of Classification Search
CPC ..... B65G 5/00; F02C 6/16; F03D 9/17; F04B 41/02; F17C 1/007; F17C 5/06
See application file for complete search history.

(56) References Cited

U.S. PATENT DOCUMENTS 1,382,569 A    6/1921   Godfrey
2,749,714 A    6/1956   Hunter
(Continued)

FOREIGN PATENT DOCUMENTS

AU    2006233241    5/2007
CA    1073223       3/1980
(Continued)

OTHER PUBLICATIONS

Office Action dated Jan. 5, 2022 for Japanese Application No. 2019-562449.
(Continued)

*Primary Examiner* — Jonathan R Matthias
(74) *Attorney, Agent, or Firm* — Young Basile Hanlon & MacFarlane, P.C.

(57) ABSTRACT

A method of transitioning a hydrostatically compensated compressed air energy storage system from an operating mode to a dewatered maintenance state may include a) charging an accumulator to a fully charged state where the air water interface is at a charge plane by conveying compressed air at a storage pressure into the layer of compressed air using a gas compressor/expander subsystem thereby displacing a corresponding amount of compensation liquid from the layer of compensation liquid out of the accumulator
(Continued)

into the compensation liquid flow path and from the compensation liquid flow path into the compensation liquid reservoir until the accumulator is substantially free of the compensation liquid, b) fluidly sealing the compensation liquid flow path thereby isolating a residual amount of the compensation liquid, and c) depressurizing the accumulator interior to a service pressure that is lower than the storage pressure.

11 Claims, 25 Drawing Sheets

(51) Int. Cl.
*F03D 9/17* (2016.01)
*F04B 41/02* (2006.01)
*F17C 1/00* (2006.01)
*F17C 5/06* (2006.01)

(56) References Cited

U.S. PATENT DOCUMENTS

| | | | |
|---|---|---|---|
| 3,019,854 A | 2/1962 | Waitus | |
| 3,643,426 A | 2/1972 | Janelid | |
| 3,895,493 A | 7/1975 | Rigollot | |
| 3,939,356 A | 2/1976 | Loane | |
| 3,988,897 A | 11/1976 | Strub | |
| 3,996,741 A | 12/1976 | Herberg | |
| 4,085,971 A | 4/1978 | Jacoby | |
| 4,147,204 A | 4/1979 | Pfenninger | |
| 4,150,547 A | 4/1979 | Hobson | |
| 4,343,569 A | 8/1982 | Schwarzenbach | |
| 4,355,923 A * | 10/1982 | Schwarzenbach | F02C 6/16 405/59 |
| 4,391,552 A | 7/1983 | O'hara | |
| 4,392,354 A | 7/1983 | Schwarzenbach | |
| 4,399,656 A | 8/1983 | Laing | |
| 4,403,477 A * | 9/1983 | Schwarzenbach | F02C 6/16 60/659 |
| 4,450,547 A | 5/1984 | Nakamura et al. | |
| 4,454,721 A | 6/1984 | Hurlimann | |
| 4,523,432 A | 6/1985 | Frutschi | |
| 4,538,414 A | 9/1985 | Saleh | |
| 4,727,930 A | 3/1988 | Bruckner | |
| 5,634,340 A | 6/1997 | Grennan | |
| 6,167,951 B1 | 1/2001 | Couch | |
| 6,185,841 B1 | 2/2001 | Conochie | |
| 6,467,535 B1 | 10/2002 | Shembekar | |
| 6,637,977 B2 | 10/2003 | Hayashi | |
| 6,739,522 B2 | 5/2004 | Laumen | |
| 7,663,255 B2 | 2/2010 | Kim | |
| 7,755,212 B2 | 7/2010 | Enis et al. | |
| 8,136,354 B2 | 3/2012 | Havel | |
| 8,277,145 B2 | 10/2012 | Dickinson, III et al. | |
| 8,663,255 B2 | 3/2014 | Torain et al. | |
| 8,739,522 B2 | 6/2014 | Anikhindi | |
| 9,045,209 B2 | 6/2015 | Zeren et al. | |
| 9,322,296 B2 | 4/2016 | Hugo et al. | |
| 9,383,105 B2 | 7/2016 | Naeve | |
| 9,404,512 B2 | 8/2016 | Ulrich | |
| 9,422,948 B2 | 8/2016 | Kim et al. | |
| 9,433,910 B2 | 9/2016 | Wyttenbach | |
| 9,739,536 B2 | 8/2017 | Erben | |
| 9,777,965 B2 | 10/2017 | Chordia | |
| 9,803,603 B2 | 10/2017 | Ganser | |
| 9,803,803 B1 | 10/2017 | Adams | |
| 10,859,207 B2 | 12/2020 | Lewis | |
| 11,274,792 B2 | 3/2022 | Stradiotto | |
| 11,519,393 B2 | 12/2022 | Lewis | |
| 11,591,957 B2 | 2/2023 | Howitt | |
| 11,644,150 B2 | 5/2023 | Stradiotto | |
| 11,767,950 B2 | 9/2023 | Lewis et al. | |
| 11,821,584 B2 | 11/2023 | Stradiotto | |
| 11,835,023 B2 | 12/2023 | Young | |
| 2003/0021631 A1 | 1/2003 | Hayashi et al. |
| 2005/0004416 A1 | 1/2005 | Okutsu |
| 2008/0000233 A1 | 1/2008 | Althaus |
| 2010/0218500 A1 | 9/2010 | Ruer |
| 2010/0248500 A1 | 9/2010 | Ting et al. |
| 2011/0094212 A1 | 4/2011 | Ast |
| 2011/0094229 A1 | 4/2011 | Freund et al. |
| 2011/0094231 A1 | 4/2011 | Freund |
| 2011/0094242 A1 | 4/2011 | Koerner |
| 2011/0100010 A1 | 5/2011 | Freund et al. |
| 2011/0296823 A1 | 12/2011 | McBride |
| 2012/0057998 A1 | 3/2012 | Ingersoll |
| 2012/0067047 A1 | 3/2012 | Peterson |
| 2012/0102954 A1 | 5/2012 | Ingersoll |
| 2012/0174569 A1 | 7/2012 | Ingersoll |
| 2012/0297776 A1 | 11/2012 | Bollinger |
| 2013/0061591 A1 | 3/2013 | Bove |
| 2014/0013735 A1 | 1/2014 | McBride et al. |
| 2014/0020369 A1 | 1/2014 | Guidati |
| 2015/0000248 A1 | 1/2015 | Del Omo |
| 2015/0015210 A1 | 1/2015 | Bradwell |
| 2015/0091301 A1 | 4/2015 | Littmann |
| 2015/0114611 A1 | 4/2015 | Morris |
| 2015/0125210 A1 | 5/2015 | Ingersoll |
| 2015/0267612 A1 | 9/2015 | Bannari |
| 2016/0032783 A1 | 2/2016 | Howes |
| 2016/0231072 A1 | 8/2016 | Pohlman |
| 2017/0013867 A1 | 1/2017 | Kelleher et al. |
| 2017/0138674 A1 | 5/2017 | Pourima |
| 2017/0159503 A1 | 6/2017 | Plais |
| 2017/0350658 A1 | 12/2017 | Kerth |
| 2018/0017213 A1 | 1/2018 | Deleau |
| 2018/0094581 A1 | 4/2018 | Teixeira |
| 2018/0179916 A1 | 6/2018 | Larochelle |
| 2018/0313270 A1 | 11/2018 | Jones |
| 2019/0011593 A1 | 1/2019 | Marsala et al. |
| 2019/0346082 A1 | 11/2019 | Lewis |
| 2020/0103178 A1 | 4/2020 | Gerstler |
| 2021/0207586 A1 | 7/2021 | Lewis et al. |
| 2021/0207771 A1 | 7/2021 | Lewis |
| 2021/0388809 A1 | 12/2021 | Young |
| 2021/0388810 A1 | 12/2021 | Young |
| 2022/0090585 A1 | 3/2022 | Lewis |
| 2022/0196341 A1 | 6/2022 | Young |
| 2023/0110494 A1 | 4/2023 | Cameron |
| 2023/0332843 A1 | 10/2023 | Lewis |
| 2024/0035621 A1 | 2/2024 | Stradiotto |
| 2024/0191725 A1 | 6/2024 | Young |
| 2024/0218885 A1 | 7/2024 | Young |

FOREIGN PATENT DOCUMENTS

| | | |
|---|---|---|
| CA | 1160063 A | 1/1984 |
| CA | 1179511 | 12/1984 |
| CA | 1281611 C | 3/1991 |
| CA | 2785004 A1 | 6/2011 |
| CA | 2807502 A1 | 2/2012 |
| CA | 2824798 A1 | 7/2012 |
| CA | 2982255 A1 | 10/2016 |
| CA | 3052080 A1 | 8/2018 |
| CA | 3055620 A1 | 9/2018 |
| CN | 103206349 A | 7/2013 |
| CN | 205422944 U | 8/2016 |
| CN | 107842392 A | 3/2018 |
| CN | 207847852 U | 9/2018 |
| DE | 2636417 A1 | 2/1978 |
| DE | 102010055750 A1 | 6/2012 |
| EP | 0566868 A1 | 2/1996 |
| EP | 1443177 A1 | 8/2004 |
| EP | 2450549 A2 | 5/2012 |
| EP | 2549090 | 1/2013 |
| EP | 2559881 A2 | 2/2013 |
| EP | 2530283 B1 | 9/2013 |
| EP | 2832666 A1 | 2/2015 |
| EP | 2447501 A2 | 5/2021 |
| FR | 2706432 A1 | 12/1994 |
| FR | 3023321 | 1/2016 |
| FR | 3019854 A1 | 10/2016 |
| GB | 1213112 A | 11/1970 |

(56) References Cited

FOREIGN PATENT DOCUMENTS

| | | |
|---|---|---|
| GB | 2013318 A | 8/1979 |
| GB | 2528449 A | 1/2016 |
| JP | S54133211 A | 10/1979 |
| JP | 55-115498 | 8/1980 |
| JP | S5797997 A | 6/1982 |
| JP | H0275730 A | 3/1990 |
| JP | H04121424 A | 4/1992 |
| JP | H05214888 A | 8/1993 |
| JP | H07330079 A | 12/1995 |
| JP | H09154244 A | 6/1997 |
| JP | 2636417 B2 | 7/1997 |
| JP | H09287156 A | 11/1997 |
| JP | H1121926 | 1/1999 |
| JP | 2005009609 A | 1/2005 |
| JP | 2013509528 A | 3/2013 |
| JP | 2016211515 A | 12/2016 |
| WO | 1998039613 | 9/1998 |
| WO | 2011053411 A1 | 5/2011 |
| WO | 2012097216 | 7/2012 |
| WO | 2013131202 A1 | 9/2013 |
| WO | 2014183894 | 11/2014 |
| WO | 2015015184 A2 | 2/2015 |
| WO | 2015019096 A1 | 2/2015 |
| WO | 2015159278 | 10/2015 |
| WO | 2016012764 A1 | 1/2016 |
| WO | 2016131502 A1 | 8/2016 |
| WO | 2016185906 A1 | 11/2016 |
| WO | 2017093768 A1 | 6/2017 |
| WO | 2017140481 A1 | 8/2017 |
| WO | 2017194253 A1 | 11/2017 |
| WO | 2017198397 A1 | 11/2017 |
| WO | 2018141057 A1 | 8/2018 |
| WO | 2018161172 | 9/2018 |
| WO | 2019011593 A1 | 1/2019 |
| WO | 2019218084 | 11/2019 |
| WO | 2019218085 | 11/2019 |
| WO | 2020146938 | 7/2020 |
| WO | 2020160635 | 8/2020 |
| WO | 2020160670 | 8/2020 |
| WO | 2020160681 | 8/2020 |
| WO | 2020172748 | 9/2020 |
| WO | 2022213179 | 10/2022 |
| WO | 2022226656 | 11/2022 |
| WO | 2024130447 | 6/2024 |

OTHER PUBLICATIONS

European Search Report received for European Application No. 18747216.2 on Apr. 7, 2021, 17 pgs.
Office Action dated May 3, 2024, for Australian Application 2019268820.
Office Action (Notice of Allowance and Fees Due (PTOL-85)) dated May 14, 2024 for U.S. Appl. No. 17/055,948 (pp. 1-10).
Office Action dated Jun. 20, 2024 for U.S. Appl. No. 17/055,948 (pp. 1-10).
Wang, J. et al., Overview of Compressed Air Energy Storage and Technology Development; Energies; 2017; 10, 991; 22 pages; http://wrap.warwick.ac.uk/91858/7/WRAP-overview-compressed-air-energy-storage-technology-Jevelopment-Wang-2017.pdf.
RWE Power AG: Essen/Koln, "ADELE—Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.
Sequi, P.M. "Modelling of the Dynamic Behavior of an Advanced Adiabatic Compressed Air Energy Storage (AA-CAES)", Nov. 2018; 154 pages with Translation; http://oa.upm.es/53802/1/TFG_PABLO_MARTIN_SEQUI.pdf.
Office Action (Non-Final Rejection) dated Apr. 15, 2024 for U.S. Appl. No. 18/237,021 (pp. 1-11).
Office Action (Non-Final Rejection) dated Jun. 20, 2024 for U.S. Appl. No. 18/377,933 (pp. 1-9).
Supplemental Search Report issued for European Application No. 19803698.0, mailed Feb. 8, 2022.
Examination Report issued for European Application No. 19803698.0, mailed Apr. 26, 2024.
International Search Report and Written Opiniont Received for PCT/CA2019/050680, mailed Jul. 8, 2019.
Laubscher, Hendrik et al. "Developing a cost effective rock bed thermal energy storage system: Design and modelling", article published Jun. 27, 2017.
Jorio, Luigi, "A huge battery made of air" online article published Aug. 10, 2016, available at https://www.swissinfo.ch/eng/sci-tech/energy-in-the-mountains_a-huge-battery-made-of-air/42362400.
European Search Report issued for European Appliaction No. 19914559.0, mailed Nov. 9, 2022.
European Search Reported issued for European Appliation No. 20753221.9, mailed Sep. 29, 2022.
International Search Report and Written Opinion received for PCT Serial No. PCT/CA2019/050700 on Sep. 27, 2019, 9 pgs.
Office Action (Final Rejection) dated Jan. 25, 2024 for U.S. Appl. No. 17/429,146 (pp. 1-18).
International Search Report for PCT/CA2020/050169, mailed Apr. 15, 2020.
Office Action (Non-final) issued for U.S. Appl. No. 17/429,155, mailed Dec. 12, 2023.
"Shell and Tube Heat Exchangers" article available online from Thermopedia as of Feb. 8, 2011, available at https://www.thermopedia.com/content/1121/.
"Coil-Wound Heat Exchangers (CWHEs)" publication from Linde Engineering, copyright 2018-2019, available online at https://assets.linde.com/-/media/global/engineering/engineering/home/products-and-services/plant-components/plate-fin-heat-exchangers/coil-wound-heat-exchanger-2019.pdf.
European Search Report issued for European Application No. 20740789.1, mailed Sep. 27, 2022.
International Search Report and Written Opinion received for PCT Serial No. PCT/CA2020/050032 dated Mar. 27, 2020, 10 pgs.
Office Action (Final Rejection) dated Feb. 16, 2024 for U.S. Appl. No. 17/974,363 (pp. 1-6).
Office Action (Notice of Allowance and Fees Due (PTOL-85)) dated Jun. 24, 2024 for U.S. Appl. No. 17/974,363 (pp. 1-8).
International Search Report and Written Opinion received for PCT/CA2020/050153 on Apr. 24, 2020,11 pgs.
Office Action (Final Rejection) dated Apr. 5, 2024 for U.S. Appl. No. 17/422,616 (pp. 1-9).
International Search Report and Written Opinion received for PCT Serial No. PCT/CA2020/050246 dated May 27, 2020, 10 pgs.
International Search Report for PCT/CA2022/050656, mailed Jul. 21, 2022.
International Preliminary Report on Patentability for PCT/CA2022/050656, mailed Oct. 23, 2023.
International Preliminary Report on Patentability issued on PCT/CA2022/050503 on Oct. 10, 2023.
International Search Report and Written Opinion for PCT/CA2023/051761 mailed Feb. 19, 2024.
International Preliminary Report on Patentability issued on PCT/CA2018/050112 mailed May 21, 2019 (26 pages).
International Preliminary Report on Patentability issued on PCT/CA2018/050282 mailed Sep. 10, 2019.
International Preliminary Report on Patentability issued on PCT/CA2019/050679 mailed Jul. 10, 2019.
International Preliminary Report on Patentability issued on PCT/CA2019/050680 mailed on Nov. 17, 2020.

* cited by examiner

CONSTRUCTION ELEMENTS AND MAINTENANCE METHODS FOR COMPRESSED AIR ENERGY STORAGE SYSTEMS

CROSS-REFERENCE TO RELATED APPLICATIONS

This application claims priority to U.S. Provisional Patent Application Ser. No. 62/672,785, filed May 17, 2018 and entitled A Hydrostatically Compressed Gas Energy Storage System, the entirety of this application being incorporated by reference herein.

FIELD

The present disclosure relates generally to compressed gas energy storage, and more particularly to a compressed gas energy storage system such as, for example, one including a hydrostatically compensated, substantially isobaric compressed air energy storage accumulator located underground, the use thereof, as well as a method of storing compressed gas.

INTRODUCTION

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus, there exists a need for effectively storing the electrical energy produced on a power grid or from a renewable source during a non-peak period and providing it to the grid upon demand. Furthermore, to the extent that the infrastructural preparation costs and the environmental impact from implementing such infrastructure are minimized, the utility and desirability of a given solution is enhanced.

Furthermore, as grids transform and operators look to storage in addition to renewables to provide power and replace traditional forms of generation that also provide grid stability such as voltage support, a storage method that offers inertia based synchronous storage is highly desirable.

SUMMARY

In accordance with one broad aspect of the teachings described herein, a hydrostatically compensated compressed air energy storage system may include an accumulator disposed underground and having a lower wall, an opposing upper wall and a sidewall extending therebetween cooperating to at least partially bound an accumulator interior for having a layer of compressed air above a layer of compensation liquid. A compensation liquid reservoir spaced apart from the accumulator and may be in fluid communication with the layer of compensation liquid within the accumulator via a compensation liquid flow path containing a compensation shaft whereby compensation liquid can flow between the accumulator and the compensation liquid reservoir when in use. An overcharge buffer apparatus disposed underground and may be in the compensation liquid flow path between a lower end of the compensation shaft and the accumulator interior to inhibit a flow of air from the layer of compressed air to the compensation shaft, the overcharge buffer apparatus may have a lower flow portion that may be positioned below the lower wall of the accumulator by at least a buffer height, and a transition portion extending upwardly from an overcharge plane between the lower flow portion and a charge plane which defines an interface between the transition portion and the accumulator interior and may have a buffer portion extending upwardly from the overcharge plane by the buffer height. A gas compressor/expander subsystem may be in fluid communication with the accumulator interior via an air flow path. The system being operable may be in a charging mode in which the gas compressor/expander subsystem coveys compressed air at a storage pressure into the layer of compressed air within the accumulator which displaces a corresponding amount of compensation liquid from the layer of compensation liquid out of the accumulator via the overcharge buffer apparatus thereby maintaining the layer of compressed air at substantially the storage pressure during the charging mode. The system being operable may also be in a discharging mode in which air from the layer of compressed air exits the accumulator and drives the gas compressor/expander subsystem and a corresponding amount of compensation liquid flows through the overcharge buffer apparatus and could be reintroduced introduced into the layer of compensation liquid within the accumulator thereby maintaining the layer of compressed air at substantially the storage pressure during the discharging mode. The system being operable may also be in a storage mode in which there is no flow of the compressed air or compensation liquid and the layer of compressed air and the layer of compensation liquid are retained within the accumulator at substantially the storage pressure.

The buffer portion may be configured such that the hydrostatic pressure at the overcharge plane exerted by a column of the compensation liquid having a height equal to the buffer height is between about 2% and about 25% of the storage pressure (i.e. the overcharge pressure at the overcharge plane is between about 102% and 125% of the storage pressure).

The buffer height may be between about 5 m and about 100 m.

The buffer height is between about 10 m and about 20 m.

The compensation shaft may extend between an upper end proximate the surface of the ground and the lower end and may have a shaft height and wherein buffer height may be between about 2% and about 25% of a shaft height.

The system may be chargeable to a fully charged state where the air-liquid interface of the accumulator may be at the charge plane and in which at least 80% of the sidewall may be exposed above the layer of compensation liquid and the buffer portion may be filled with compensation liquid.

When the system is in the fully charged state where the air-liquid interface of the accumulator is at the charge plane and 100% of the sidewall may be exposed above the layer of compensation liquid and the accumulator interior may be essentially free of compensation liquid and the buffer portion may be filled with compensation liquid.

The overcharge plane may be spaced below the charge plane by the buffer depth and the buffer portion may include the entire transition portion.

The overcharge plane may be spaced below the charge plane by an offset distance that may be greater than the buffer depth.

A layer of a cover liquid may be provided on a upper surface of the layer compensation liquid within the accumulator thereby separating the layer of compressed air and the layer of compensation liquid, the cover liquid may have a substantially lower solubility of air than the compensation liquid thereby inhibiting mixing of the compensation liquid and the layer of compressed air.

The transition portion may have a transition height that is greater than the buffer height and may contain an auxiliary storage portion disposed between the buffer portion and the charge plane, and where the system may be configurable in the fully charged state where the air-cover liquid interface of the accumulator may be at the charge plane in which at least 80% of the sidewall of the accumulator may be exposed above the layer of cover liquid, the buffer portion may be filled with compensation liquid and the auxiliary storage portion contains at least 80% of the cover fluid.

The system may be in the fully charged state where the air-cover liquid interface of the accumulator may be at the charge plane the buffer portion is filled with compensation liquid and the auxiliary storage portion may contain substantially all of the cover fluid whereby the accumulator may be essentially free of both the compensation liquid and the cover liquid.

The compensation liquid flow path may contain a water port provided in at least one of the lower wall and the sidewall of the accumulator.

The water port may be provided in the lower wall of the accumulator and may extend generally perpendicular to the charge plane.

The water port may be provided at a low point of the accumulator.

The lower wall of the accumulator may be generally declined toward water port whereby the compensation liquid can flow toward the water port without being trapped by local low points of the accumulator floor.

The air flow path may contain an air port provided toward an upper portion of the accumulator.

The air port may be provided in at least one of the upper wall and the sidewall of the accumulator.

The air port may be at a high point of the upper wall of the accumulator.

The upper wall of the accumulator may be generally inclined toward air port such that all the air within the accumulator may be recoverable during discharging and cannot be trapped by a pocket bound by a portion of any of the accumulator walls and the compensation liquid.

The accumulator may include only a single air port in communication with the air flow path.

The lower wall of the accumulator may overlie at least a portion of the overcharge buffer apparatus.

The lower wall of the accumulator may overlie the lower flow portion.

The lower flow portion may be laterally offset from accumulator.

The system may further contain a thermal storage subsystem containing: at least a first storage reservoir which may be configured to contain a thermal storage liquid at a storage pressure that may be greater than atmospheric pressure; a thermal liquid passage which may have an inlet connectable to a thermal storage liquid source and which may be configured to convey the thermal storage liquid to the storage reservoir; and a first heat exchanger which may be provided in the thermal liquid passage and which may be in fluid communication between the first compression stage and the accumulator, whereby when the compressed gas energy storage system is in the charging mode thermal energy is transferred from a compressed gas stream exiting the gas compressor/expander subsystem to the thermal storage liquid.

The first thermal storage reservoir may be disposed at least partially underground.

The storage pressure may be between about 10 bar and about 60 bar.

The system may be configurable in at least three of: (a) a charged maintenance state, in which the accumulator interior may be at the storage pressure, at least 80% of the sidewall may be exposed above the layer of compensation liquid, the buffer portion may be filled with the compensation liquid and a temporary maintenance apparatus, suitable for operation in air at the storage pressure, may be insertable within the air-filled portion of the accumulator; (b) a discharged maintenance state, in which the accumulator interior may be at the storage pressure, at least 80% of the sidewall may be submerged within the layer of compensation liquid, the buffer portion may be filled with the compensation liquid and a temporary maintenance apparatus, suitable for operation in the compensation liquid at the storage pressure, may be insertable within the compensation liquid-filled portion of the accumulator; (c) a first dewatered maintenance state, in which the accumulator interior may be at a service pressure that is less than the storage pressure, at least 80% of the sidewall may be exposed above the layer of compensation liquid, the buffer portion may be filled with the compensation liquid and a temporary maintenance apparatus suitable for operation in air at the service pressure, may be insertable within the air-filled portion of the accumulator; and (d) a second dewatered maintenance state, in which the accumulator interior may be at a service pressure that is less than the storage pressure and may be substantially free of the compensation liquid, and a temporary maintenance apparatus suitable for operation in air at the service pressure, may be insertable within the air-filled portion of the accumulator.

States (c) and (d) may be configured to facilitate human entry in the accumulator whereas (c) may be configured to facilitate visual inspection or minor works requiring substantially hand held tools, and whereas (d) may be configured to facilitate major works requiring mining construction apparatuses The system may be operable to transition from either the charged maintenance state, the discharged maintenance state, or regular operation to the first dewatered maintenance state by following the steps of: first, charging the accumulator to at least a mostly fully charged state by conveying compressed air at the storage pressure into the layer of compressed air using the gas compressor/expander subsystem thereby displacing a corresponding amount of compensation liquid from the layer of compensation liquid out of the accumulator into the compensation liquid flow path and from the compensation liquid flow path into the compensation liquid reservoir until the accumulator is substantially free of the compensation liquid; second, fluidly sealing the compensation liquid flow path from the compensation liquid reservoir, thereby isolating a residual amount of the compensation liquid within the compensation liquid flow path; and third, depressurizing the accumulator interior to a service pressure that may be lower than the storage pressure whereby at least a portion of the residual amount of compensation liquid flows flow back from the compensation liquid flow path into the accumulator to partially fill the accumulator with a layer of compensation liquid at a partially drained height.

The system where prior to the second step the system may include the further step of further charging the accumulator to an overcharged state where the air liquid interface may be below the charge plane using the gas compressor/expander subsystem by conveying additional compressed air into the accumulator thereby displacing additional compensation liquid from the compensation liquid flow path into the compensation liquid reservoir until an interface between the layer of compensation liquid and the layer of compressed air may be within the buffer portion.

When the system is in the charged maintenance state the accumulator may be substantially free of the compensation liquid such that at least a portion of the lower wall is exposed.

The service pressure may be generally atmospheric pressure and may be generally suitable for human occupation.

When the system may is in one of the charged maintenance state, the first dewatered maintenance state and the second dewatered maintenance state the temporary maintenance apparatus may include an unmanned aerial vehicle (UAV) that may be operable to fly within the gas-filled portions of the accumulator.

The UAV may be insertable into the interior of the accumulator via the air flow path.

When the system is in one of the first dewatered maintenance state and the second dewatered maintenance state, the system may be configured to facilitate human entry in the accumulator.

When the system is in one of the discharged maintenance state and the first dewatered maintenance state the temporary maintenance apparatus may contain a submersible remote operated vehicle (ROV) that may be operable to travel through the compensation liquid filled portions of the accumulator.

The submersible ROV may be insertable into accumulator via the compensation liquid flow path.

When the system is in the discharged maintenance state the accumulator may be substantially filled with the compensation liquid such that at least a portion of the upper wall may be submerged.

When the system is in the second dewatered maintenance state the buffer portion may be free of the compensation liquid.

IN accordance with another broad aspect of the teachings described herein, a method of transitioning a hydrostatically compensated compressed air energy storage system from an operating mode to a dewatered maintenance state, in which the system may contain an accumulator which may have an accumulator interior for containing a layer of compressed air above a layer of compensation liquid, a compensation liquid reservoir spaced apart from the accumulator and may be in fluid communication with the layer of compensation liquid within the accumulator via a compensation liquid flow path which may contain a compensation shaft whereby compensation liquid can flow between the accumulator and the compensation liquid reservoir, a gas compressor/expander subsystem may be in fluid communication with the accumulator interior via an air flow path and the method may include the following steps: first, charging the accumulator to a fully charged state here the air water interface may be at the charge plane by conveying compressed air at a storage pressure into the layer of compressed air using the gas compressor/expander subsystem thereby displacing a corresponding amount of compensation liquid from the layer of compensation liquid out of the accumulator into the compensation liquid flow path and from the compensation liquid flow path into the compensation liquid reservoir until the accumulator may be substantially free of the compensation liquid; second, fluidly sealing the compensation liquid flow path from the compensation liquid reservoir, thereby isolating a residual amount of the compensation liquid within the compensation liquid flow path; and third, depressurizing the accumulator interior to a service pressure that may be lower than the storage pressure whereby at least a portion of the residual amount of compensation liquid flows flow back from the compensation liquid flow path into the accumulator to partially fill the accumulator with a layer of compensation liquid at a partially drained height.

Prior to the second step, the method may further contain further charging the accumulator to an overcharged state where the air-liquid interface may be below the charge plane using the gas compressor/expander subsystem by conveying additional compressed air into the accumulator thereby displacing additional compensation liquid from the compensation liquid flow path into the compensation liquid reservoir until an interface between the layer of compensation liquid and the layer of compressed air may be within the buffer portion.

In accordance with another broad aspect of the teachings described herein, a method of transitioning a hydrostatically compensated compressed air energy storage system from an operating mode to a dewatered maintenance state, in which the system may contain an accumulator which may have an accumulator interior for containing a layer of compressed air above a layer of compensation liquid, a compensation liquid reservoir spaced apart from the accumulator and may be in fluid communication with the layer of compensation liquid within the accumulator via a compensation liquid flow path which may contain a compensation shaft whereby compensation liquid can flow between the accumulator and the compensation liquid reservoir, a gas compressor/expander subsystem which may be in fluid communication with the accumulator interior via an air flow path and an overcharge buffer apparatus which may be disposed in the compensation liquid flow path between a lower end of the compensation shaft and the accumulator interior the overcharge buffer apparatus which may have a lower flow portion that may be positioned below the lower wall of the accumulator by at least a buffer height, and a transition portion which may extend upwardly from an overcharge plane defining an interface between the lower flow portion and the transition portion to a charge plane defining an interface between the transition portion and the accumulator interior and which may contain a buffer portion extending upwardly from the overcharge plane by the buffer height. The method may contain charging the accumulator to a fully charged state where the air liquid interface may be at the charge plane by conveying compressed air at a storage pressure into the layer of compressed air using the gas compressor/expander subsystem thereby displacing a corresponding amount of compensation liquid from the layer of compensation liquid out of the accumulator into the compensation liquid flow path and from the compensation liquid flow path into the compensation liquid reservoir until the accumulator may be substantially free of the compensation liquid. The method may also contain fluidly sealing the compensation liquid flow path from the compensation liquid reservoir, thereby isolating a residual amount of the compensation liquid within the compensation liquid flow path. The method may also contain depressurizing the accumulator interior to a service pressure that may be lower than the storage pressure whereby at least a portion of the residual amount of compensation liquid flows flow back from the compensation liquid flow path into the accumulator to partially fill the accumulator with a layer of compensation liquid at a partially drained height.

Prior to the second step, the method may further contain further charging the accumulator to an overcharged state where the air-liquid interface may be below the charge plane using the gas compressor/expander subsystem by conveying additional compressed air into the accumulator thereby displacing additional compensation liquid from the compensation liquid flow path into the compensation liquid reservoir until an interface between the layer of compensation liquid and the layer of compressed air is within the buffer portion.

The first step may be completed in less than 24-48 hours.

The third step may contain discharging the compressed air from the accumulator using the gas compressor/expander subsystem.

The service pressure may be generally atmospheric pressure.

The third step may contain providing communication between at least one of the accumulator and the compensation liquid flow path, and the atmosphere so that service pressure may be generally atmospheric pressure.

When the layer of compensation liquid is at the partially dewatered height at least 50% of the sidewall of the accumulator may be exposed above the layer of compensation liquid.

When the layer of compensation liquid is at the partially dewatered height at least 90% of the sidewall of the accumulator may be exposed above the layer of compensation liquid.

The method may further contain the step of pumping out at least a portion of the residual amount of compensation liquid from the system using a dewatering pumping apparatus to configure the system in a second dewatered service state in which at least the accumulator may be essentially free of the compensation liquid.

The method may further contain pumping out substantially all of the residual amount of compensation liquid from the system using the dewatering pumping apparatus whereby when the system is in the fully dewatered service state the accumulator and at least one of the buffer portion and the lower flow portion may be substantially free of the compensation liquid.

The step of pumping out at least a portion of the residual amount of compensation liquid from the system may be completed in a pumping time of between about 1 and about 30 days.

When the system is in the second dewatered service state the accumulator and each of the buffer portion and the lower flow portion may be substantially free of the compensation liquid.

The dewatering pumping apparatus may includes a pump that may be located above ground.

The dewatering pumping apparatus includes a pump that may be disposed within at least one of the accumulator, the overcharge buffer apparatus, and the compensation shaft.

When the system is in the second dewatered service state the overcharge buffer apparatus may be substantially free of the compensation liquid.

Pumping out at least a portion of the residual amount of compensation liquid from the system using a dewatering pumping apparatus may occur simultaneously with at least one of the second or third steps.

Pumping out at least a portion of the residual amount of compensation liquid from the system using a dewatering pumping apparatus may occur after the third step.

The method may further contain the step of inserting a temporary maintenance apparatus into the interior of the accumulator while the system is in the dewatered maintenance state.

The method may further contain performing a maintenance operation on an exposed portion of the accumulator side wall or upper wall using the temporary maintenance apparatus.

The method where the temporary maintenance apparatus may include at least one: of an unmanned aerial vehicle (UAV), conventional human operated tools/equipment, and a submersible remote operated vehicle (ROV) and may further contain maneuvering the at least one of the UAV the submersible ROV within the interior of the accumulator.

The method may further contain the step of removing the temporary maintenance apparatus from within the interior of the accumulator and then returning the system to the operating mode.

Prior to the first step operating the system in at least one operating mode selected from: a charging mode in which the gas compressor/expander subsystem may convey compressed air at a storage pressure into the layer of compressed air which may displace a corresponding amount of compensation liquid from the layer of compensation liquid out of the accumulator and through the overcharge buffer apparatus thereby maintaining the layer of compressed air at the storage pressure during the charging mode; a discharging mode in which air from the layer of compressed air may exit the accumulator and may drive the gas compressor/expander subsystem and a corresponding amount of compensation liquid flows through the overcharge buffer apparatus and may be re-introduced introduced into the layer of compensation liquid within the accumulator thereby maintaining the layer of compressed air at the storage pressure during the discharging mode; a storage mode in which there may be no flow of the compressed air or compensation liquid and the layer of compressed air and the layer of compensation liquid may be retained within the accumulator at the storage pressure.

The method may further contain prior to the first step configuring the system in at least one of: a charged maintenance state by maintaining the accumulator in the fully charged state and performing a maintenance operation within the accumulator; and a discharged maintenance state by discharging substantially all of the air from the accumulator using the gas compressor/expander subsystem whereby the accumulator interior may be at the storage pressure, at least 80% of the sidewall may be submerged within the layer of compensation liquid, the buffer portion may be filled with the compensation liquid and performing a maintenance operation within the accumulator.

DRAWINGS

The drawings included herewith are for illustrating various examples of articles, methods, and apparatuses of the teaching of the present specification and are not intended to limit the scope of what is taught in any way.

Figure 1:
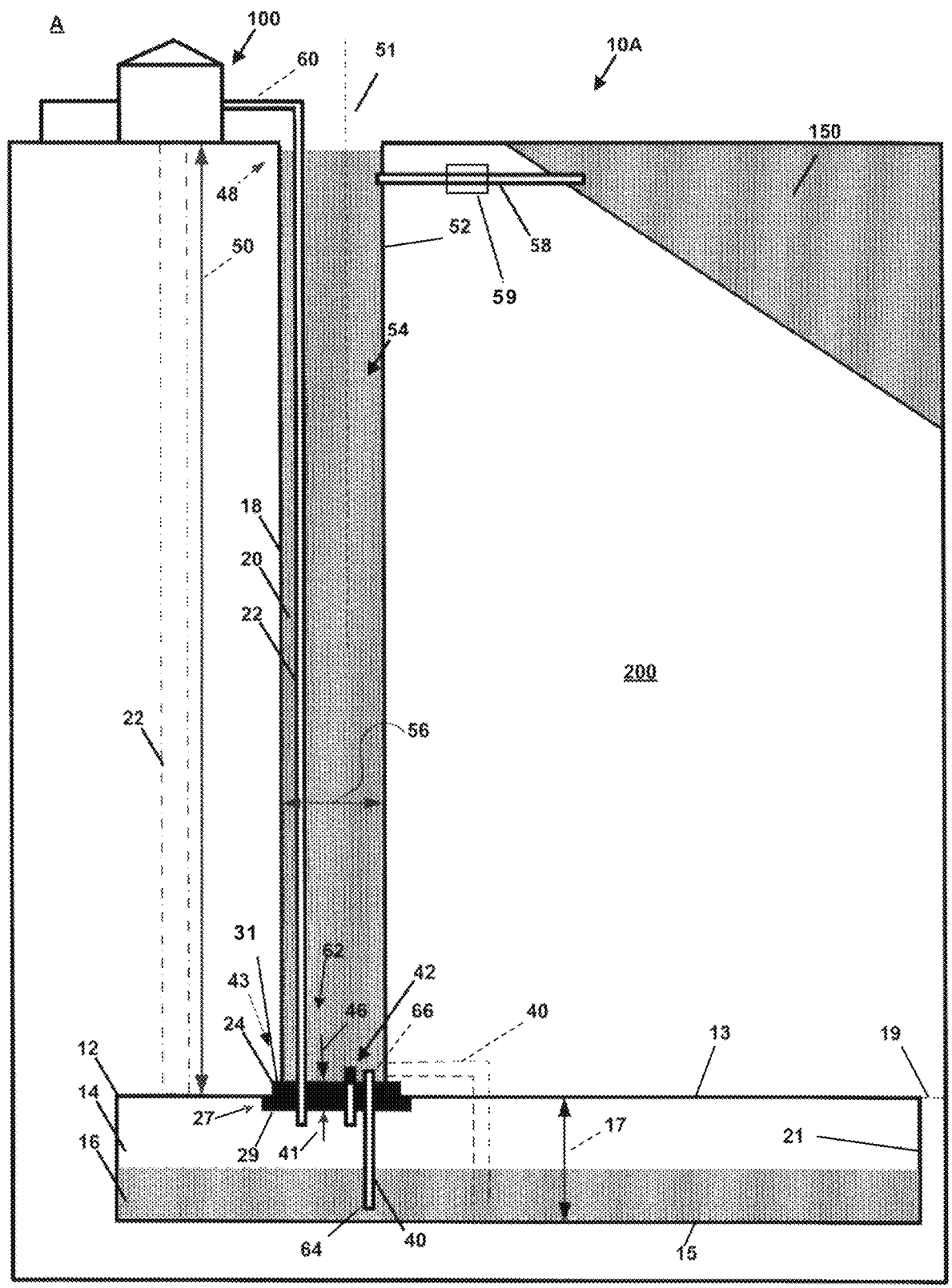
FIG. 1 is a schematic representation of one example of a hydrostatically compressed gas energy storage system.

Elements shown in the figures have not necessarily been drawn to scale. Further, where considered appropriate, reference numerals may be repeated among the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive at least one compressor and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive at least one suitable expander apparatus or the like, and ultimately to be used to drive at least one generator or the like to produce electricity. The amount of energy that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

Referring to FIG. 1 one example of a hydrostatically compensated compressed gas energy storage system 10A, that can be used to compress, store and release a gas, includes an accumulator 12 that is located underground (although in another embodiment the accumulator may be located above ground). In this example, the accumulator 12 serves as a chamber for holding both compressed gas and a liquid (such as water) and can include any suitable type of pressure vessel or tank, or as in this example can be an underground cave or chamber that is within ground 200. In this embodiment, accumulator 12 is lined, for example using concrete, metal, plastic and combinations thereof or the like, to help make it substantially gas and/or liquid impermeable so as to help to prevent unwanted egress of gas or liquid from within its interior. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior 23 of the accumulator 12, that has an accumulator volume.

The accumulator 12 in a given embodiment of the system 10A can be sized based on a variety of factors (e.g. the quantity of gas to be stored, the available space in a given location, etc.) and may, in some examples may be between about 1,000 m³ and about 2,000,000 m³ or more. For example, in this embodiment the accumulator 12 contains a layer of stored compressed gas 14 atop a layer of liquid 16 when in operational modes, and its volume (and thus capacity) can be selected based on the quantity of gas 14 to be stored, the duration of storage required for system 10A, and other suitable factors which may be related to the capacity or other features of a suitable power source and/or power load (see power source/load S/L in FIG. 2) with which the system 10A is to be associated. The power source/load S/L may be, in some examples, a power grid, a power source (including renewable and optionally non-renewable sources) and the like. Furthermore, the power source and power load may be completely independent of each other (e.g. the power source may be a renewable source, and the power load may be the grid).

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground 200 may be based on a number of factors, including the pressures at which the compression/expansion equipment to be used is most efficiently operated, the geology in the surrounding area and the like.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally without requiring further treatment. In this embodiment, the compressed gas 14 is compressed atmospheric air, and the liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10A is in operational modes. In this example, the accumulator 12 includes a primary opening 27 that is provided in the upper wall 13. The primary opening 27 may be any suitable size and may have a cross-sectional area (taken in the plane 19) that is adequate based on the specific requirements of a given embodiment of the system 10A. In one embodiment the cross-sectional area is between about 0.75 m² and about 80 m² but may be larger or smaller in a given embodiment.

When the system 10A is in use, the primary opening 27 may be sealed using any suitable type of partition that can function as a suitable sealing member. In the embodiment of FIG. 1, the system 10A includes a partition in the form of a bulkhead 24 that covers the primary opening 27. Some examples of suitable partitions are described in PCT/CA2018/050112 and PCT/CA2018/050282, which are incorporated herein by reference.

When the bulkhead 24 is in place, as shown in FIG. 1, it can be secured to, and preferably sealed with the accumulator wall, in this embodiment upper wall 13, using any suitable mechanism to help seal and enclose the interior 23. In other embodiments, the bulkhead 24 may have a different, suitable configuration.

The bulkhead 24 may be manufactured in situ, or may be manufactured offsite, and may be made of any suitable material, including, concrete, metal, plastics, composites and the like. In the illustrated embodiment, the bulkhead 24 is assembled in situ at the interface between a shaft 18 and the accumulator 12 of multiple pieces of reinforced concrete. In this embodiment the shaft 18 is illustrated schematically as a generally linear, vertical column. Alternatively, the shaft 18 may be a generally linear inclined shaft (see dashed lines of inclined shaft 18 in FIG. 5) or preferably may be a curved and/or generally spiral/helical type configuration (see decline 18 in the embodiment of FIGS. 9-14, for example) and which may be referred to as a shaft or generally as a decline. Some embodiments described herein may include a generally spiralling configured decline that winds from an upper end to a lower end and can have an analogous function and attributes as the vertical shaft 18 of FIG. 1 despite having a different geometrical configuration. Discussions of the shaft/decline 18 and its purposes in one embodiment can be applied to other embodiments described herein.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21), in a lower surface (such as lower surface 15) or other suitable location. The location of the primary opening 27, and the associated partition, can be selected based on a variety of factors including, for example, the underground geotechnical conditions, the availability of existing structures (e.g. if the system 10A is being retrofit into some existing spaces, such as mines, quarries, storage facilities and the like), operating pressures, accumulator configuration, shaft configurations and the like. For example, some aspects of the systems 10A described herein may be retrofit into pre-existing underground chambers, which may have been constructed with openings in their sidewalls, floors and the like. Utilizing some of these existing formations may help facilitate construction and/or retrofit of the chambers used in the system and may reduce or eliminate the need to form additional openings in the accumulator. Reducing the total number of openings in the accumulator may help facilitate sealing and related costs and may help reduce the chances of leaks and the like. In other embodiments, the components of the systems described herein may be purpose-built for the described purposes and may be configured in manner that helps facilitate both construction and operation of the systems.

When the primary opening 27 extends along the sidewall 21 of the accumulator 12, it may be positioned such that is contacted by only the gas layer 14 (i.e. toward the top of the accumulator 12), contacted by only the liquid layer 16 (i.e. submerged within the liquid layer 16 and toward the bottom of the accumulator) and/or by a combination of both the gas layer 14 and the liquid layer 16 (i.e. partially submerged and partially non-submerged in the liquid). The specific position of the free surface of the liquid layer 16 (i.e. the interface between the liquid layer 16 and the gas layer 14) may change while the system 10A is in a charging or discharging mode as gas is forced into (causing the liquid layer to drop) and/or withdrawn from the accumulator (allowing the liquid level to rise).

When the accumulator 12 is in use, at least one of the pressurized gas layers 14 and the liquid layer 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 acting on the partition may be at least partially dependent on the pressure of the gas 14 and the cross-sectional area (taken in plane 19) of the lower surface 29. For a given lower surface 29 area, the magnitude of the internal accumulator force 41 may vary generally proportionally with the pressure of the gas 14.

Preferably, an inwardly, (downwardly in this embodiment) acting force can be applied to the outer-surface 31 of the bulkhead 24 to help at least partially offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the upper surface 31 to a pressurized environment, such as a pressurized gas or liquid or the distributed weight from a pile of solid material that is in contact with the upper surface 31, and calibrating the pressure acting on the upper surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41 and may optionally be between about 90% and about 97% and may be about equal to the magnitude of the internal accumulator force 41.

In the present embodiment, the system 10 includes a shaft 18 that is configured so its lower end 43 is in communication with the opening 27 of the accumulator 12, and its upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear, curved, or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m$^3$ of water.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in operational modes. Optionally, a flow control apparatus 59 (as shown in FIG. 1) may be provided in the water supply/replenishment conduit 58. The flow control apparatus 59 may include a valve, sluice gate, or other suitable mechanism. The flow control apparatus 59 can be open while the system 10 is in operational modes to help facilitate the desired flow of water between the shaft 18 and the water source/sink 150. Optionally, the flow control apparatus 59 can be closed to fluidly isolate the shaft 18 and the water source/sink 150 if desired. For example, the flow control apparatus 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this example, the water 20 in the shaft 18 bears against the outside of bulkhead 24 and is thereby supported atop bulkhead 24. The amount of pressure acting on bulkhead 24 is proportional the height 50 of the water column.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 can be maintained so that magnitude of the counter force 46 is equal, or nearly equal, to the magnitude of the internal accumulator force 41 exerted by the compressed gas in compressed gas layer 14 stored in accumulator 12. In the illustrated embodiment, system 10 is operated so as to maintain a pressure differential (i.e. the difference between gas pressure inside the accumulator 12 and the hydrostatic pressure at the lower end 43 of the shaft 18) below a threshold amount—an amount preferably between 0 and 4 Bar, such as 2 Bar—the resulting net force acting on the bulkhead 24. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the maximum upward pressure on the bulkhead 24 will be 1 Bar higher than the downward pressure on the bulkhead 24 from the water 20 in shaft 18. The maximum pressure differential that is experienced by bulkhead 24 may increase by about 0.1 bar for every meter that the height 17 of the accumulator 12 is increased.

Each of shaft 18 and accumulator 12 may be formed in ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 in accumulator 12 using any suitable compressor/expander subsystem 100, and in turn conveying water between the liquid layer 16 in accumulator 12 and the water 20 in shaft 18.

In this embodiment, a gas conduit 22 is provided to convey compressed air between the compressed gas layer 14 and the compressor/expander subsystem 100, which can convert the potential energy of compressed air to and from electricity. Similarly, a liquid supply conduit 40 is configured to convey water between the liquid layer 16 and the water 20 in shaft 18. Each conduit 22 and 40 may be formed from any suitable material, including metal, the surrounding rock, plastic and the like.

In this example, the gas conduit 22 has an upper end 60 that is connected to the compressor/expander subsystem 100, and a lower end 62 that is in communication with the compressed gas layer 14. The gas conduit 22 is, in this example, positioned inside and extends within the shaft 18, and passes through the bulkhead 24 to reach the compressed gas layer 14. Positioning the gas conduit 22 within the shaft 18 may eliminate the need to bore a second shaft and/or access path from the surface to the accumulator 12. The positioning in the current embodiment may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 3, in in solid lines in the embodiment FIGS. 9-14, the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid supply conduit 40 is, in this example, configured with a lower end 64 that is submerged in the water layer 16 while the system 10 is in use and a remote upper end 66 that is in communication with the interior 54 of the shaft 18. In this configuration, the liquid supply conduit 40 can facilitate the exchange of liquid between the liquid layer 16 and the water 20 in the shaft 18. As illustrated in FIG. 1, the liquid supply conduit 40 can pass through the bulkhead 24 (as described herein), or alternatively, as shown using dashed lines, may be configured to provide communication between the liquid layer 16 and the water 20, but not pas through the bulkhead 24.

In this arrangement, as more gas is transferred into the gas layer 14 during an accumulation cycle, and its pressure increases, in this alternative slightly, water in the water layer 16 can be displaced and forced upwards through the liquid supply conduit 40 into shaft 18 against the hydrostatic pressure of the water 20 in the shaft 18. More particularly, water can preferably freely flow from the bottom of accumulator 12 and into shaft 18, and ultimately may be exchanged with the source/sink 150 of water, via a replenishment conduit 58. When gas is removed from the gas layer 14, water can travel from the shaft 18, through the water conduit 40, to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into and released from the accumulator 12. Alternatively, any suitable type of flow limiting or regulating device (such as a pump, valve, orifice plate and the like) can be provided in the water replenishment conduit 58.

Preferably, the lower end 64 of the liquid supply conduit 40 is positioned so that it is and generally remains submerged in the liquid layer 16 while the system 10 is in operational modes and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid supply conduit 40 is placed close to the lower wall 15. If the lower wall 15 is not flat or not generally horizontal, the lower end 64 of the liquid supply conduit 40 is preferably located in a low point of the accumulator 12 to help reduce the chances of the lower end 64 being exposed to the gas layer 14.

Similarly, to help facilitate extraction of gas from the gas layer, the lower end 62 of the gas conduit 22 is preferably located close to the upper wall 13, or if the upper wall 13 is not flat or generally horizontal at a high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

Figure 2:
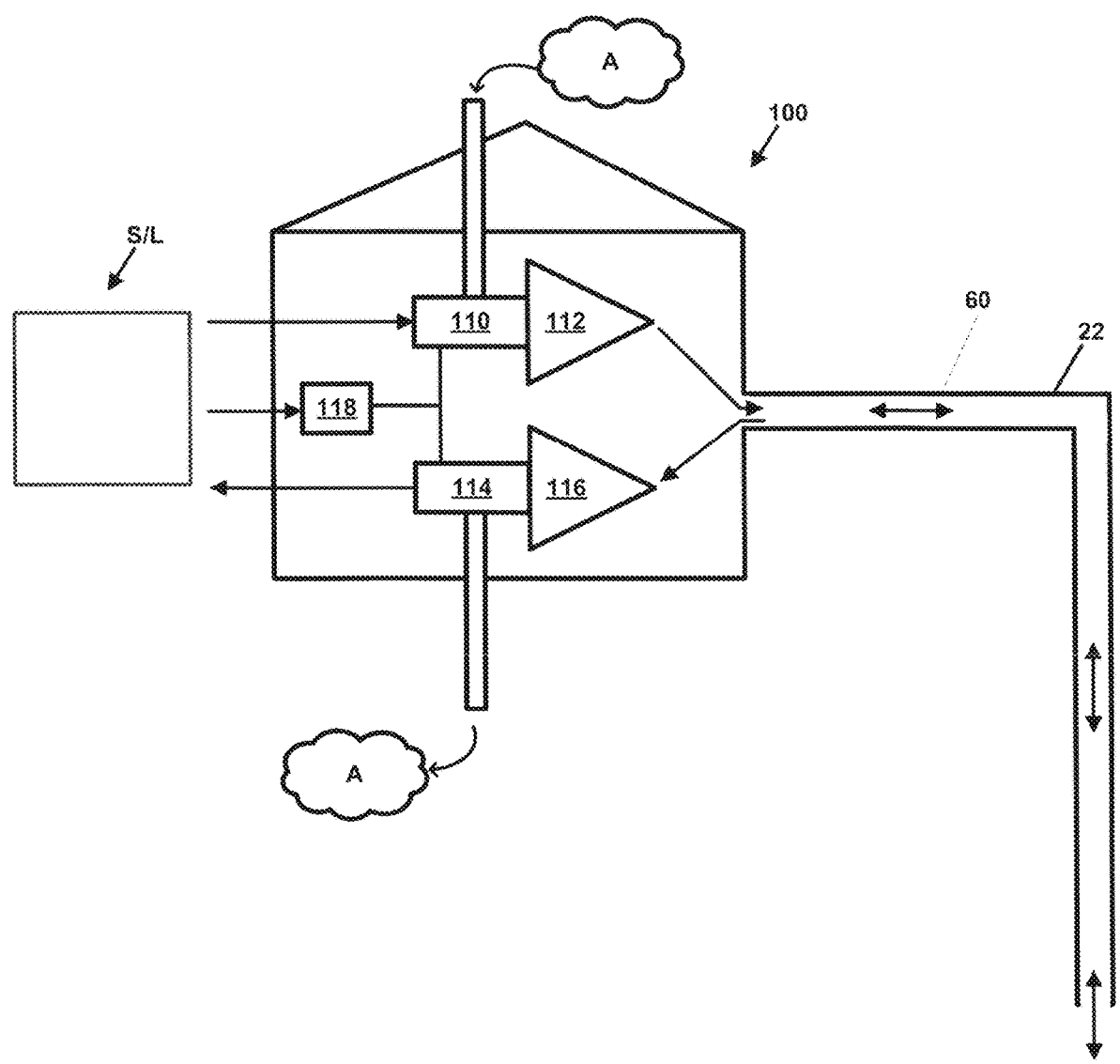
FIG. 2 is a schematic representation of a portion of the system of FIG. 1.

FIG. 2 is a schematic view of components of the compressor/expander subsystem 100 for the compressed gas energy storage system 10 described herein, according to an embodiment. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during a charging mode of operation, and draws in atmospheric air A, compresses the air, and forces it down into gas conduit 22 for storage in accumulator 12 (optionally via a thermal storage subsystem 120 in embodiments including same). Compressor/expander subsystem 100 also includes an expander 116 driven by compressed air exiting from gas conduit 22 during a discharging mode of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116.

Controller 118 operates compressor/expander subsystem 100 so as to switch between charging and discharging modes as required, including operating valves for preventing or enabling release of compressed air from gas conduit 22 on demand.

In the embodiment of FIG. 1, the partition includes a fabricated bulkhead 24 that is positioned to cover, and optionally seal the primary opening 27 in the accumulator perimeter. Alternatively, in other embodiments, the partition may be at least partially formed from natural materials, such as rock and the like. For example, a suitable partition may be formed by leaving and/or shaping portions of naturally occurring rock to help form at least a portion of the pressure boundary between the interior of the accumulator and the shaft, for example during construction of the system. Such formations may be treated, coated or otherwise modified to help ensure they are sufficiently gas impermeable to be able to withstand the desired operating pressure differentials between the accumulator interior and the shaft. This may be done, in some embodiments, by selectively excavating the shaft 18 and accumulator 12 such that a portion of the surrounding rock is generally undisturbed during the excavation and construction of the shaft 18 and accumulator 12. Alternatively, rock or other such material may be re-introduced into a suitable location within the accumulator 12 and/or shaft 18 after having been previously excavated. This may help reduce the need to manufacture a separate bulkhead and install it within the system 10. In arrangements of this nature, the primary opening 27 may be formed as an opening in a sidewall 21 of the accumulator 12, or alternatively one side of the accumulator 12 may be substantially open such that the primary opening 27 extends substantially the entire accumulator height 17, and forms substantially one entire side of the accumulator 12.

When the accumulator 12 is in an operational mode, at least one of the pressurized gas layer 14 and the liquid layer 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 on the bulkhead 24 is dependent on the pressure of the gas 14 and the cross-sectional area (taken in plane 19) of the lower surface 29. For a given lower surface 29 area, the magnitude of the internal accumulator force 41 may vary generally proportionally with the pressure of the gas 14.

Preferably, an inwardly, (downwardly in this embodiment) acting force can be applied to the outer-surface 31 of the bulkhead 24 to partially offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the upper surface 31 to a pressurized environment, such as a pressurized gas or liquid or the distributed weight from a pile of solid material that is in contact with the upper surface 31, and calibrating the pressure acting on the upper surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41 and may optionally be between about 90% and about 97% and may be about equal to the magnitude of the internal accumulator force 41.

In the present embodiment, the system 10 includes a shaft 18 having a lower end 43 that is in communication with the opening 27 in the upper wall 13 of the accumulator 12, and an upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 $m^3$ of water. In other embodiments the shaft need not be cylindrical and may have other cross-sectional geometries with the same hydraulic diameter.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in operational modes. Optionally, a flow control apparatus 59 (as shown in FIG. 1) may be provided in the water supply/replenishment conduit 58. The flow control apparatus 59 can be open while the system 10 is in operational modes to help facilitate the desired flow of water between the shaft 18 and the water source/sink 150. Optionally, the flow control apparatus 59 can be closed to fluidly isolate the shaft 18 and the water source/sink 150 if desired. For example, the flow control apparatus 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this example, the water 20 in the shaft 18 bears against the outside of bulkhead 24 and is thereby supported atop bulkhead 24. The amount of pressure acting on the outer surface 31 of the bulkhead 24 in this example will vary with the volume of water 20 that is supported, which for a given diameter 56 will vary with the height 50 of the water column. In this arrangement, the magnitude of the counter force 46 can then be generally proportional to the amount of water 20 held in the shaft 18. To increase the magnitude of the counter force 46, more water 20 can be added. To reduce the magnitude of the counter force 46, water 20 can be removed from the interior 54.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the upward pressure on the bulkhead 24 will be 1 Bar higher than the downward pressure on the bulkhead 24 from the water 20 in shaft 18.

Each of shaft 18 and accumulator 12 may be formed in ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 accumulator 12 using any suitable compressor/expander subsystem 100, and in turn conveying water between the liquid layer 16 and the water 20 in shaft 18.

In this embodiment, a gas conduit 22 is provided to convey compressed air between the compressed gas layer 14 and the compressor/expander subsystem 100, which can convert the potential energy of compressed air to and from electricity. Similarly, a liquid supply conduit 40 is configured to convey water between the liquid layer 16 and the water 20 in shaft 18. Each conduit 22 and 40 may be formed from any suitable material, including metal, plastic, the surrounding stone and the like.

In this example, the gas conduit 22 has an upper end 60 that is connected to the compressor/expander subsystem 100, and a lower end 62 that is in communication with the gas layer 14. The gas conduit 22 is, in this example, positioned inside and extends within the shaft 18, and passes through the bulkhead 24 to reach the gas layer 14. Positioning the gas conduit 22 within the shaft 18 may eliminate the need to bore a second shaft and/or access point from the surface to the accumulator 12. This position may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 28, the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

Figure 3:
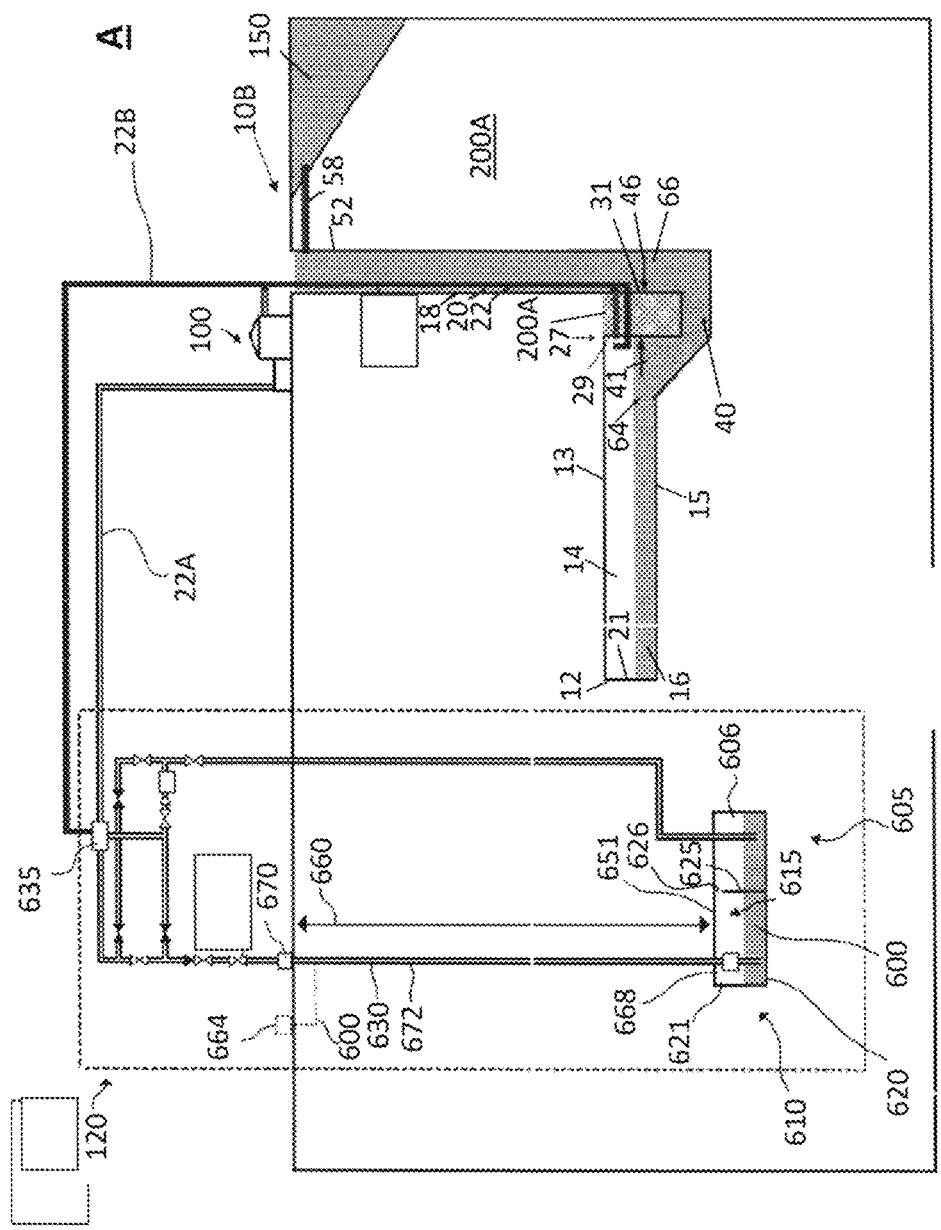
FIG. 3 is a schematic representation of another example of a hydrostatically compressed gas energy storage system.

Referring to FIG. 3, another embodiment of a compressed gas storage system 10B is configured with a partition that includes a projection 200A, identified using cross-hatching in FIG. 3, that is formed from generally the same material as the surrounding ground 200. The system 10B is generally analogous to the system 10A, and like features are identified using like reference characters.

In this example, the system 10B need not include a separately fabricated bulkhead 24 as shown in other embodiments, as the bulkhead may be formed of the surrounding rock. The system 10 in this embodiment is configured so that the gas supply conduit 22 is spaced apart from the projection 200A and does not extend through the partition. Instead, a separate shaft or bore can be provided to accommodate the conduit 22. To help provide liquid communication between the interior of the shaft 18 and the liquid layer 16, a liquid supply conduit 40 can be provided to extend through the projection 200A or, as illustrated, at least some of the liquid supply conduit 40 can be provided by a flow channel that passes beneath the projection 200A and fluidly connects the shaft 18 to the liquid layer 16, and ends 64 and 66 of the liquid supply conduit 40 can be the open ends of the passage.

Optionally, in such embodiments the gas supply conduit 22 may be arranged to pass through the partition/projection 200A as illustrated in FIG. 3. In this arrangement the conduit 22 can be configured so that its end 62 is positioned toward the upper side of the accumulator 12 to help prevent the liquid layer 16 reaching the end 62. Alternatively, the gas supply conduit 22 need not pass through the partition.

Optionally, the system 10B may be arranged so that the gas supply conduit 22 passes at least partially through the liquid supply conduit 40. This may help reduce the number of openings that need to be provided in the partition/projection 200A. In the embodiment of FIG. 3, another optional arrangement of gas supply conduit 22 is shown using dashed lines and passes through the flow channel, from the shaft 18 into the interior of the accumulator 12. In this arrangement, the gas supply conduit 22 is nested in, and passes through the liquid supply conduit 40, and also passes beneath the projection 200A. Optionally, a configuration in which at least some of the gas supply conduit 22 is received within a portion of the liquid supply conduit 40 may also be utilized in other embodiments of the system 10 (including those described and illustrated herein), including those in which both the liquid supply conduit 40 and gas supply conduit 40 pass through the partition.

The embodiment of FIG. 3 also includes one schematic representation of a thermal storage subsystem 120 that is provided in the gas flow path between the compressor/expander subsystem 100 and the accumulator 12. While one example is explained herein, other suitable thermal storage subsystems may be utilized in other embodiments, including those described in PCT/CA2018/050112 and PCT/CA2018/050282, which are incorporated herein by reference. The thermal storage subsystem 120 may also be used in combination with the system 10A, and other systems described herein.

In the example of FIG. 3, the gas conduit 22 that conveys the compressed gas between the compressed gas layer 14 and compressor/expander subsystem 100 includes an upper portion 22A that extends between the compressor/expander subsystem 100 and thermal storage subsystem 120, and a lower portion 22B that extends between thermal storage subsystem 120 and accumulator 12.

The thermal storage subsystem 120 may include any suitable type of thermal storage apparatus, including, for example latent and/or sensible storage apparatuses. The thermal storage apparatus(es) may be configured as single stage, two stage and/or multiple stage storage apparatus(es). Similarly, the thermal storage subsystem 120 may include one or more heat exchangers (to transfer thermal energy into and/or out of the thermal storage subsystem 120) and one or more storage apparatuses (including, for example storage reservoirs for holding thermal storage fluids and the like). Any of the thermal storage apparatuses may either be separated from or proximate to their associated heat exchanger and may also incorporate the associated heat exchanger in a single compound apparatus (i.e. in which the heat exchanger is integrated within the storage reservoir).

In the illustrated embodiment, substantial portions of the thermal storage subsystem 120 are located underground, which may help reduce the use of above-ground land and may help facilitate the use of the weight of the earth/rock to help contain the pressure in the storage reservoir. That is, the outward-acting pressure within the storage reservoir can be substantially balanced by the inwardly-acting forces exerted by the earth and rock surrounding the first reservoir. In some examples, if a liner or other type of vessel are provided in the storage reservoir such structures may carry some of the pressure load but are preferably backed-up by and/or supported by the surrounding earth/rock. This can help facilitate pressurization of the storage reservoir to the desired storage pressures, without the need for providing a manufactured pressure vessel that can withstand the entire pressure differential. In this example, the thermal storage subsystem 120 also employs multiple stages including, for example, multiple sensible and/or latent thermal storage stages such as stages having one or more phase change materials and/or pressurized water, or other heat transfer fluid arranged in a cascade. It will be noted that, if operating the system for partial storage/retrieval cycles, the sizes of the stages may be sized according to the time cycles of the phase change materials so that the phase changes, which take time, take place effectively within the required time cycles.

In general, as gas is compressed by the compressor/expander subsystem 100 during an accumulation cycle and is conveyed for storage towards accumulator 12, the heat of the compressed gas can be drawn out of the compressed gas and into the thermal storage subsystem 120 for sensible and/or latent heat storage. In this way, at least a portion of the heat energy is saved for future use instead of, for example being leached out of the compressed gas into water 20 or in the liquid layer 16, and accordingly substantially lost (i.e. non-recoverable by the system 10).

Similarly, during an expansion cycle as gas is released from accumulator 12 towards compressor/expander subsystem 100 it can optionally be passed through thermal storage subsystem 120 to re-absorb at least some of the stored heat energy on its way to the expander stage of the compressor/expander subsystem 100. Advantageously, the compressed gas, accordingly heated, can reach the compressor/expander subsystem 100 at a desired temperature (an expansion temperature—that is preferably warmer/higher than the accumulator temperature), and may be within about 10° C. and about 60° C. of the exit temperature in some examples, that may help enable the expander to operate within its relatively efficient operating temperature range(s), rather than having to operate outside of the range with cooler compressed gas.

In some embodiments, the thermal storage subsystem 120 may employ at least one phase change material, preferably multiple phase change materials, multiple stages and materials that may be selected according to the temperature rating allowing for the capture of the latent heat. Generally, phase change material heat can be useful for storing heat of approximately 150 degrees Celsius and higher. The material is fixed in location and the compressed air to be stored or expanded is flowed through the material. In embodiments using multiple cascading phase change materials, each different phase change material represents a storage stage, such that a first type of phase change material may change phase thereby storing the heat at between 200 and 250 degrees Celsius, a second type of phase change material may change phase thereby storing the heat at between 175 and 200 degree Celsius, and a third type of phase change material may change phase thereby storing the heat at between 150 and 175 degrees Celsius. One example of a phase change material that may be used with some embodiments of the system includes a eutectic mixture of sodium nitrate and potassium nitrate, or the HITEC® heat transfer salt manufactured by Coastal Chemical Co. of Houston, Texas.

In embodiments of the thermal storage subsystem 120 employing sensible heat storage, pressurized water, or any other suitable thermal storage fluid/liquid and/or coolant, may be employed as the sensible heat storage medium. Optionally, such systems may be configured so that the thermal storage liquid remains liquid while the system is in use and does not undergo a meaningful phase change (i.e. does not boil to become a gas). For example, such thermal storage liquids (e.g. water) may be pressurized and maintained at an operating pressure that is sufficient to generally keep the water in its liquid phase during the heat absorption process as its temperature rises. Optionally, the pressurized water may be passed through a heat exchanger or series of heat exchangers to capture and return the heat to and from the gas stream that is exiting the accumulator, via conduit 22. Generally, sensible heat storage may be useful for storing heat of temperatures of 100 degrees Celsius and higher. Pressurizing the water in these systems may help facilitate heating the water to temperatures well above 100 degrees Celsius (thereby increasing its total energy storage capability) without boiling.

Optionally, in some embodiments, a thermal storage subsystem 120 may combine both latent and sensible heat storage stages and may use phase change materials with multiple stages or a single stage. Preferably, particularly for phase change materials, the number of stages through which air is conveyed during compression and expansion may be adjustable by controller 118. This may help the system 10 to adapt its thermal storage and release programme to match desired and/or required operating conditions.

Optionally, at least some of the gas conduit 22 may be external the shaft 18 so that it is not submerged in the water 20 that is held in the shaft 18. In some preferred embodiments, the compressed gas stream will transfer its thermal energy to the thermal storage system 120 (for example by passing through heat exchangers 635 described herein) before the compressed gas travels underground. That is, some portions of the thermal storage subsystem 120 and at least the portion of the gas conduit that extends between the compressor/expander subsystem 100 and the thermal storage subsystem 120 may be provided above ground, as it may be generally desirable in some embodiments to transfer as much excess heat from the gas to the thermal storage subsystem 120, and reduce the likelihood of heat being transferred/lost in the water 20, ground or other possible heat sinks along the length of the gas conduit 22. Similar considerations can apply during the expansion stage, as it may be desirable for the warmed gas to travel from the thermal storage subsystem 120 to the compressor/expander subsystem 100 at a desired temperature, while reducing the heat lost in transit.

Referring again to FIG. 3, in this example the thermal storage subsystem 120 is configured to store thermal energy from the incoming pressurized gas in a thermal storage liquid 600. Optionally, the thermal storage liquid 600 can be pressurized in the thermal storage subsystem 120 to a storage pressure that is higher than atmospheric pressure and may optionally be generally equal to or greater than the accumulator pressure. Harmonizing the storage pressure in the thermal storage subsystem 120 and the accumulator 12 may help facilitate configurations in which there is at least some fluid communication between the thermal storage subsystem 120 and the accumulator 12 (including those described herein). In some examples, the storage pressure may be between about 100% and about 200% of the accumulator pressure.

Pressurizing the thermal storage liquid 600 in this manner may allow the thermal storage liquid 600 to be heated to relatively higher temperatures (i.e. store relatively more thermal energy and at a more valuable grade) without boiling, as compared to the same liquid at atmospheric pressure. That is, the thermal storage liquid 600 may be pressurized to a storage pressure and heated to a thermal storage temperature such that the thermal storage liquid 600 is maintained as a liquid while the system is in use (which may help reduce energy loss through phase change of the thermal storage liquid). In the embodiments illustrated, the storage temperature may be between about 150 and about 500 degrees Celsius, and preferably may be between about 150 and 350 degrees Celsius. The storage temperature is preferably below a boiling temperature of the thermal storage liquid 600 when at the storage pressure but may be, and in some instances preferably will be the above boiling temperature of the thermal storage liquid 600 if it were at atmospheric pressure. In this example, the thermal storage liquid 600 can be water, but in other embodiments may be engineered heat transfer/storage fluids, coolants, oils and the like. When sufficiently pressurized, water may be heated to a storage temperature of about 250 degrees Celsius without boiling, whereas water at that temperature would boil at atmospheric pressure.

Optionally, the thermal storage liquid 600 can be circulated through a suitable heat exchanger to receive heat from the compressed gas stream travelling through the gas supply conduit 22 during a charging mode (downstream from the compressor/expander subsystem 100). The heated thermal storage liquid 600 can then be collected and stored in a suitable storage reservoir (or more than one storage reservoirs) that can retain the heated thermal storage liquid 600 and can be pressurized to a storage pressure that is greater than atmospheric pressure (and may be between about 10 and 60 bar, and may be between about 30 and 45 bar, and between about 20 and 26 bar).

The storage reservoir may be any suitable type of structure, including an underground chamber/cavity (e.g. formed within the surrounding ground 200) or a fabricated tank, container, a combination of a fabricated tank and underground chamber/cavity, or the like. If configured to include an underground chamber, the chamber may optionally be lined to help provide a desired level of liquid and gas impermeability and/or thermal insulation. For example, underground chambers may be at least partially lined with concrete, polymers, rubber, plastics, geotextiles, composite materials, metal and the like. Configuring the storage reservoir to be at least partially, and preferably at least substantially impermeable may help facilitate pressurizing the storage reservoir as described herein. Fabricated tanks may be formed from any suitable material, including concrete, metal, plastic, glass, ceramic, composite materials and the like. Optionally, the fabricated tank may include concrete that is reinforced using, metal, fiber reinforced plastic, ceramic, glass or the like, which may help reduce the thermal expansion difference between the concrete and the reinforcement material.

In this embodiment the storage reservoir 610 of the thermal storage subsystem 120 includes a chamber 615 that is positioned underground, at a reservoir depth 660. Preferably, the reservoir depth 660 is less than or equal to the depth of the accumulator 12, which in this example corresponds to the shaft height 50. Optionally, the thermal storage subsystem 120 can be configured so that the reservoir depth 660 is at least about ⅓ of the accumulator depth/shaft height 50, or more. For example, if the accumulator 12 is at a depth of about 300 m, the reservoir depth 660 is preferably about 100 m or more. For example, having the reservoir depth 660 being less than the accumulator depth 50 may help facilitate sufficient net positive suction head to be available to the fluid transfer pumps and other equipment utilized to pump the thermal storage liquid 600 through the thermal storage subsystem 120 (for example between source reservoir 606 and storage reservoir 610). This may allow the transfer pumps to be positioned conveniently above ground and may help reduce the chances of damaging cavitation from occurring.

The reservoir depth 660 being at least ⅓ the depth 50 of the accumulator 12 may also allow for relatively higher rock stability of the subterranean thermal storage cavern, such as chamber 615. The geostatic gradient, which provides an upper limit on pressure inside underground rock caverns, is typically about 2.5-3 times the hydrostatic gradient. Given this rock stability criterion, the shallowest reservoir depth 660 may be approximately three times less than the accumulator depth in some embodiments, such as when the storage pressure is generally equal than the accumulator pressure.

In this example, the chamber 615 is a single chamber having a chamber interior 616 that is at least partially defined by a bottom chamber wall 620, a top chamber wall 651, and a chamber sidewall 621. The chamber 615 is connected to one end of a liquid inlet/outlet passage 630 (such as a pipe or other suitable conduit) whereby the thermal storage liquid 600 can be transferred into and/or out of the chamber 615. In addition to the layer of thermal storage liquid 600, a layer of cover gas 602 is contained in the chamber 615 and overlies the thermal storage liquid 600. Like the arrangement used for the accumulator 12, the layer of cover gas 602 can be pressurized using any suitable mechanism to help pressurize the interior of the chamber 615 and thereby help pressurize the thermal storage liquid 600. The cover gas may be any suitable gas, including air, nitrogen, thermal storage liquid vapour, an inert gas and the like. Optionally, at least the subterranean portions of the liquid inlet/outlet passage 630 (i.e. the portions extending between the heat exchanger 635 and the storage reservoir 610) may be insulated (such as by a vacuum sleeve, or insulation material) to help reduce heat transfer between the thermal storage fluid and the surrounding ground.

When the thermal storage subsystem 120 is in use, a supply of thermal storage liquid can be provided from any suitable thermal storage liquid source 605. The thermal storage liquid source can be maintained at a source pressure that may be the same as the storage pressure or may be different than the storage pressure. For example, the thermal storage liquid source may be at approximately atmospheric pressure, which may reduce the need for providing a relatively strong, pressure vessel for the thermal storage liquid source. Alternatively, the thermal storage liquid source may be pressurized. The thermal storage liquid source may also be maintained at a source temperature that is lower, and optionally substantially lower than the storage temperature. For example, the thermal storage liquid source may be at temperatures of between about 2 and about 100 degrees Celsius and may be between about 4 and about 50 degrees Celsius. Increasing the temperature difference between the incoming thermal storage liquid from the source and the storage temperature may help increase the amount of heat and/or thermal energy that can be stored in the thermal storage subsystem 120.

The thermal storage liquid source 605 may have any suitable configuration and may have the same construction as an associated storage reservoir or may have a different configuration. For example, in the embodiment of FIG. 3 the thermal storage liquid source 605 includes a source reservoir 606 that is configured in the same underground chamber as the thermal fluid storage chamber 615. In this arrangement, a closed loop system can be provided, including the storage reservoir 610 and the source reservoir 606. Alternatively, the thermal storage liquid source 605 may include a source reservoir 606 that is configured as an above-ground vessel, and optionally need not be pressurized substantially above atmospheric pressure. In other embodiments, the thermal liquid source 605 may include a body of water such as the lake 150, water 20 from the shaft 18, liquid from the liquid layer 16 in the accumulator 12 (or from any other portion of the overall system 10), water from a municipal water supply or other such sources and combinations thereof.

In the embodiment of FIG. 3, the source reservoir 606 and storage reservoir 610 are adjacent each other and are portions of a generally common underground chamber. This may help simplify construction of the thermal storage subsystem 120 as an excavation of a single chamber may provide space for both the source reservoir 606 and storage reservoir 610. This may also help simplify piping and valving between the source reservoir 606 and the storage reservoir 610.

In some examples, the interiors of the storage reservoir 610 and source reservoir 606 may be substantially fluidly isolated from each other, such that neither gas nor liquid can easily/freely pass between reservoirs 606 and 610. Alternatively, as illustrated in Figure, the interiors of the storage reservoir 610 and source reservoir 606 may be in gas flow communication with each other, such as by providing the gas exchange passage 626 that can connect the layer of cover gas 602 with a layer of cover gas 608 in the source reservoir 606. The gas exchange passage 626 can be configured to allow free, two-way flow of gas between the storage reservoir 610 and the source reservoir 606 or may be configured to only allow one-way gas flow (in either direction). Providing a free flow of gas between the storage reservoir 610 and the source reservoir 606 may help automatically match the pressures within the storage reservoir 610 and the source reservoir 606. Preferably, when arranged in this manner, the interior of the storage reservoir 610 remains at least partially isolated from the interior of the source reservoir 606 during normal operation to inhibit, and preferably prevent mixing of the relatively hot cover gas associated with the thermal storage liquid 600 in the storage reservoir 610 with the relatively cooler cover gas associated with the thermal storage liquid in the source reservoir 606. In this example, the storage reservoir 610 and source reservoir 606 share a common sidewall, which can function as an isolating barrier 625 to prevent liquid mixing between the reservoirs. This common sidewall may be insulated to prevent unwanted heat transfer from the relatively hot thermal storage liquid 600 in the storage reservoir 610 to the relatively cooler thermal storage liquid in the source reservoir 606

When the compressed gas energy storage systems are in a charging phase, compressed gas is being directed into the accumulator 12 and the thermal storage liquid 600 can be drawn from the thermal storage liquid source 605, passed through one side of a suitable heat exchanger 635 (including one or more heat exchanger stages) to receive thermal energy from the compressed gas stream exiting the compressor/expander subsystem 100, and then conveyed/pumped through the liquid inlet/outlet passage 630 and into the storage reservoir 610 for storage at the storage pressure.

When the compressed gas energy storage system is in a storage mode, compressed gas is neither flowing into or out of the accumulator 12 or thorough the heat exchanger 635, and the thermal storage liquid 600 need not be circulated through the heat exchanger 635.

When the compressed gas energy storage systems are in a discharging phase, compressed gas is being transferred from the accumulator 12 and into the compressor/expander subsystem 120 for expansion and the thermal storage liquid 600 can be drawn from the storage reservoir 610, passed through one side of a suitable heat exchanger 635 (including one or more heat exchanger stages) to transfer thermal energy from thermal storage liquid into the compressed gas stream to help increase the temperature of the gas stream before it enters the compressor/expander subsystem 100. Optionally, the thermal storage fluid can then be conveyed/pumped into the source reservoir 606 for storage.

The thermal storage liquid 600 can be conveyed through the various portions of the thermal storage subsystem 120 using any suitable combination of pumps, valves, flow control mechanisms and the like. Optionally, an extraction pump may be provided in fluid communication with, and optionally at least partially nested within, the storage reservoir 610 to help pump the thermal storage liquid 600 from the storage reservoir 610 up to the surface. Such a pump may be a submersible type pump and/or may be configured so that the pump and its driving motor are both located within the storage reservoir 610. Alternatively, the pump may be configured as a progressive cavity pump having a stator and rotor assembly 668 (including a rotor rotatably received within a stator) provided in the storage reservoir 610 and positioned to be at least partially submerged in the thermal storage liquid 600, a motor 670 that is spaced from the stator and rotor assembly 668 (on the surface in this example) and a drive shaft 672 extending therebetween. In this example, the drive shaft 672 is nested within the liquid inlet/outlet passage 630 extending to the storage reservoir 610, but alternatively may be in other locations.

Optionally, to help pressurize the storage reservoir 610, the thermal storage subsystem 120 may include any suitable type of pressurization system and may include a thermal storage compressor system that can help pressurize the layer of cover gas 602 in the storage reservoir. This may include a thermal storage compressor 664 that is in fluid communication with the cover gas layer. The compressor itself may be on the surface and may be connected to the cover gas layer by a compressor gas conduit 666 that may be spaced from, or at least partially integrated with the liquid inlet/outlet passage 630. Optionally, the compressor 664 may be configured to raise the pressure of the cover gas layer 602 from atmospheric pressure to the storage pressure. The compressor 664, and any other aspects of the thermal storage subsystem 120 may be controlled at least partially automatically by the controller 118. While shown as a separate compressor 664, pressure for the storage reservoir 610 may at least partially be provided by the compressor/expander subsystem 100.

Figure 4:
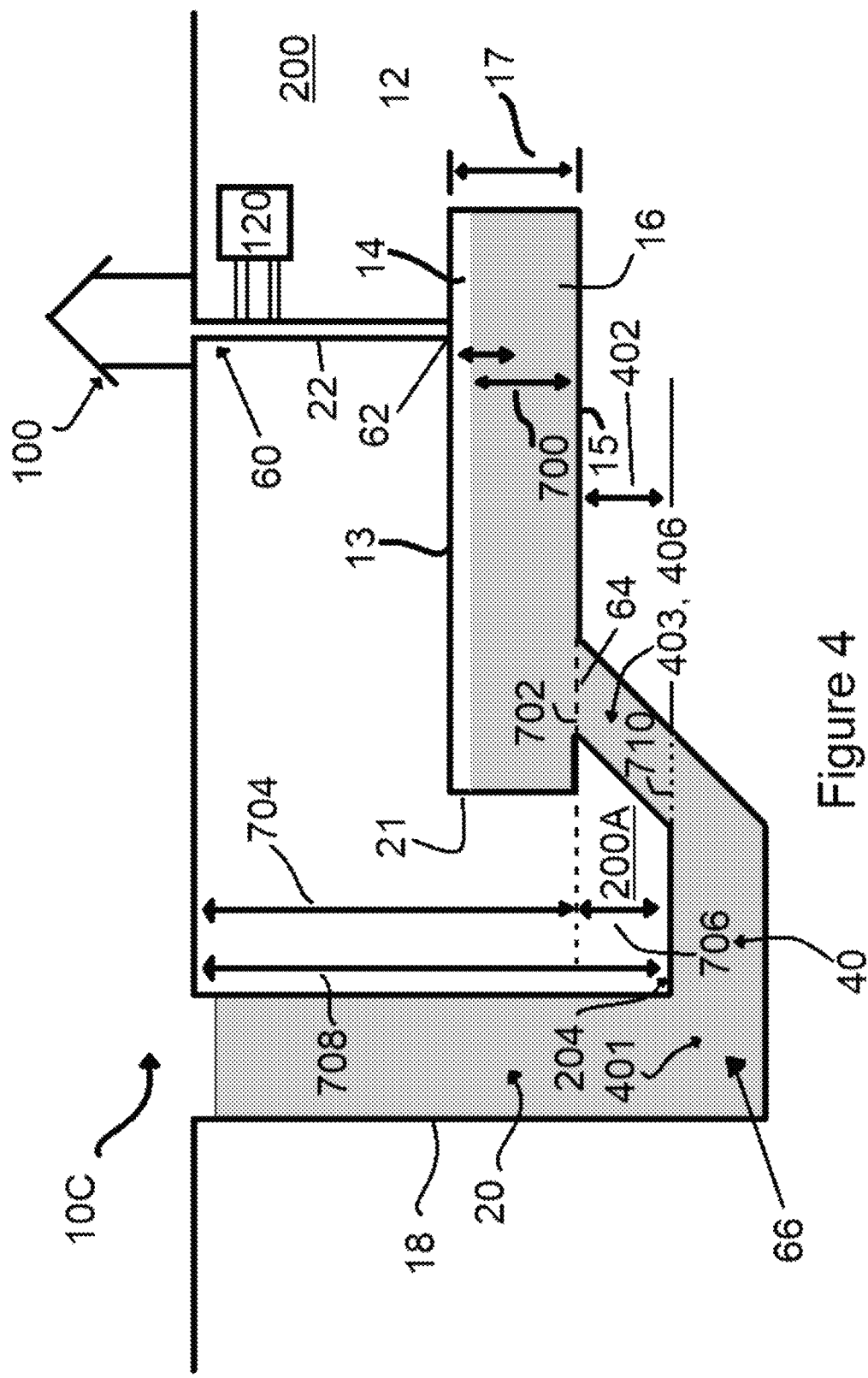
FIG. 4 is a schematic representation of another example of a hydrostatically compressed gas energy storage system in a partially charged operational configuration.

Referring to FIG. 4 another schematic example of a hydrostatically compensated compressed gas energy storage system 10C, having an accumulator 12, a shaft 18, a partition in the form of projection 200A, a compensation liquid flow path 410 and a compensation liquid reservoir 150. The systems 10C is generally analogous to the other systems 10A and 10B described herein, and like features are identified using like reference characters. As shown in FIG. 4, the compensation liquid flow path 410 may comprise a liquid supply conduit 40 in the flow channel that passes beneath the projection 200A. In this embodiment, the gas supply conduit 22 does pass through the partition, an instead is provided as a separate bore/conduit.

Optionally, the system 10C, and other systems described herein, can be configured into an operating mode, which may include the charging and discharging phases described herein. When in the operating mode, the water 20 in the shaft 18 is at a relatively high, operating level as shown in FIG. 4, and the interface between the liquid layer 16 and the layer of compressed gas 14 is disposed somewhere between the upper and lower walls 13 and 15 of the accumulator 12. The precise level of the interface, which can also be expressed in terms of a height 700 of the liquid layer 16 can vary while the system 10C is in use. As relatively more air is forced in the accumulator 12 the height 700 can decrease. As air is released, the height 700 can increase.

Optionally, the system 10C can include a fully charged configuration, which represents a pre-determined limit for the charging of the system when in normal use. In the embodiment of FIG. 4, the system 10C can be considered to be fully charged when the height 700 of the liquid layer 16 is reduced to approximately 0, i.e. when the surface of the liquid is driven to a position in which it is generally co-planar the lower wall 15, shown as the plane 702 (the "charge plane"). In this configuration, substantially all of the interior of the accumulator 12 is exposed to the air/gas. Moving the surface of the liquid layer beyond the charge plane 702 may increase the chances of air from the accumulator 12 escaping via the liquid supply conduit 40 and entering the shaft 18.

In this embodiment, the pressure of the system 10C in the fully charged can be expressed as a function of the height 704 of the shaft 18, from the surface (i.e. upper surface of the liquid) to charge plane 702, where the fully charged operating pressure is defined as the product of the density of the liquid (i.e. water), the gravitational constant "g" and the height 704.

As shown in FIG. 4, the partition 200A is configured such that its lower end 204 is spaced below the lower surface 15 of the accumulator and charge plane 702, by a partition height 706. It can also be seen that an overall height 708 can be defined as the sum of heights 704 and 706. In this arrangement, the system 10C can be considered overcharged if the level of the water is forced downward through the liquid supply conduit 40 such that the water level reaches lower plane 710 (the "overcharge plane"). In this position, gas leakage from the accumulator 12 into the shaft 18 may occur. The overcharge pressure required to reach this state can be defined as the product of the density of the liquid (i.e. water), the gravitational constant "g" and the height 708. In other words, the difference in the desired fully charged operating pressure and the overcharge pressure for a given system can be related to the magnitude of the partition height 706. As height 706 increases, the difference between the fully charged pressure and the overcharged pressure increases. That is, the more the system 10C can exceed its desired fully charged pressure without reaching the overcharged pressure. This difference or pressure range can represent a pressure operating sensitivity or tolerance of the system 10C. In a given embodiment, a desired pressure operating tolerance can be selected by increasing or decreasing the partition height 706. In some embodiments, the projection height 706 may be between 1 and 50 m, and preferably may be between about 10 m and about 20 m.

In certain situations, it may be desirable to prevent the unplanned escape of gas from the layer of air within the accumulator. One method of preventing gas from escaping the accumulator may be to design the compressed gas energy storage system to include an overcharge buffer apparatus. The overcharge buffer apparatus, which may be described as a "water trap", may be designed in any number of ways, but may generally include: a lower flow portion that is positioned below the lower wall of the accumulator by at least a buffer height; and a transition portion extending upwardly from an overcharge plane between the lower flow portion and a charge plane which defines an interface between the transition portion and the accumulator interior and comprises a buffer portion extending upwardly from the overcharge plane by the buffer height.

Figure 5:
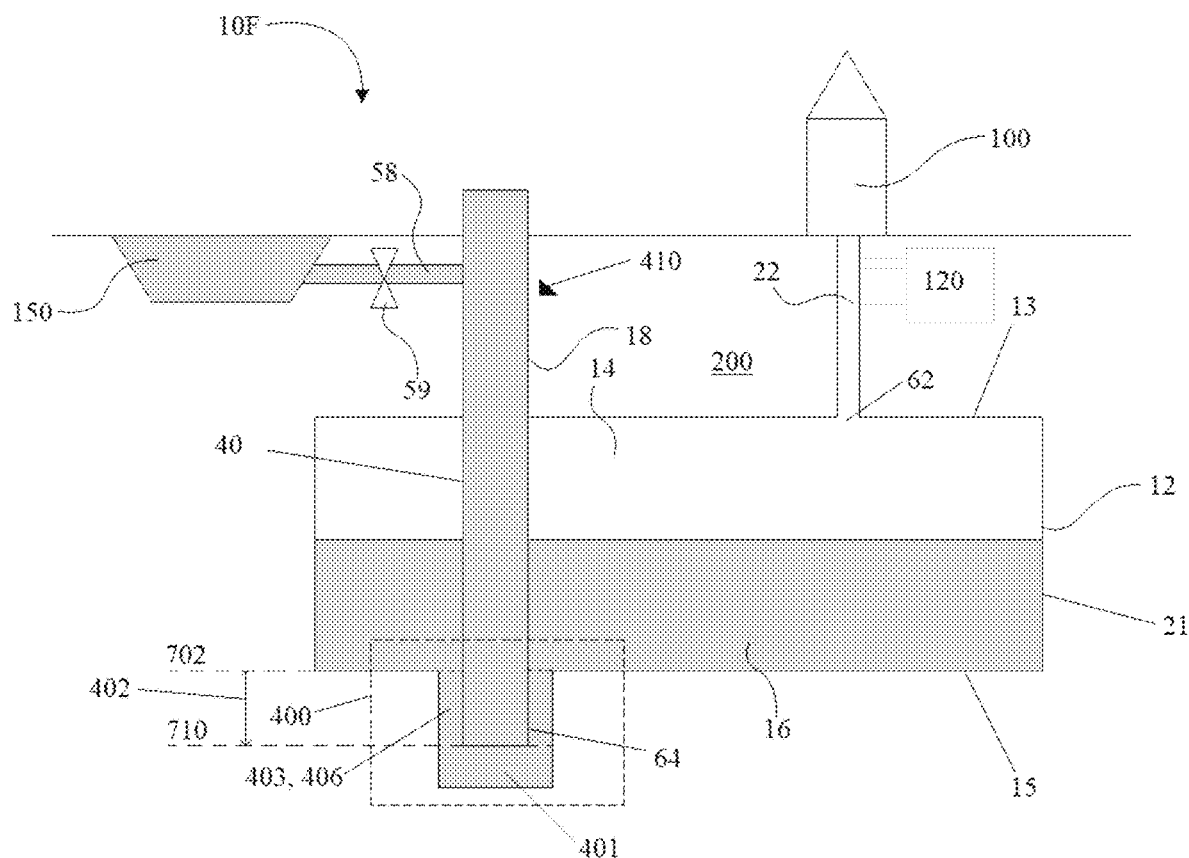
FIG. 5 is a schematic representation of another example of a hydrostatically compressed gas energy storage system.

FIGS. 4 and 5 provide two schematic examples of hydrostatically compensated compressed gas energy storage systems 10C and 10D that have been designed to include an overcharge buffer apparatus, or water trap configuration.

Referring to FIG. 4, a hydrostatically compensated compressed air energy storage system 10C in with one configuration of an overcharge buffer apparatus is shown. As shown in FIG. 4, the system 10D the liquid supply conduit 40 may include an overcharge buffer apparatus 400 in the flow channel that passes beneath the projection 200A and can be described as a water trap configuration.

As shown in FIG. 4, the overcharge buffer apparatus 400 may include a lower flow portion 401 that is positioned below the lower wall 15 of the accumulator 12 by at least a buffer height 402. The overcharge buffer apparatus may further include a transition portion 403 extending upwardly from the overcharge plane 710 between the lower flow portion 401 and the charge plane 702 which defines an interface between the transition portion 403 and the accumulator interior 23 and comprises a buffer portion 406 extending upwardly from the overcharge plane 710 by the buffer height 402.

The water trap configuration as shown in FIG. 4 may include ends 64 and 66 that are the open ends of the passage where end 64 (the "water port") provides a fluid connection point between liquid compensation layer 16 in the accumulator 12 and the compensation liquid flow path 410. As shown in FIG. 4, the water port 64 may be provided in the lower wall 13 of the accumulator 12, or alternatively in other embodiments, the water port 64 may be provided in one of the sidewalls 21 of the accumulator. When the water port 64 is provided in the lower wall 15 of the accumulator, the water port 64 may extend generally perpendicular to the charge plane 702. In certain preferred embodiments, the water port 64 may be provided at a low point of the accumulator. For example, while FIG. 5 shows the lower wall 15 of the accumulator as level, in certain embodiments, the lower wall 15 of the accumulator 13 may be generally declined toward the water port 64 such that compensation liquid may be allowed to flow toward the water port 64 without being trapped by local low points of the accumulator floor. As further shown in FIG. 4, the system 10C may include a gas conduit 22 to convey compressed air between the compressed gas layer 14 and the compressor/expander subsystem 100, which can convert the potential energy of compressed air to and from electricity. In this example, the gas conduit 22 has an upper end 60 that is connected to the compressor/expander subsystem 100, and a lower end 62 ("air port") that is in communication with the compressed gas layer 14. In certain embodiments, the air port 62 may be provided toward the upper portion of the accumulator 12. For example, as shown in FIG. 4, the air port 62 may be provided in the upper wall 13 of the accumulator 12. In other embodiments, the air port 62 may be provided in one of the sidewalls 21 of the accumulator 12.

Referring to FIG. 5, a hydrostatically compensated compressed air energy storage system 10F with another configuration of an overcharge buffer apparatus is shown. The system 10F is generally analogous to the system 10C described herein, and like features are identified using like reference characters As shown, in FIG. 5, the system 10F may include an accumulator 12, a compensation liquid reservoir 150 and a compensation liquid flow path 410. The accumulator may be disposed underground and may comprise a layer of compressed air 14 on top of a layer of compensation liquid 16. The compensation liquid reservoir 150 may be spaced apart from the accumulator 12 and in fluid communication with the layer of compensation liquid 16 in the accumulator through the compensation liquid flow path 410. As shown in FIG. 5, the compensation liquid flow path 410 may comprise for example a compensation shaft 18, such that when the system 10F is in use, compensation liquid may flow between the accumulator 12 and the compensation liquid reservoir 150 through the water port 64. As shown in FIG. 5, the water port 64 may be provided in the lower wall 15 of the accumulator, while in other embodiments, the water port 64 may be provided in one of the sidewalls 21 of the accumulator. As further shown in FIG. 5, the system 10D may include a gas conduit 22 to convey compressed air between the compressed gas layer 14 and the compressor/expander subsystem 100, which can convert the potential energy of compressed air to and from electricity. In this example, the gas conduit 22 has an upper end 60 that is connected to the compressor/expander subsystem 100, and a lower end 62 ("air port") that is in communication with the compressed gas layer 14. In certain embodiments, the air port 62 may be provided toward the upper portion of the accumulator 12. For example, as shown in FIG. 5, the air port 62 may be provided in the upper wall 13 of the accumulator 12. In other embodiments, the air port 62 may be provided in one of the sidewalls 21 of the accumulator 12.

To prevent the unwanted escape of gas from the layer of compressed air 14 of the accumulator into the compensation shaft 18, the system 10F may be configured to include an overcharge buffer apparatus 400. As shown in FIG. 5, the overcharge apparatus may be disposed underground and may be located in the compensation liquid flow path 410 between a lower end of the compensation shaft 18 and the accumulator 12 to inhibit a flow of air from the layer of compressed air 14 to the compensation shaft 18. As shown in FIG. 5, the overcharge buffer apparatus 400 may include a lower flow portion 401 that is positioned below the lower wall 15 of the accumulator 12 by at least a buffer height 402. The overcharge buffer apparatus 400 may further include a transition portion 403 extending upwardly from the overcharge plane 710 between the lower flow portion 401 and the charge plane 702 which defines an interface between the transition portion 403 and the accumulator interior 23. The transition portion 403 may comprises a buffer portion 406 extending upwardly from the overcharge plane 710 by the buffer height 402. In certain preferred embodiments the accumulator may be configured to contain only one liquid, the compensation liquid. In such embodiments, as shown in FIGS. 4 and 5, the buffer portion 406 and the transition portion 406 of the overcharge buffer apparatus may be one and the same.

In certain preferred embodiments, the buffer portion may be configured such that the hydrostatic pressure at the overcharge plane 710 exerted by a column of the compensation liquid having a height equal to the buffer height 402 is between about 2% and about 25% of the storage pressure (i.e. the overcharge pressure is between about 102% and 125% of the storage pressure).

In certain preferred embodiments, the buffer height 402 may be between about 5 m and about 100 m, or more preferably between about 10 m and 20 m. In other embodiments, where the compensation shaft 18 extends between an upper end proximate the surface of the ground 200 and the lower end and has a shaft height, the buffer height 402 may be measured as a percentage of the shaft height. By way of non-limiting example, the buffer height 402 may be between about 2% and about 25% of a shaft height.

Figure 7:
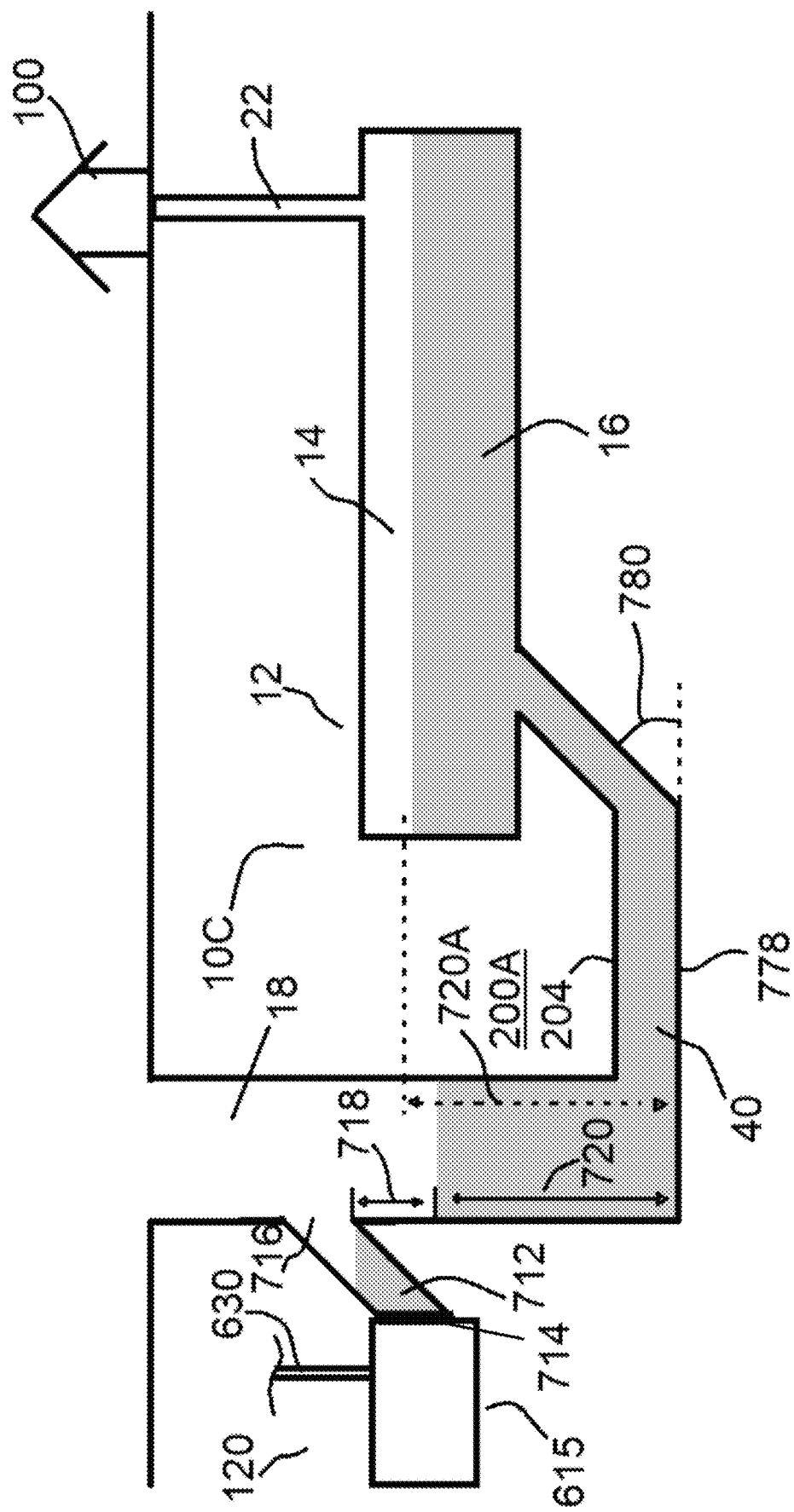
FIG. 7 is a schematic representation of another example of a hydrostatically compressed gas energy storage system in a partially drained/dewatered configuration.

In order to prevent the evaporation from the layer of compensation liquid 16 within the accumulator, in certain embodiments, it may desirable to include a layer of cover liquid 415 over the surface of the layer of compensation liquid 16 within the accumulator 12 thereby separating the layer of compressed air 14 and the layer of compensation liquid 16. FIG. 7 provides a schematic representation of the hydrostatically compensated compressed air energy system 10F which is similar to that of FIG. 5, however in this embodiment, the system includes a layer of cover liquid 415. The cover liquid 415 may comprise a liquid that is less dense than the compensation fluid and has a lower solubility of air than the compensation fluid. Examples of cover liquid may for example include oils, such as vegetable oils or mineral oils, organic solvents, or other liquids.

Figure 6:
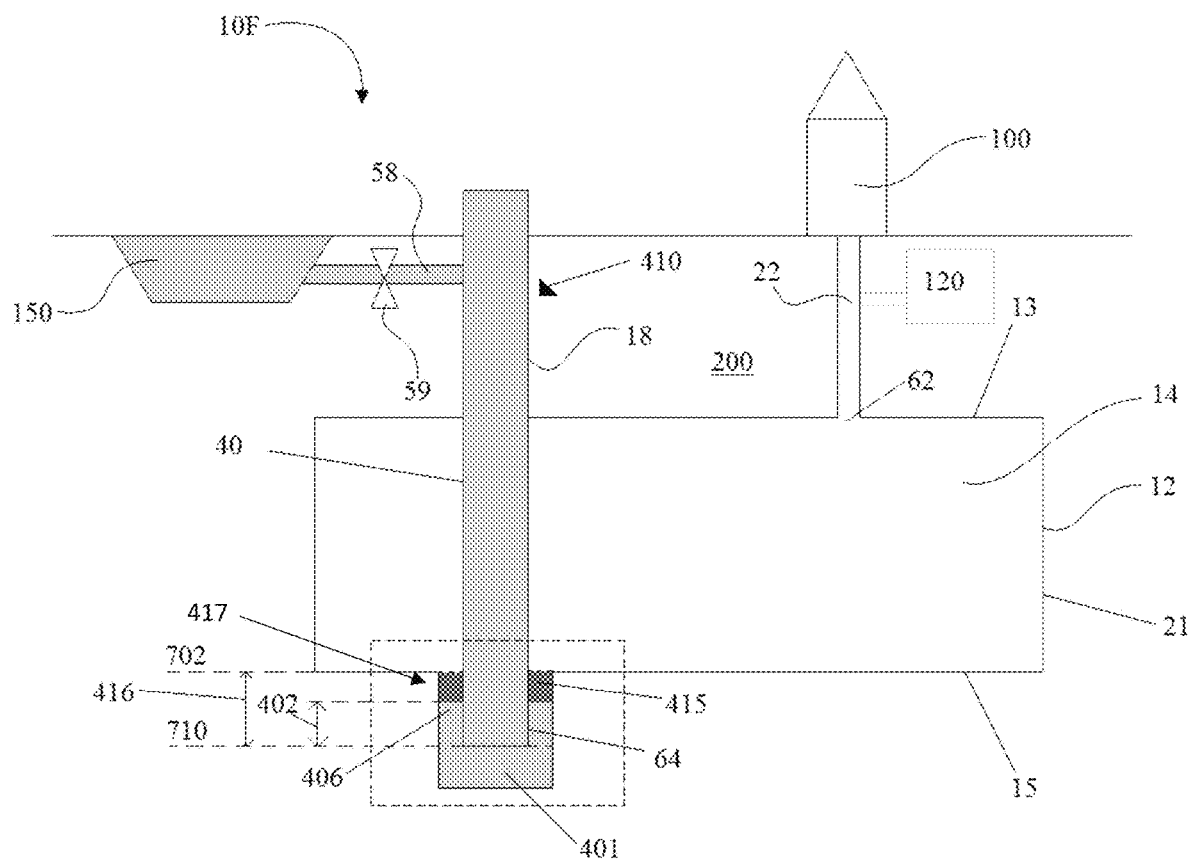
FIG. 6 is the system of FIG. 5 where the system includes a layer of cover liquid.

Optionally, the system 10F, can be configured into an operating mode, which may include the charging and discharging phases described herein. FIG. 6 provides a schematic representation of the system 10F in a fully charged state. As shown in FIG. 6, when the system 10F is in the fully charged state, the air-liquid interface of the accumulator 12 is at the charge plane 702. In this state, at least about 80% (or more preferably about 100%) of the sidewalls 21 of the accumulator 13 may be exposed above the layer of compensation liquid 16 and the accumulator interior 23 may be essentially free of compensation liquid.

As shown in FIG. 6, in embodiments where a layer of cover liquid 415 is included, the buffer portion 406 and the transition portion 403 of the overcharge buffer apparatus may not be one and the same, but rather the transition portion 403 of the overcharge buffer apparatus 400 may have a transition height 416 that is greater than the buffer height 402. In this embodiment, the transition portion 403 may comprises an auxiliary storage portion 417 that is disposed between the buffer portion 406 and the charge plane 702. Optionally, the system 10, can be configured into an operating mode, which may include the charging and discharging phases described herein. FIG. 6 provides a schematic representation of the system 10F in a fully charged state. As shown in FIG. 6, when the system 10F is in the fully charged state, the air-liquid interface of the accumulator 12 is at the charge plane 702. In this state, at least about 80% (or more preferably about 100%) of the sidewalls 21 of the accumulator 13 may be exposed above the layer of compensation liquid 16 and the accumulator interior 23 may be essentially free of compensation liquid and cover liquid and the buffer portion 406 may be filled with compensation liquid and cover liquid.

The compressed gas energy storage systems described herein can also be configured to operate in one or more maintenance or service states/modes. In certain maintenance modes, the system is at least partially drained of the compensation liquid 20. At least partially draining the compensation liquid in the system may help expose submerged portions of the system and may allow operators, equipment and the like to access such portions which would otherwise be more difficult to access when submerged. Optionally, the systems may also be practically completely drained of compensation liquid to allow access to substantially all of the components of the system. In this context, the system may be considered completely drained of compensation liquid if material portions of the system, such as the shaft 18, accumulator 12 and liquid flow conduit 40 are generally free of compensation liquid or the compensation liquid level has dropped to a level such that at least these regions are accessible to human operators and preferably can accommodate passage of vehicles, humans and the like. Draining practically all of the compensation liquid out of the system may be time consuming and/or costly, whereas draining only some of the compensation liquid out of the system may be relatively faster and/or less costly. The specific components that are exposed when the system is in a partially drained mode can be based on the geometry of a given embodiment of the system.

Optionally, the maintenance states may be entered so that the sub-surface infrastructure of the system(s) may receive scheduled or unscheduled maintenance. Some embodiments may be expected to be in maintenance states ~5% or less of the system life.

Optionally, the system may be configured in a charged (air-filled) maintenance state. A Charged maintenance state may be entered/utilized if a visual inspection of the accumulator 12 is desired, but no human access is required. For example, this may be useful for inspecting sensors installed in the accumulator 12, inspecting the accumulator lining, inspecting the interface location of the connection between the air supply conduit 22 and the accumulator 12 and the like. In some examples, the following steps may be performed during the charged maintenance state.

The first step of one example of a charged maintenance state is to charge the system to a pre-determined charge capacity, which may be a maximum charge. The steps required for complete charging of the system may be substantially the same as entering the charging mode described herein. It may be advantageous to charge the system to its maximum capacity so that the air water interface, i.e. height 700, is at its lowest operational level and as much of the accumulator 12 as possible is exposed.

By way of non-limiting example, during a charged maintenance state, air may be forced into the accumulator 12 such that the water/liquid level 16 within the accumulator is driven down, exposing the upper wall 13 of the accumulator to air and exposing a certain percentage of the surface area of each of the side walls 21 of the accumulator to air. In certain preferred embodiments, during a charged maintenance state, the water level in the accumulator may be driven down such that at least about 80% of the surface area of the accumulator side walls 21 is exposed to air, or preferably at least about 90% below the floor 15 of the accumulator of the surface area of the accumulator side walls 21 is exposed to air. In certain preferred embodiments, during a charged maintenance state, the water level 16 may be driven down such that the accumulator 12 is substantially free of water and such that the about around 100% of the surface area of the accumulator side walls 21 are exposed to air about around 100% of the surface area of the accumulator floor 15 is exposed to air. The charged maintenance state may be executed at or around the desired storage pressure of the accumulator.

When the system has been charged to a desired level, and optionally completely charged, a temporary maintenance apparatus may be deployed through the air supply conduit 22 borehole, or a purposely drilled tool deployment borehole, via a deployment work stage on a winch or other suitable apparatus. The tool may for example be a UAV or other sensor and may be used to conduct an inspection of the interior of the accumulator 12. The following steps may be performed to achieve UAV deployment. For example, a charged UAV will be loaded into the deployment work stage. The deployment work stage may have a modem with a wired connection for communicating with the UAV. The deployment work stage can then be lowered with a winch, sending the UAV and modem into the accumulator 12.

The UAV may then make its flight around the exposed portions of the accumulator 12 and may be controlled by an operator at the surface or may fly on a predetermined preprogrammed path. While making this flight, the UAV may use LiDAR or other sensors to monitor the surroundings. The data collected can then be transmitted to the modem and saved to a computer connected at the top-side plant. Once the UAV has finished its monitoring, it may return to the deployment work stage. The deployment work stage may be capable of transmitting a locating signal from the UAV launch platform to assist the UAV in returning to the precise landing spot on the deployment launch pad. The UAV may also not return to the deployment work stage and remain permanently in the accumulator 12.

Optionally, the work stage may be retrieved from the accumulator 12 via the winch. If the UAV was successfully retrieved it can be recharged for later inspections. The system may now return to operating modes unless further maintenance is required.

Figure 4A:
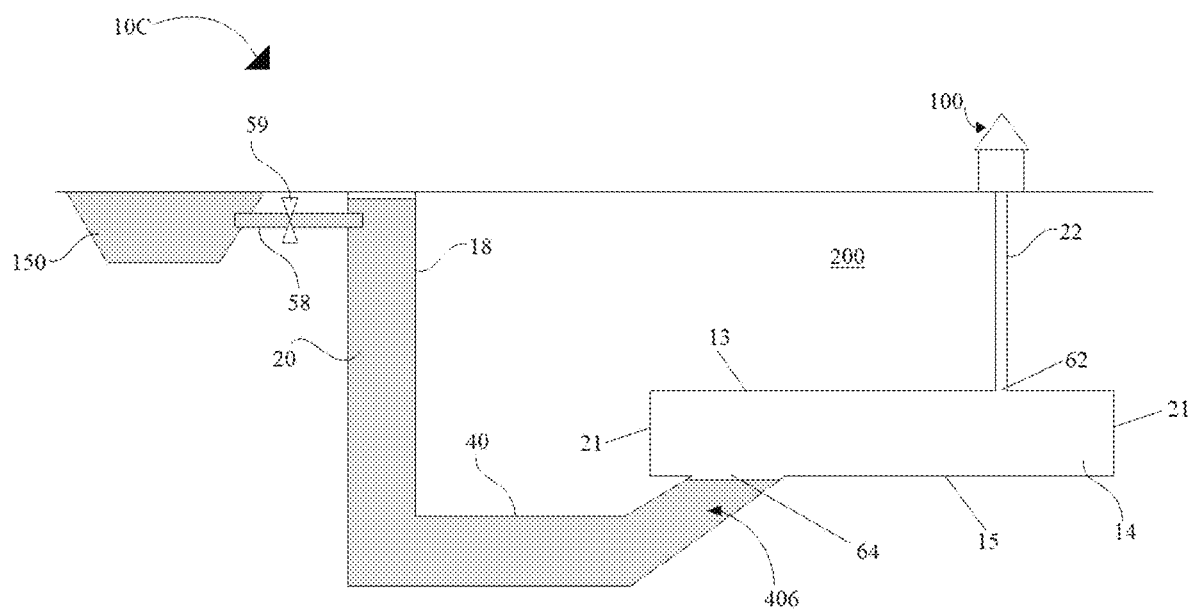
FIG. 4a is the system of FIG. 4 in a charged maintenance state.
Figure 5A:
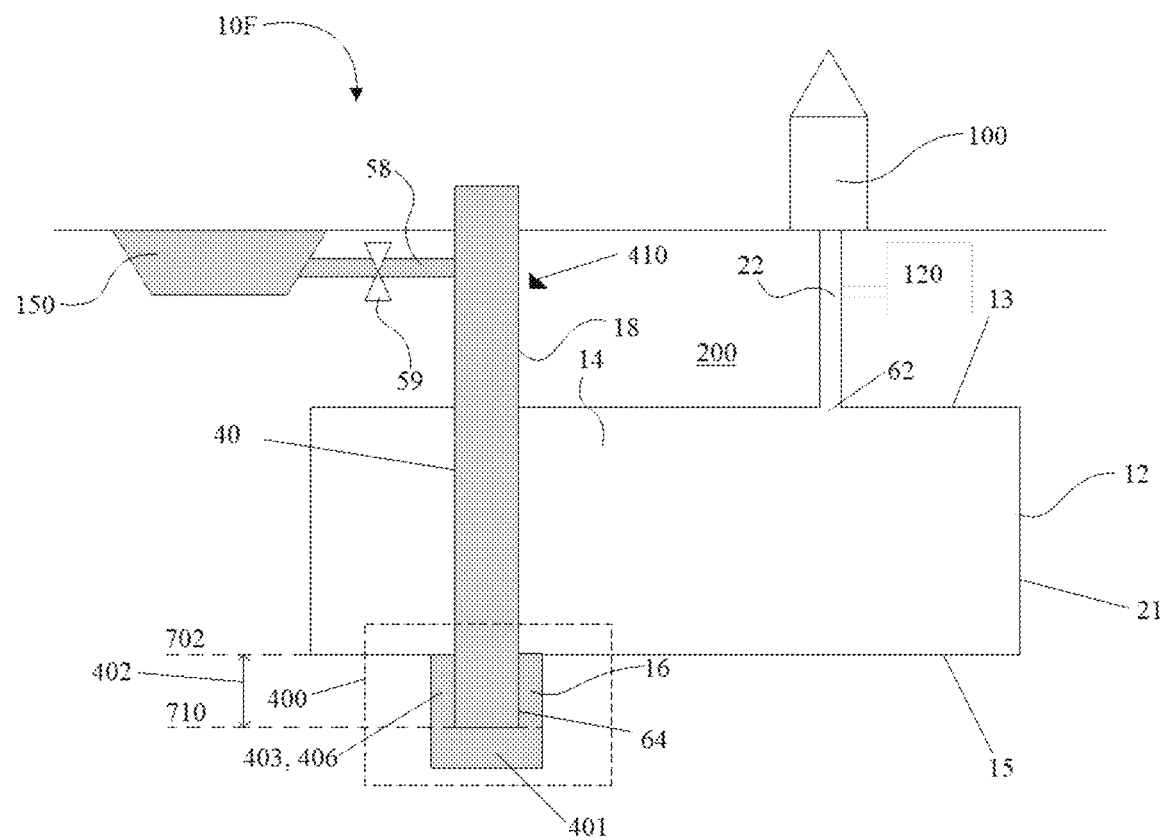
FIG. 5a is the system of FIG. 5 in a charged maintenance state.

Referring to FIG. 4a, the system 10C of FIG. 4 is shown in a charged maintenance state, in which compressed air has been conveyed from the compressor/expander subsystem 100 through the air conduit 22 and into the accumulator 12. As shown in FIG. 4a, this addition of compressed air to the accumulator 12 drives the layer of compensation liquid 16 within the accumulator 12 to drop below the lower wall 15 of the accumulator, such the inner surface of the side walls 21 and the upper wall 13 of the accumulator are exposed to the gas layer 14 in the accumulator and such that the buffer portion 406 of the overcharge buffer apparatus 400 is filled with compensation liquid. FIG. 5a similarly shows the system 10F of FIG. 5 in a charged maintenance state.

Optionally, the system may be configured in a discharged (water-filled) maintenance state. A discharged maintenance state may be entered/utilized if a visual inspection of the accumulator 12 is desired, and a heavier temporary maintenance apparatus or a submersible temporary maintenance apparatus is required for such inspection.

In some examples, the following steps may be performed during the discharged maintenance state.

The first step of one example of a discharged maintenance state may be to discharge the system to a pre-determined charge capacity, which may be a minimum charge. The steps required for complete discharging of the system may be substantially the same as entering the discharging mode described herein. It may be advantageous to discharge the system to its minimum capacity so that the air water interface, i.e. height 700, is at its highest operational level and as little of the accumulator 12 as possible is exposed.

By way of non-limiting example, during a discharged maintenance state, air may be forced out of the accumulator 12 such that the water/liquid level 16 within the accumulator rises, covering the at least a certain percentage of the surface area of each of the side walls 21 of the accumulator with water. In certain preferred embodiments, during a discharged maintenance state, the water level in the accumulator may be increased such that at least about 80% of the surface area of the accumulator side walls 21 is covered by water, or preferably at least about 90% of the surface area of the accumulator side walls 21 is covered by water. More preferably, during a discharged maintenance state, the water level 16 in the accumulator 12 may be increased so that the accumulator is substantially free of air and such that the about around 100% of the surface area of the accumulator side walls 21 covered with water and about around 100% of the surface area of the accumulator [ceiling] 13 is covered with water. The discharged maintenance state may be executed at or around the desired storage pressure of the accumulator.

When the system had been discharged to a desired level, and optionally completely discharged, a submersible vehicle equipped with an appropriate inspection tool may be deployed through either the air supply conduit 22 or the water supply/replenishment conduit 58, via a deployment work stage on a winch or other suitable apparatus. The tool may for example be a ROV or other water submersible sensor and may be used to conduct an inspection of the interior of the accumulator 12.

The system may then return to operating modes unless further maintenance is required.

Figure 4B:
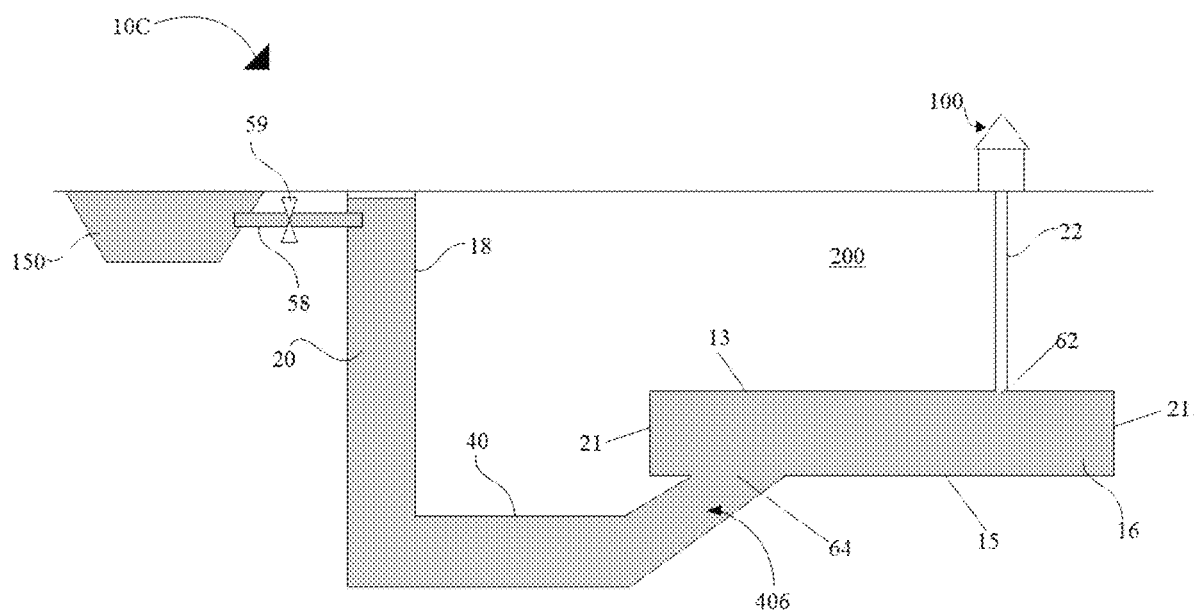
FIG. 4b is the system of FIG. 4 in a discharged maintenance state.
Figure 5B:
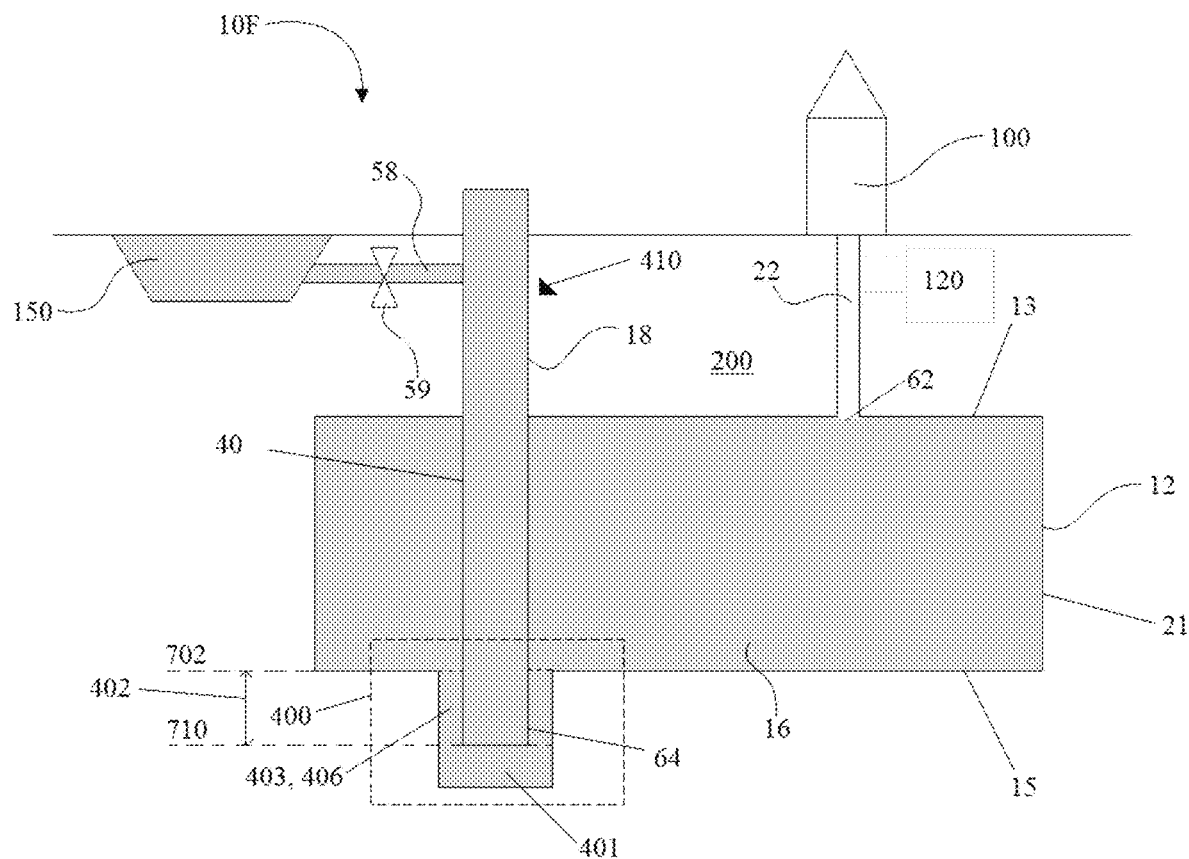
FIG. 5b is the system of FIG. 5 in a discharged maintenance state.

Referring to FIG. 4b, the system 10C of FIG. 4 is shown in a discharged state, in which liquid has been pumped from the source/sink 150 through the water supply/replenishment conduit 58 and into the accumulator 12. As shown in FIG. 6, this addition of water to the accumulator 12 drives the liquid layer 16 within the accumulator 12 to rise to the upper wall 13 of the accumulator, such the inner surface of the side walls 21 and the upper wall 13 of the accumulator are covered with the liquid layer 16 in the accumulator. As shown in FIG. 4b, during the discharged maintenance state, the gas layer 14 within the accumulator may be substantially eliminated. FIG. 5b similarly shows the system 10F of FIG. 5 in a discharged maintenance state.

A first/partial dewatering maintenance state may be entered if a visual inspection or maintenance of the portions of shaft 18 or a portion of the accumulator 12 is desired. The goal of this maintenance state is to facilitate human entry into the accumulator for visual inspection or minor works.

In some embodiments, the following steps may be performed during a partial dewatering maintenance state. The first step of the partial dewatering maintenance state may be to charge the system to a pre-determined, optionally maximum, charge capacity. The steps for complete charging of the system are the same as entering the charging mode. It may be advantageous to charge the system to its maximum capacity so that the air water interface (height 700, FIG. 4) is at its lowest operational level and as much of the water is displaced from the accumulator 12 as possible. Optionally, in some embodiments, the accumulator may be further charged to an overcharged state using the gas compressor/expander system 100 by conveying additional compressed air into the accumulator 12, thereby displacing additional compensation liquid from the compensation liquid flow path 410 into the water source/sink (i.e., compensation liquid reservoir) 150 until an interface between the layer of compensation liquid 16 and the layer of compressed air 14 is within the buffer portion 406 of the overcharge buffer apparatus 400. In certain preferred embodiments, the charging and/or overcharging of the system may be completed in less than about 24-48 hours.

When the system is completely, or at least sufficiently, charged, the flow control apparatus 59 may be closed to isolate the compensation water in the source/sink 150 from the water 20 in the shaft and from the rest of the system 10. Closing the isolation valve will not substantially affect the hydrostatic compensation acting on the accumulator 12 until depressurization begins. At this point, a residual amount of compensation liquid will be isolated within the compensation liquid flow path 410.

The main accumulator and thermal storage cavern (if included) can then be depressurized in accordance with the following steps.

The pressure of the accumulator 12 may then be reduced to about around atmospheric pressure, for example by venting gas from the compressed gas layer 14 within the accumulator through the air supply conduit 22. This can be done via a valve in the top-side plant on the air supply conduit 22. As the compressed gas layer 14 is released, water 20 from within the isolated shaft 18 may flow into and fill the accumulator.

Optionally, sump-pumps installed underneath the accumulator 12 may be turned on. This may help prevent liner failure during depressurization.

As the pressure in the accumulator 12 is reduced from the maximum storage pressure, the accumulator air water interface (height 700) will move from its lowest position until it eventually reaches a partial dewatering height. Once depressurization is complete the water will equilibrate at the partial dewatering height both in the accumulator 12 and in the shaft 18.

Having partially drained the water from the system, the sub-surface infrastructure may now be accessible above the partial dewatering height, and inspection or maintenance above the partial dewatering height can be performed.

Figure 4C:
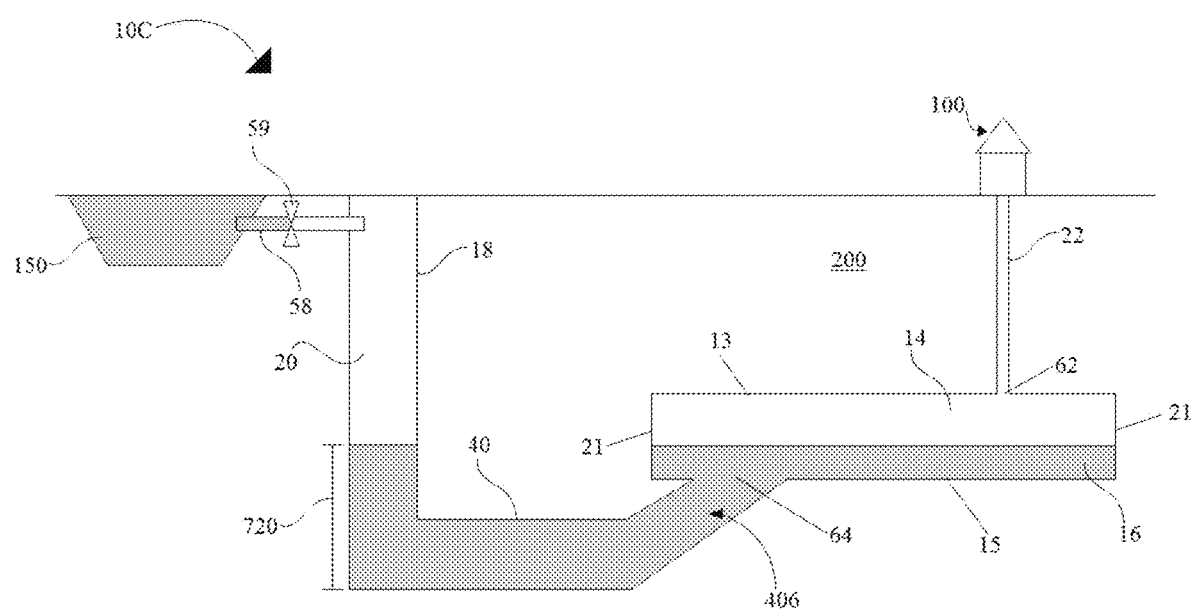
FIG. 4c is the system of FIG. 4 in a first dewatered maintenance state.

Referring to FIG. 4c, the system 10C of FIG. 4 is shown in a first/partially dewatered maintenance state. As shown in FIG. 4c, from charging mode, the flow control apparatus 59 is closed, isolating the water 20 in the shaft from source/sink 150. Once the water 20 in the shaft 18 is isolated, the gas layer 14 in the accumulator is allowed to vent to the atmosphere through the air supply conduit 22. This allows the accumulator 12 to depressurize to about atmospheric pressure and allows the water 20 in the shaft to flow into the accumulator until the liquid layer 16 in the accumulator reaches a desired partial dewatered height and the buffer portion 406 is filled with compensation liquid. In certain preferred embodiments, the liquid layer 16 may be at the desired partially dewatered height when at least 50% of the sidewalls 21 of the accumulator 12 are exposed above the layer of compensation liquid 16, or more preferably when at least 90% of the sidewalls 21 of the accumulator 12 are exposed above the layer of compensation liquid.

Figure 5C:
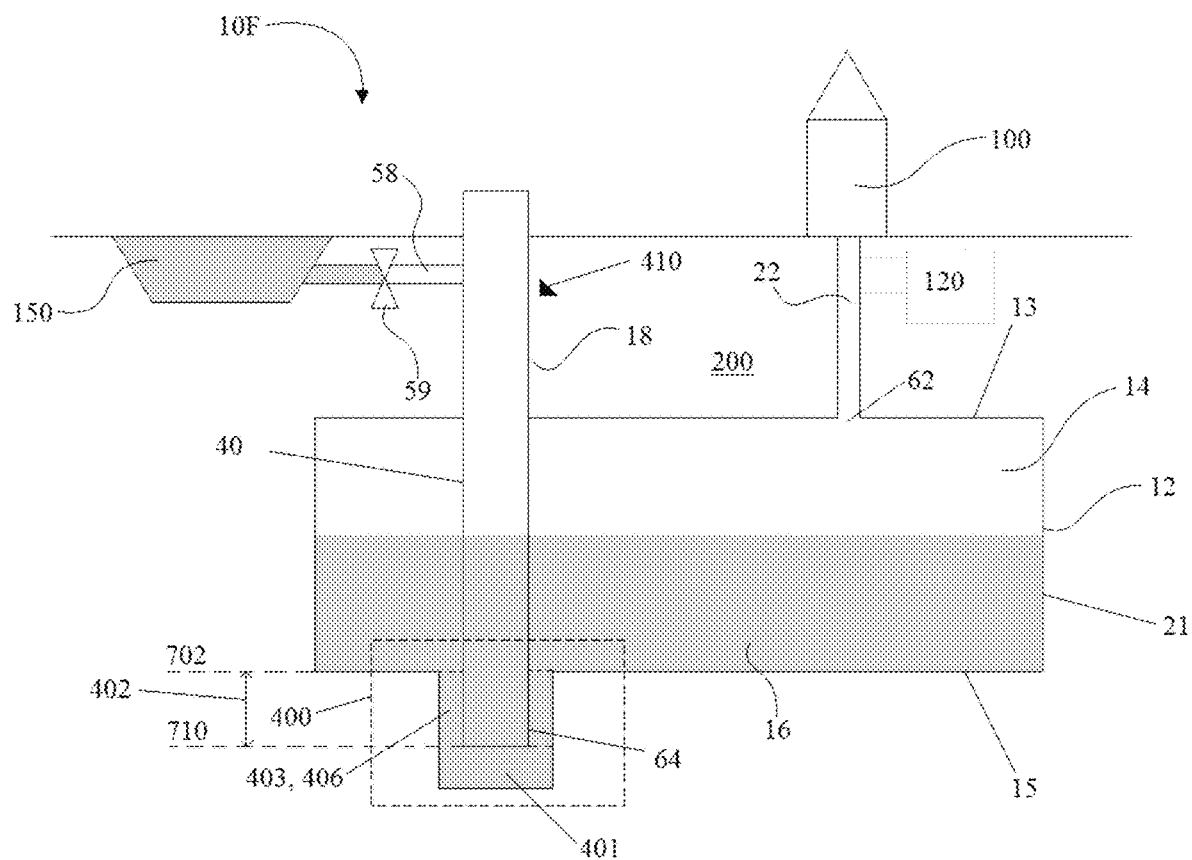
FIG. 5c is the system of FIG. 5 in a first dewatered maintenance state.
Figure 5D:
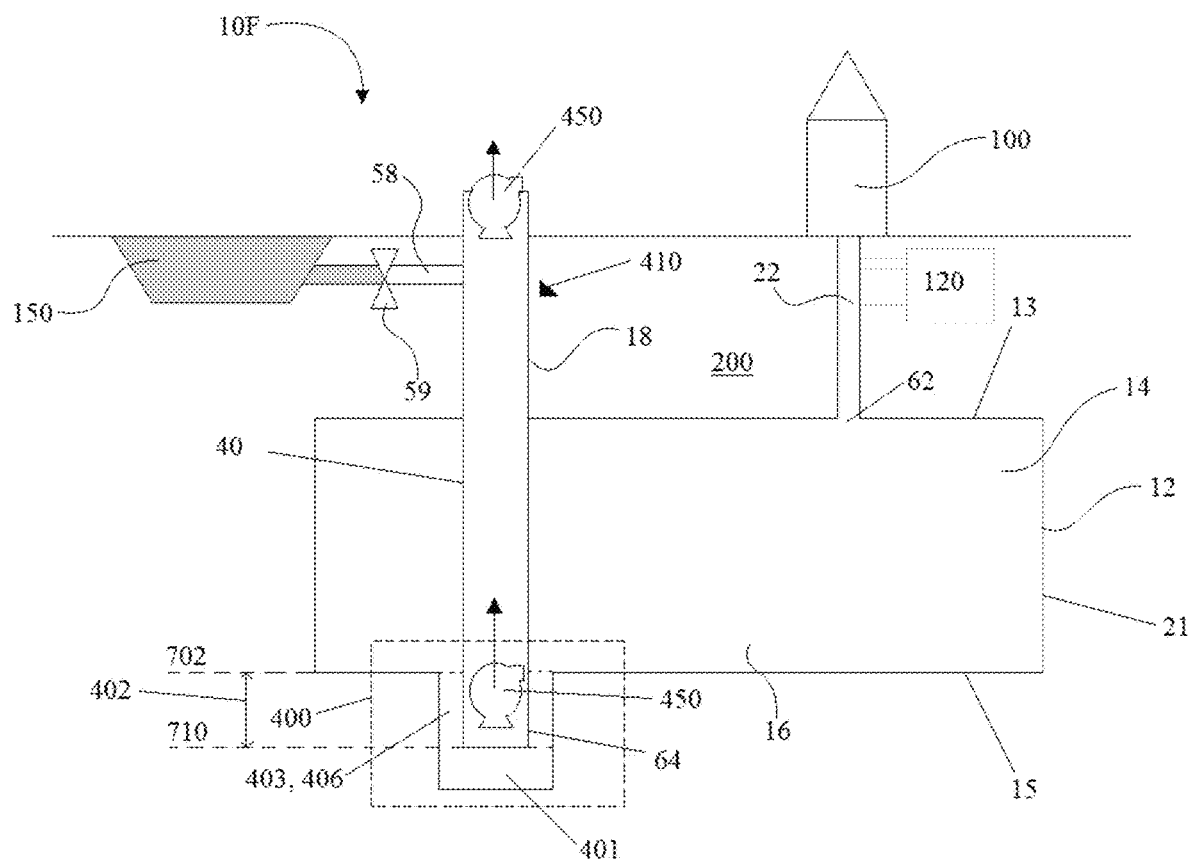
FIG. 5d is the system of FIG. 5 in a second dewatered maintenance state.

As shown in FIG. 4c when in the partially drained maintenance state at least a portion of the interior of the accumulator 12 may also be exposed, as the compensation liquid remaining in the system 10 may reach an equilibrium, which may be at least partially determined by the geometry of a given embodiment of the system 10. FIG. 5c similarly shows the system 10F of FIG. 5 in a partially drained maintenance state.

Optionally, the portions of the shaft/decline 18 may be inspected and maintained above the partial dewatering height. In some embodiments, the dispersion grates 760 can be moved or removed if necessary, and vehicle bridges may be installed over the rock catchments 748 when traveling down the shaft 18. Preferably the dispersion grates 760 can function as the vehicle bridges.

For systems where there is an access manway (see e.g., FIG. 8]), third branch 712c, to the accumulator 12 installed from the access drift 712, access to the accumulator 12 above the partial dewatering height can be obtained. In some arrangements, compensation water may have to be removed from the third branch 712c before access to the accumulator 12 can be obtained. This can be achieved by pumping the water into the decline 18 via a permanent or temporary section of piping, or by releasing the access hatch while the access manway (third branch 712c) is still flooded and allowing the water to drain directly into the accumulator 12 via gravity. Access to the accumulator 12 may allow inspection of the air supply conduit 22, gas plenum 774, as well as the liner and sensors above the partial dewatering height and optionally other features.

Optionally, portions of the system that are below the partially dewatered height, and therefore still submerged when in the partially drained maintenance state may be accessed via a submersible ROV or AUV that can be introduced into parts of the shaft 18. The use of an ROV from the partial dewatering height rather than from the surface (for example as could be done during charged maintenance state) may be advantageous as it may allow a shorter connection/control cable can be used. Dispersion grates 760 below the partial dewatering heights may optionally have passageways defined in them that are of a sufficient size for an ROV or AUV to pass through without requiring the grates 760 to be removed.

For systems where the thermal storage cavern 615 is located above the partial dewatering height (see FIGS. 8-14), immediate access to the thermal storage cavern 615 can be obtained. For systems where the thermal storage cavern is located below the partial dewatering height (see FIG. 7), water from the access drift 712 may have to be pumped into the decline 18 before access to the thermal storage cavern 615 can be obtained. This can be achieved by connecting a pump to a permanent or temporary section of piping. For systems where a manway/hatch is installed in the barrier 714, the manway will be used for cavern access. For systems where no manway is installed, the barrier 714 may be destroyed for cavern access, and rebuilt once maintenance is complete.

Similarly, once maintenance is complete the dispersion grates may be reinstalled if needed, and the vehicle bridges may be removed from the rock catchments when travelling up the decline if applicable. With maintenance complete, the isolation valve or flow control apparatus can now be opened, allowing the system to reflood and the accumulator 12 to reach its operational hydrostatic pressure. The system may now return to operating modes.

In some circumstances, it may be desirable to configure the system in a second dewatered maintenance state, that is, a completely drained or full dewatered maintenance state. The following steps may be performed to obtain a second/full dewatering maintenance state.

As a first step, the system can be configured in the first/partial dewatering mode, for example in accordance with the procedure described herein. In this configuration, the shaft 18 can now be accessed above the partial dewatering height. Water can then be pumped out of the lower portions of the shaft 18 using a dewatering pumping apparatus 450 and optionally conveyed to the source/sink 150, etc. Any suitable pumping technique may be used such as a mobile pumping station in the shaft 18, or a downhole pump in a dewatering borehole. For systems where the thermal storage cavern 615 is located below the partial dewatering height (FIG. 7), water from the access drift 712 may also be pumped out to the compensation reservoir 800. One advantage to this embodiment may be that the pumping can take place at a relatively faster rate and with relatively less power than if pumping occurred after depressurization.

Figure 4D:
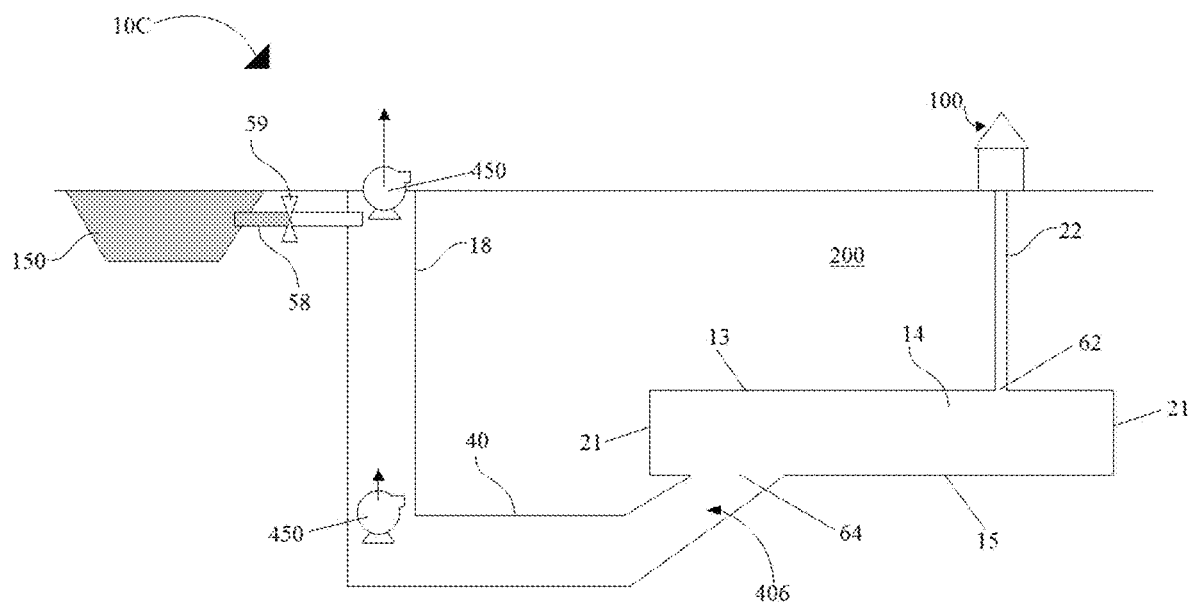
FIG. 4d is the system of FIG. 5 in a second dewatered maintenance state.

Referring to FIG. 4d, the system 10C of FIG. 4 is shown in a second dewatered maintenance state. As shown in FIG. 4d, from a first/partially dewatered maintenance state, a dewatering pumping apparatus 450 may be used to pump any excess water/compensation liquid 20 out of the shaft 18. In certain embodiments, the dewatering pumping apparatus 450 may include a pump that is located above ground. In other embodiments, the dewatering pumping apparatus 450 may include a pump that is disposed within at least one of the accumulators 12 and the overcharge buffer apparatus 400.

As shown in FIG. 4d, when in the second dewatered maintenance state substantially all of the interior of the accumulator 12 may be exposed and the buffer portion 406 and lower flow portion 401 of the overcharge buffer apparatus 400 may be substantially free of compensation liquid. FIG. 5c similarly shows the system 10F of FIG. 5 in a first/partially drained maintenance state.

When the system is drained, substantially the entire system may be inspected and maintained as descried. For systems where a manway is installed in the barrier 714, the manway may be used for cavern access. For systems where no manway is installed, the barrier 714 may be destroyed for cavern access, and rebuilt once maintenance is complete.

Similarly, once maintenance is complete the dispersion grates may be reinstalled if needed, and the vehicle bridges may be removed from the rock catchments when travelling up the decline if applicable. With maintenance complete, the isolation valve or flow control apparatus can now be opened, allowing the system to reflood and the accumulator 12 to reach its operational hydrostatic pressure. The system may now return to operating modes.

In certain preferred embodiments, the step of pumping out at least a portion of the residual amount of compensation liquid from the system 10 may be completed in a pumping time of between about 1 and about 30 days.

Optionally, the systems disclosed herein may include a thermal storage apparatus 120 (see FIGS. 4, 5). The thermal storage system 120 may be disposed at a higher elevation than the accumulator 12, as show using dashed lines in FIGS. 4 and 5, or at a lower elevation than the accumulator as shown in FIG. 7.

The thermal storage apparatus 120 can include a chamber 615 (as described herein) and a liquid inlet/outlet passage 660 that can be connected to the other aspects of the thermal storage apparatuses 120 described herein. Optionally, the chamber 615 may be connected to the shaft 18 via an access drift 712. The access drift 712 can be formed as part of the manufacturing process of the system 10C. For example, the shaft 18 may be excavated during construction of the system 10C (or other systems described herein) and other portions of the system 10C may be accessed via the shaft 18. In such embodiments, the access drift 712 can be excavated as a means to reach and excavate the chamber 615. That is, debris from the excavation of the chamber 615 can be transported away via the access drift 712 and shaft 18 for disposal. When construction of the chamber 615 is complete, the chamber 615 can be at least partially fluidly isolated from the shaft 18 by providing any suitable seal or barrier, such as barrier 714. The barrier 714 can allow some liquid flow (for example where the cold thermal storage liquid contained in the chamber 615 is intended to mix with the water in the shaft 18) or may be substantially liquid impermeable.

Optionally, the barrier 714 can be openable, or may contain an openable portion, to allow access into the chamber 615, via the access drift 712, when the barrier 714 is exposed (i.e. not submerged) during construction and maintenance states.

When the system 10C is in use, the access drift 712 may be submerged and may fill with water and may remain submerged, and therefor relatively difficult to access. Optionally, the access drift 712 may be configured, along with other portions of the system 10C, such that it may be partially exposed and/or accessible when the system 10C is configured in the partially drained mode as shown in FIG. 7. Optionally, the access drift 712 and shaft 18 can be configured so that the end 716 of the access drift 712 that is in communication with the shaft 18 is located at an elevation that is above the pre-determined water level when the system 10C is in the partially drained maintenance state. That is, end 716 of the access drifts 712 may spaced above the surface of the water in the shaft 18 by an offset distance 718. In this configuration, the water level when in the partially drained operating mode (i.e. when at height 720) will be below the end 716 of the access drift 712. In this arrangement, water that is trapped in the access drift 712 when the shaft 18 is drained, such as the water shown in FIG. 7, may be pumped out of the access drift 712 and into the shaft 18 to drain the access drift 712 and provide access to the barrier 714.

Pumping the water from of the access drift 712 into the shaft 18 may cause the water level to rise, such that the surface of the water reaches a new equilibrium level and moves from the height 720 to the height 720A, shown using dashed lines in FIG. 7. Preferably, the offset height 718 is selected so that the volume in the shaft 18 in the region defined by height 718 is greater than the volume of the access drift 712. In this configuration, pumping the contents of the access drift 712 will raise the water level to a position (i.e. height 720A) that is still below the end 716 of the access drift 712, which may help prevent water from flowing back into the access drift 712. That is, the difference between heights 720 and 720A is preferably less than the offset height 718.

Figure 8:
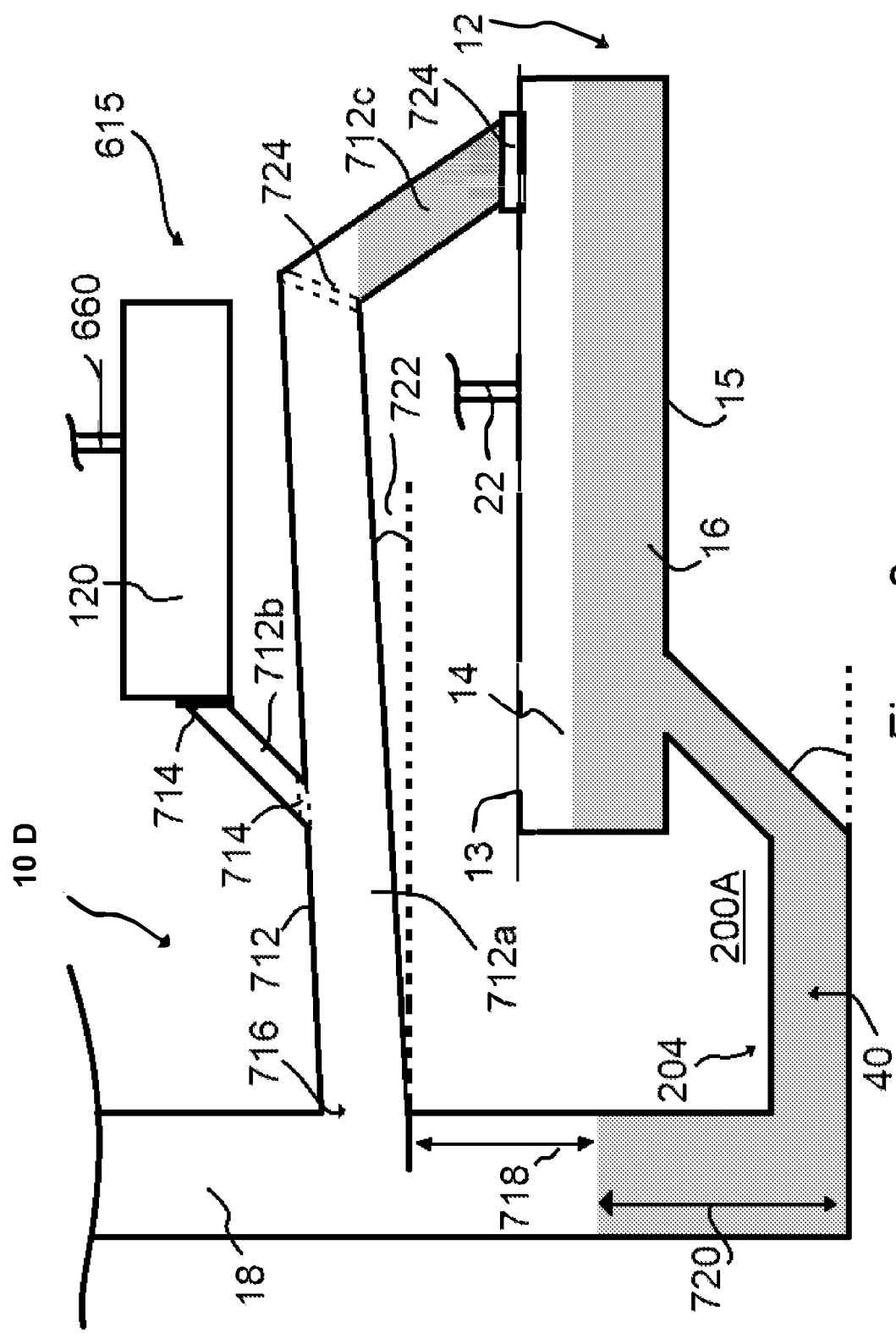
FIG. 8 is a schematic representation of another example of a hydrostatically compressed gas energy storage system in a partially drained/dewatered configuration.

Referring to FIG. 8, another schematic example of a hydrostatically compensated compressed gas energy storage system 10D, having an accumulator 12, a shaft 18, a partition in the form of projection 200A, a liquid supply conduit 40 that includes the flow channel that passes beneath the projection 200A, is shown and also includes a thermal storage apparatus 120 having a chamber 615 that is at a higher elevation than the accumulator 12. The system 10D is generally analogous to the other systems described herein, and like features are identified using like reference characters.

In this embodiment, the access drift 712 extending from the shaft 18 to the chamber 615 is above the equilibrium water level when the system 10D is in the partially drained maintenance state as shown and is spaced above the equilibrium level by the offset height 718. In this configuration, when the system 10D is in use, the access drift 712 is submerged and filled with water. When the water level in the shaft falls below the end 716 of the access drift 712 water from the access drift 712 may tend to drain into the shaft 18 under the influence of gravity. In the illustrated example, the access drift 712 is inclined at a slight drift angle 722, which may help the water drain from the access drift 712. The drift angle 722 that may be between about 0 degrees and about 12 degrees, or more. In some embodiments, the drift grade may be between about 15% to about 20%, which may lead to a drift angle of between about 8 degrees and about 12 degrees.

Alternatively, or in addition to sloping at least some of the access drift 712 toward the shaft 18, water may be selectably pumped out of the access drift 712 and into the shaft 18 (or other suitable location) if desired.

Optionally, the access drift 712 may be configured as one generally contiguous passage, as shown in FIG. 7, or may include one or more branches. For example, referring to the embodiment of FIG. 8, the access drift 712 may have a first branch 712*a* in communication with the shaft 18 and a second branch 712*b* extending from the first branch 712 to the chamber 615. In this example, the barrier 714 may be provided at the interface between the chamber 615 and the second branch 712*b*, as shown using solid lines in FIG. 8. Alternatively, the barrier 714 may be positioned at the interface between the first branch 712*a* and second branch 712*b*, as shown using dashed lines in FIG. 8, whereby the interior of the second branch 712*b* may be in fluid communication with the interior of the chamber 615 while still isolating the chamber 615 from the shaft 18. In other embodiments, the barrier 714 may be positioned somewhere along the length of the second branch 712*b*.

Optionally, the access drift 712 may include a third branch 712*c* (or more) that can extend from the first branch 712 to any other suitable location within the system 10D, such as, for example to the accumulator 12. Preferably, the third branch 712*c* can be connected to a high point of the upper surface 13 of the accumulator 12 or some other portion of the accumulator 12 that is expected to be exposed when the water in its partially drained equilibrium position. In this arrangement, draining the access drift 712 may help facilitate access to the access drift 712 itself, the chamber 615 and the accumulator 12 while the system is in the partially drained configuration and without requiring completely draining the system. A barrier 724 may be provided at the interface between the third branch 712c and the accumulator 12 to isolate the access drift 712 from the accumulator 12 while the system is in use. The barrier 724 may be openable or include an openable portion such as a door or hatch, that can be opened when the system is in a maintenance state.

As the access drift 712, and particularly first branch 712a and end 716 may be positioned above the accumulator 12 (as illustrated), and as the first branch 712a may tend to be generally inclined upwardly from the end 716, as least some portion, e.g. the third branch 712c, of the access drift 712 may be arranged to extend downwardly from the first branch 712a to the accumulator 12. As illustrated in FIG. 8, the third branch 712c may not drain in to the shaft 18 as the water level falls below the end 716. In such configurations, water from the third branch 712c may be pumped into the first branch 712a and allowed to drain into the shaft 18. Alternatively, water from the third branch 712c may be released directly into the accumulator 12, for example by opening a port or hatch in the barrier Preferably, the system 10D is configured with an offset height 718 (and the resulting available volume in the shaft 18) that is large enough so that if the water from all of the branches of the access drift 712 is drained into the shaft 18 the water level in the shaft 18 will not reach the end 716 of the access drift 712.

Alternatively, as shown using dashed lines in FIG. 8, the barrier 724 may be positioned at the interface between the first branch 712a and third branch 712c. In such configuration, the third branch 712c may not be filled with water while the system 10D is in use (i.e. may for part of the gas filled interior of the accumulator 12) and may not require further draining when in the partially drained operating mode. In other embodiments, the barrier 724 may be positioned somewhere along the length of the third branch 712c and may require draining of only the section of the third branch 712c above the barrier 724.

Providing a generally continuous passageway (i.e. access drift 712) from a location in shaft 18 above the partially drained mode equilibrium water level (i.e. the end 716 of access drift 712) to a portion of the accumulator 12 that is exposed when in the partially drained mode may help facilitate access to the interior of the accumulator 12 while the system is in the partially drained mode, and without requiring the liquid supply conduit 40 to be drained.

Referring to FIGS. 9-14, embodiment of hydrostatically compensated compressed gas energy storage system 10E is illustrated. The system 10E is generally analogous to the systems 10A-10D described herein, and like features are identified using like reference characters. Various aspects of the system 10E are described herein, along with some examples of possible/preferred processes for constructing the system 10E.

Figure 9:
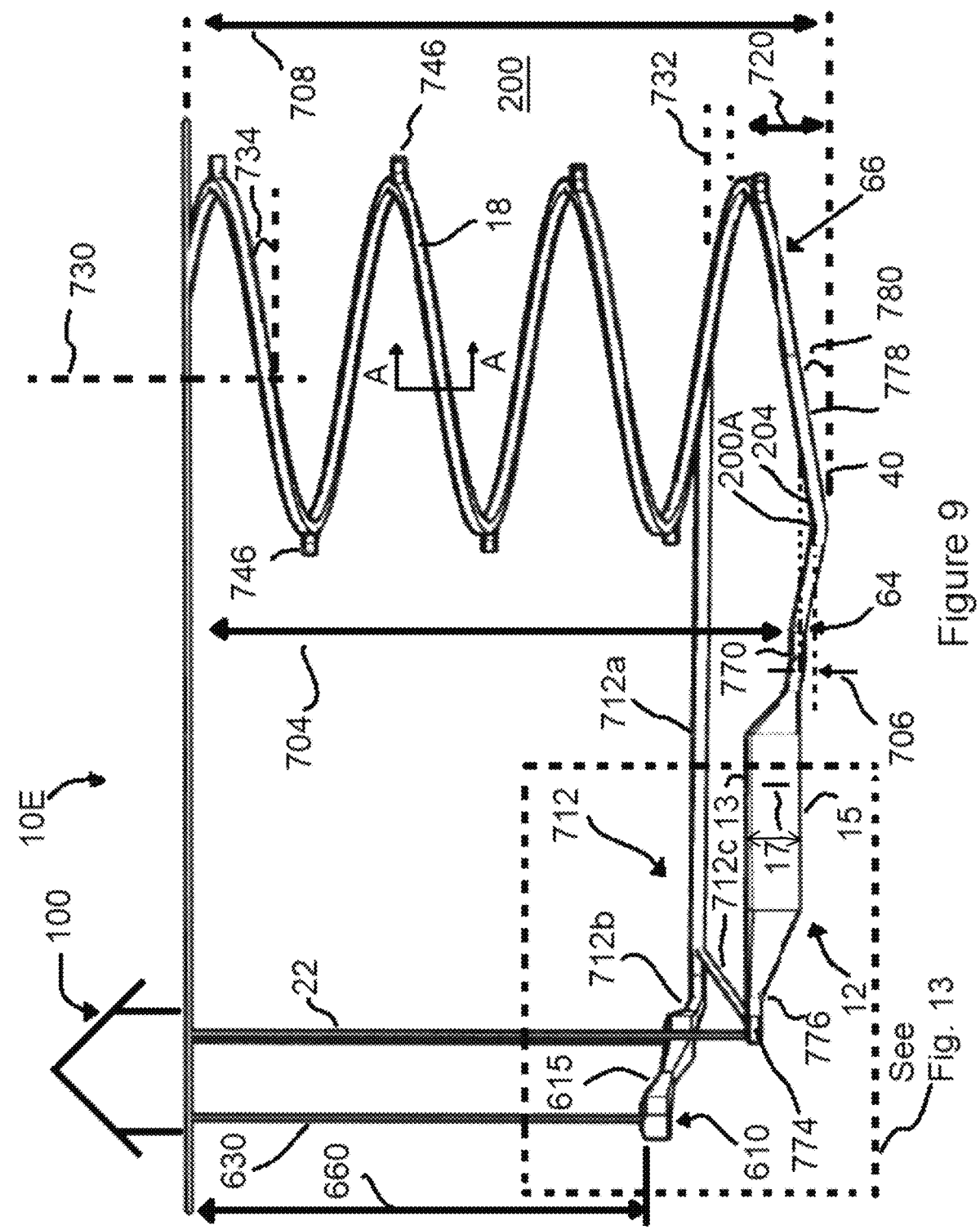
FIG. 9 is a side view of another example of a hydrostatically compressed gas energy storage system.
Figure 10:
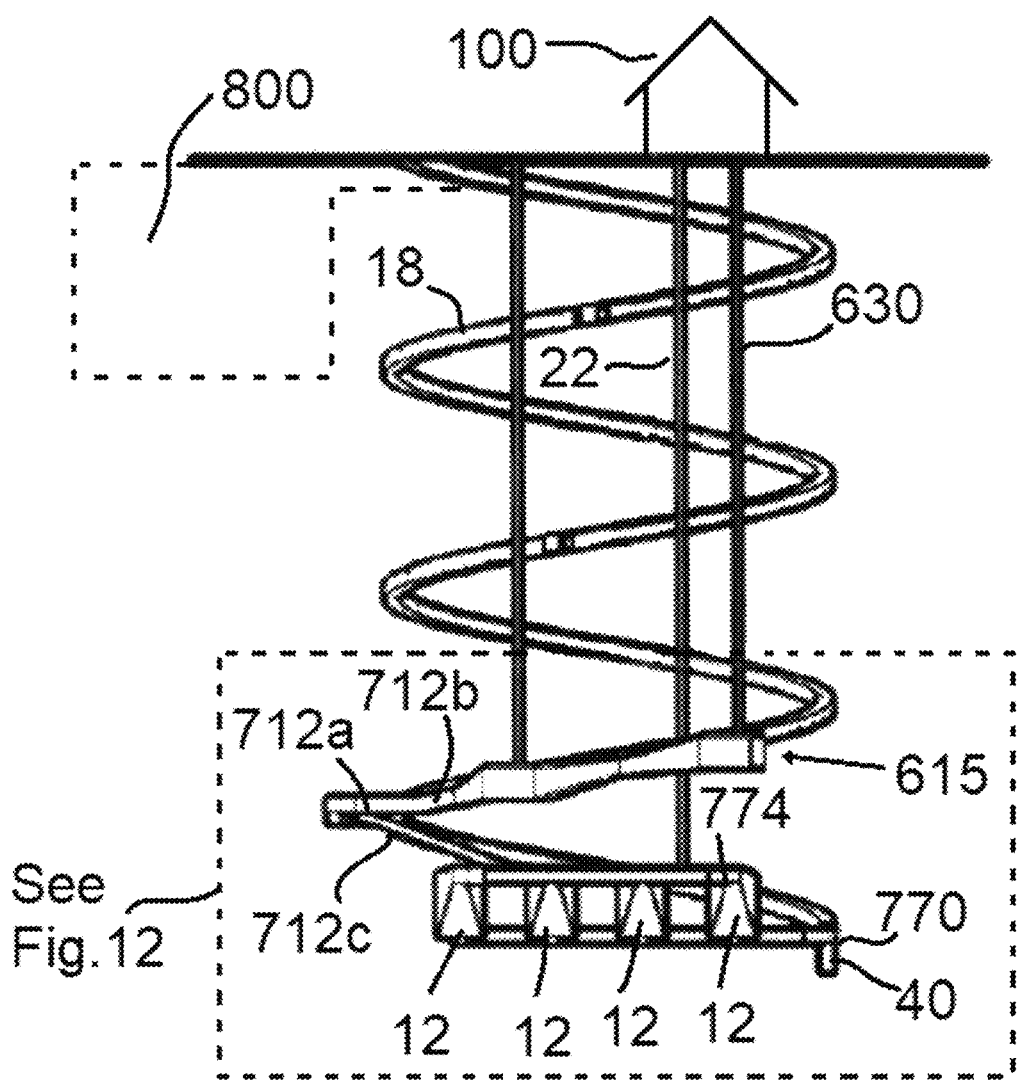
FIG. 10 is an end view of the system of FIG. 9.
Figure 11:
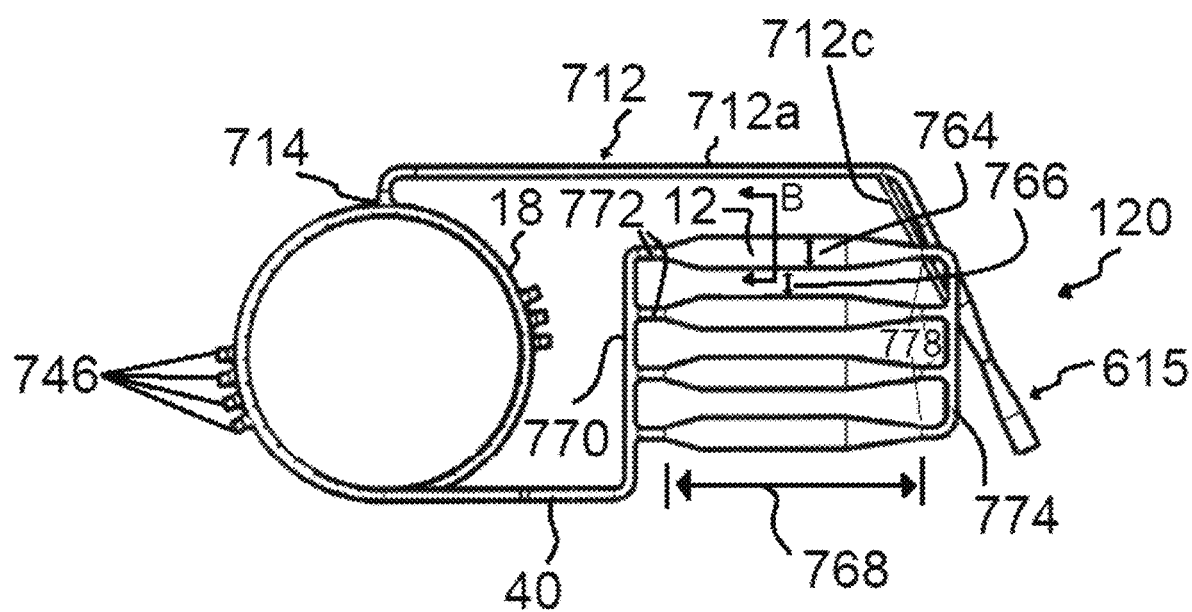
FIG. 11 is a bottom view of the system of FIG. 9.

Referring to FIG. 9, a side elevation view of the system 10E shows the location of an accumulator 12 that is positioned underground 200, and a shaft/decline 18 that is provided in the form of a generally downwardly spiraling decline that winds around a decline axis 730. FIG. 10 shows and end view of the shaft 18, the accumulator 12 and the thermal cavern 615, and FIG. 11 is a bottom plan view of the system 10E (i.e. looking upwardly) showing a bottom plan view of the shaft 18, the accumulator 12 and the thermal cavern 615.

In this embodiment, the shaft 18 can provide at least two different functions. When the system 10E is under construction and/or is at least partially drained in a maintenance state, the decline 18 is configured to operate as an access road that is suitable to allow the travel of human operators, vehicles (such as trucks, excavators, etc.) and other equipment that may be utilized in the construction or maintenance of the shaft 18 or other system components (such as the access drift 712, accumulator 12, thermal storage system 120, fluid conduit 40 and the like). For example, the shaft 18 may be excavated to the level in which the shaft 18 meets the access drift 712, represented by plane 732 in FIG. 9. At this position, work can proceed on excavating the access drift 712 (including its multiple branches) and optionally on excavating the chamber 615 that can contain the thermal storage reservoir 610 and other portions of the thermal storage apparatus 120. The shaft 18 can also, preferably simultaneously, be further excavated to its lowest elevation, at which point portions of the fluid conduit 40 can be formed as well as excavating the earth to define a projection 200A to serve as the partition between the shaft 18 and the accumulator 12. The accumulator 12 can then also be excavated, with the excavated material being carried up the shaft 18 to the surface for disposal.

When the system 10E is in operational modes, the shaft 18 may be flooded with water, and may function as the shaft 18 described herein, that can help hydrostatically compensate the accumulator 12. To maintain the system 10E, water can be drained from the shaft 18 and it can again function as a roadway or passage for carrying people and equipment.

Because it is used for multiple purposes, the configuration of the shaft 18 may include some features that are useful for is construction and maintenance use that may not be required for a shaft design that is not used for construction or maintenance access. For example, the shaft 18 may be declined at a shaft angle 734 that is selected based on the acceptable grade that is traversable by the vehicles and equipment used during construction/maintenance. The average shaft angle 734 may be 6°-12°. In contrast, a shaft 18 that was only intended to be used for the conveyance of fluids may not be limited to such angles, and may, for example, be relatively steeper.

Figure 16:
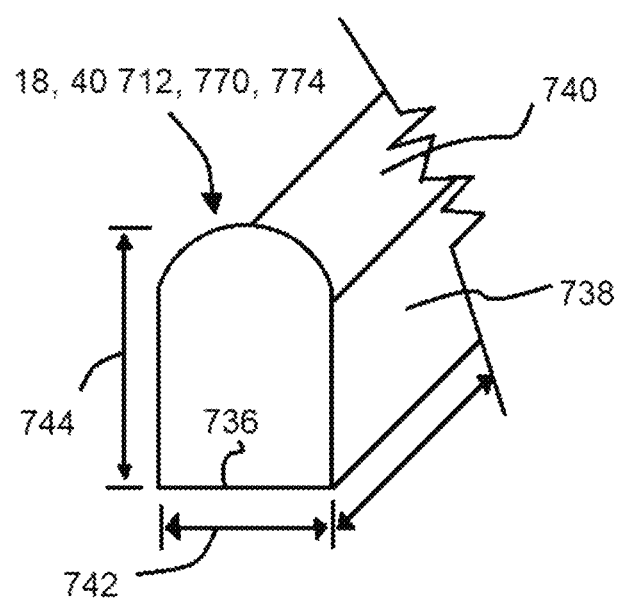
FIG. 16 is a schematic cross-sectional representation of one example of portions of the system of FIG. 9.

Similarly, the shaft 18 in this embodiment may be configured to have a generally flat bottom (i.e. lower surface) that is suitable for vehicles to drive on, and a sufficiently large cross-sectional area to help facilitate for the transportation of heavy equipment, optionally in two directions simultaneously, and removed material in and out of the shaft 18. The sidewalls of the shaft 18 may be generally upright to help provide sufficient height/clearance for construction vehicles, and the roof may be flat, arched or have any suitable shape. Referring also to FIG. 16, a representative cross-sectional view of the shaft 18 (as if taken along line A-A in FIG. 9) shows one example in which the shaft 18 has a generally flat lower wall 736, generally vertical sidewalls 738 and an arched upper wall 740. The shaft 18 has a width 742 and a height 744 that is sufficient to accommodate construction vehicles. Both the width 742 and height 744 may be between 3 m and about 12 m or more, and preferably may be between about 5 m and about 8 m and may each be about 6 m in some embodiments.

Optionally, the shaft 18 may include one or more turnarounds spaced along its length. The turnarounds 746 (FIG. 9) can be sized to accommodate the expected construction vehicles and can allow vehicles to pull out of the main shaft 18 to allow another vehicle to pass and/or to turn around and change direction. Optionally, the turnarounds 746 may be spaced approximately every 30-60 m of depth of the shaft 18 to allow for vehicles to turnaround a portion of the distance along the shaft 18.

A shaft configured solely for fluid use need not have such a configuration and could instead have a round cross-sectional area.

Similarly, some of the features of the shaft 18 may be selected based on its intended use as system hydrostatic compensation line are and may not be required in a conventional underground roadway.

For example, the walls 736, 378 and/or 740 may be constructed to be smoother than would be required for a typical mine access road, as providing smooth walls may help facilitate water flow within the shaft 18 when flooded.

Similarly, the shaft 18 may include one or more debris catchments that are positioned along its length. When water is flowing down the shaft 18, rocks and other debris may be carried down the shaft 18 with the water. Being denser than water, most such debris may slide/roll along the lower wall 736 of the shaft 18 and may generally travel downwardly within the shaft 18, toward the liquid supply conduit 40 and the accumulator 12. If sufficient debris accumulates in the liquid supply conduit it may affect operation of the system 10E. To help inhibit the movement of such debris, the lower wall 736 of the shaft 18 may include one or more recessed debris catchments, two examples of which are schematically illustrated in FIGS. 19 and 20. In FIG. 19, the debris catchment 748 includes a generally flat, declined surface that helps define a catchment interior 750 that can receive and at least temporarily contain rocks 752 that are travelling down the lower wall 736 in a downward flow direction, indicated via arrow 754. Rocks 752 that have accumulated in the catchment interior 750 can be cleared out when the shaft 18 is drained for maintenance. The debris catchment 748 in FIG. 20 has an analogous function and includes a generally curved lower wall bounding the catchment interior 750 instead of an inclined linear surface. In both embodiments, the catchment interior 750 is recessed below the level lower wall 736 driving surface within the shaft 18. Multiple debris catchments 748 can be spaced apart from each other along the length of the shaft 18.

In some configurations, the debris catchments 748 may be configured such that they can be traversed by construction vehicles. Alternatively, the debris catchments 748 may be generally impassible by construction vehicles (i.e. may be too deep, have steep angles of approach, etc.). In such embodiments, the debris catchments 748 may be formed after construction of the rest of the system 10E is substantially complete, such that the debris catchments 748 may be formed as the construction vehicles exit the shaft 18 for the last time, leaving the shaft 18 generally impassible. To allow vehicles to traverse the shaft 18 during maintenance, the debris catchments 748 may be filled in or otherwise covered to accommodate vehicle traffic.

Alternatively, as shown in some of the schematic examples, the shaft used in combination with system 10E may be a generally vertical. In such embodiments, hoists or other such infrastructure may be provided to help transport people and equipment from the surface and into the shaft. A generally vertical shaft of this nature may be advantageous for brownfield/retrofit-type projects in which the embodiments of the systems described herein may make use of an existing vertical mineshaft, or for projects where faster excavation rates and/or construction time are desired.

Preferably, the beginning of the decline/shaft 18 construction may be performed at the same time as the source/sink 150 construction for some projects, such as closed loop projects utilizing a purpose-built reservoir, as described herein. This may be advantageous for the purpose of reducing overall construction time, as well as for providing a dewatering reservoir to pump groundwater ingress once the construction of the shaft 18 is below the level of the water table.

Figure 15:
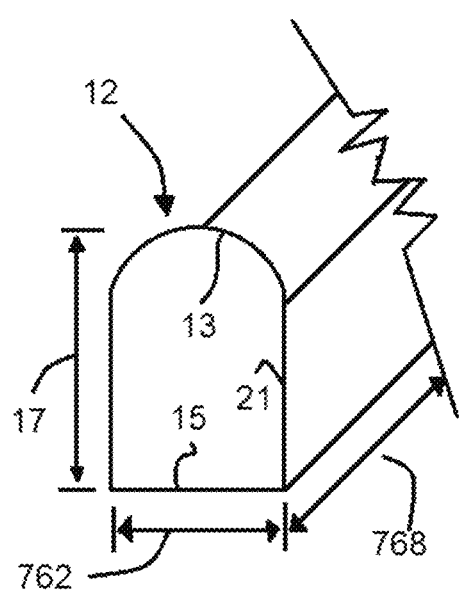
FIG. 15 is a schematic cross-sectional representation of one example of a portion of the system of FIG. 9.

Optionally, as shown in FIGS. 10 and 11, the system 10E may include two or more accumulators 12, each of which may have the features and operation as described herein. In this embodiment, the system 10E includes four accumulators 12 that are generally arranged in parallel with each other but could have another configuration. In this embodiment, each accumulator has a width 764 (FIG. 11) and adjacent accumulators 12 are separated from each other by a spacing distance 766. Referring also to FIG. 15 which shows a schematic cross-section of an accumulator 12 (as if taken along line B-B in FIG. 11), the upper wall 13 is generally curved in this embodiment, while the lower wall 15 and sidewalls 21 are generally flat. The width 762 and accumulator height 17, along with the accumulator length 768, may be any suitable dimensions, allowed by the geotechnical condition, to provide an accumulator 12 having a desired internal volume. In the illustrated example, the width 762 may be between about 10 m and about 40 m or more, and may be between about 15 m and about 30 m, and may be about 20 m. The height 17 may, in this example, be between about 10 m and about 50 m or more, and may be between about 20 m and about 40 m, and may be about 30 m. The length 764 may be between about 50 m and about 1000 m in some embodiments, and preferably may be between about 150 m and about 400 m.

Optionally, multiple accumulators 12 used within a single system may be fluidly connected to the shaft 18 in parallel. This may help ensure that the hydrostatic pressure compensating each accumulator 12 is substantially equal.

Referring to FIG. 11, in the illustrated example the system 10E includes a liquid plenum 770 that is downstream from the projection 200A and in fluid communication with the interior end 64 of the liquid supply conduit 40. Each accumulator 12 then includes a liquid port 772 that is in communication with the plenum 770. Alternatively, a separate liquid supply conduit 40 may be provided between the shaft 18 and each of the accumulators 12.

Similarly, the gas layers 14 within each accumulator 12 may be connected to a common gas supply line 22 and may be fluidly in parallel with each other. This may help ensure that the gas pressure in each accumulator 12 is substantially equal. In the present embodiment, the system 10E includes a gas plenum 774 that is connected to a gas port 776 provided toward the upper side of each accumulator 12 (and preferably at an opposing end from the liquid ports 774). The lower end of the gas supply conduit 22 is in communication with the gas plenum 774. Alternatively, a separate gas supply conduit 22 or a separate branch of gas conduit 22 may be provided for each accumulator 12.

Optionally, the liquid plenum 770 and gas plenum 774 can be sized to accommodate humans and/or vehicles, and may serve as access ways during construction and/or maintenance activities Referring to FIG. 9, in the present embodiment the liquid supply conduit 40 and projection 200A co-operate to define the water-trap like region that helps facilitate the hydrostatic compensation of the accumulators 12. As explained herein, the arrangement of these features can provide a water-trap that helps reduce the likelihood of overcharging of the system 10E. In some examples, this water-trap region can be formed when the shaft 18 has reached the desired depth during the construction phase.

As described previously, the maximum depth of the fluid supply conduit 40/water trap 708 shown in FIG. 9 helps determine the pressure which the accumulator 12 can reach for an overcharging of the system to occur. The depth 704 of the accumulator water surface when the accumulator 12 is fully charged helps define the maximum operating pressure of the system. The height 706 of the projection 200A defines the effective height of the water trap and is preferably selected to be sufficiently large such that the overcharge pressure is sufficiently higher than the maximum operating pressure of the accumulator such that a pressure release valve or the like can be set in the pressure between the maximum operating pressure and the overcharge pressure, i.e. to release the system pressure before an overcharge event occurs, with a sufficient tolerance. For example, the difference between the operating pressure and the overcharge pressure in the illustrated embodiment may be between about 10 kPa-500 kPa (about 1-50 m of height), and preferably may be between about 100-200 kPa (about 10-20 m of height).

Similar to the considerations described in relation to the shaft 18, the fluid supply conduit 40 that helps form the water trap can be configured to have a generally have a flat bottom surface 778, a trap inclination angle 780 that provides a sufficiently low grade to accommodate vehicle traffic, and a sufficiently large cross-sectional area to allow for the transportation of heavy equipment and removed material in and out of the system.

Preferably, the liquid flow conduit 40 will also have relatively wide corners, as compared to relatively sharp turns, which may help accommodate transportation of large equipment and vehicles and may also help reduce erosion of the surrounding rock, such as the protrusion 200A, while the system 10E is in use.

Similar to the shaft 18, these features are based on the combined use of the liquid flow conduit 40 in the construction and use phases and may not be required in a conventional mining application.

When the liquid supply conduit 40 and water trap region have been excavated, excavation of the main air accumulators 12 can begin in some embodiments. Construction of the accumulators 12 can optionally take place at the same time as the construction of the access drift 712 and thermal storage chamber 615.

In the illustrated embodiment, the system 10E includes multiple parallel main accumulators 12, that are sloping upwards away from the liquid plenum 770 on a slight accumulator angle. An upper region of the main accumulators 12 are connected via the generally horizontal air plenum 774 which, in this embodiment runs generally perpendicular to the main accumulator length 768 and is connected to the air supply conduit 22. This air plenum 774 preferably connects at the high point of each accumulator 12. A lower region of the accumulators 12 are connected via the generally horizontal liquid plenum 770 which, in this embodiment runs substantially parallel to the air plenum 774 and is connected to the shaft 18 via the water trap/liquid supply conduit 40. This liquid plenum 770 preferably connects at a low point of each accumulator 12.

Optionally, the accumulators 12 may be constructed in the following order of operations: excavation of the liquid plenum 770, excavation of the main accumulators 12 (which optionally may be excavated at the same time to help reduce overall excavation time), and excavation of the air plenum 774, connecting the upper headspace of the accumulators 12.

In some embodiments the air plenum 774 may be excavated before completing the excavation of the accumulators 12.

Optionally, when excavating the perimeter of the accumulators 12 and the perimeter of the thermal storage cavern 615 techniques such as smooth blasting, tracer blasting, or presplitting may be used to leave the interior surfaces of each accumulator 12 relatively smooth, and smoother than would be typical for a mining operation. A relatively smooth interior surface may be advantageous as it may help improve the ease of shotcrete and liner installation within the accumulators 12 and may help reduce the risk of liner failure.

To maintain stability in the surrounding rock, the main accumulators 12 may have a cross-sectional width 762 and height 17 that are less than a maximum drift width and height for the given rock conditions. For example, for a relatively high stability rock the drift with and height may be around 20 m and 30 m respectively. For a medium stability rock, the drift with and height may be around 15 m and 20 m respectively. For a relatively low stability rock or rocks with lots of layering the drift width and height may be around 15 m and 15 m respectively.

Additionally, the distance 766 (FIG. 11) between the main accumulators 12 may be at least twice the width 764 of the accumulators 12 to help provide rock pillar of sufficient strength between adjacent accumulators 12.

In the illustrated embodiment, the system 10E is configured such that the thermal storage chamber 615 is located at an elevation that is above the partially drained water height 720. In this embodiment, the access drift 712 is as an offshoot of the shaft 18 at the desired depth of the thermal storage cavern 615. In this example, the access drift 712 will be level or inclined slightly toward the shaft 18 such that the water located in the access drift 712 during operation modes may be drained by gravity into the shaft 18 during partially drained/dewatered maintenance state.

The main purpose of the access drift in this embodiment is to help facilitate access to the thermal storage cavern 615 during the construction phase. However, the access drift 712 may also serve as an access manway and may be connected to the accumulators 12 as described herein, or to the gas plenum 774 to provide secondary access to the gas plenum 774 and the accumulators. This access manway is optional and may be included in systems where secondary egress is desired for accumulator 12 construction or inspection. The access man-way may include the third branch 712c of the access drift 712, which may be substantially vertical or angled downwardly from the first branch 712a toward the gas plenum 774. The third branch 712c may include a ladder, stairs or the like to help facilitate movement by a human.

The preferential embodiment of the system 10E may be configured so that the thermal storage cavern 615 and access drift 712 are located at above the partial dewatering water level by the offset distance 718 (see schematically in FIG. 7) such that the access drift 712 can be self draining during a partial dewatering event and so that an access manway in the third branch 712c may be installed if desired.

Figure 12:
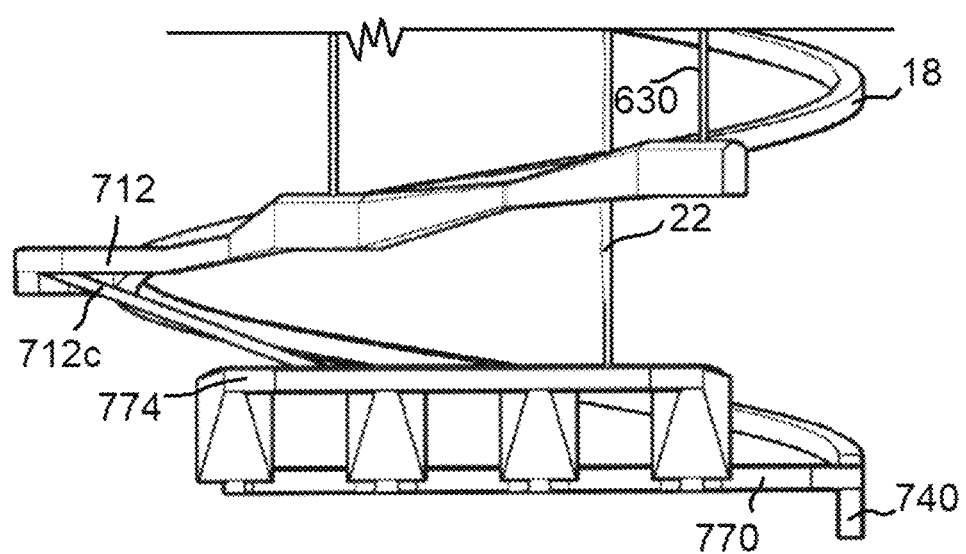
FIG. 12 is an enlarged view of a portion of FIG. 10.
Figure 13:
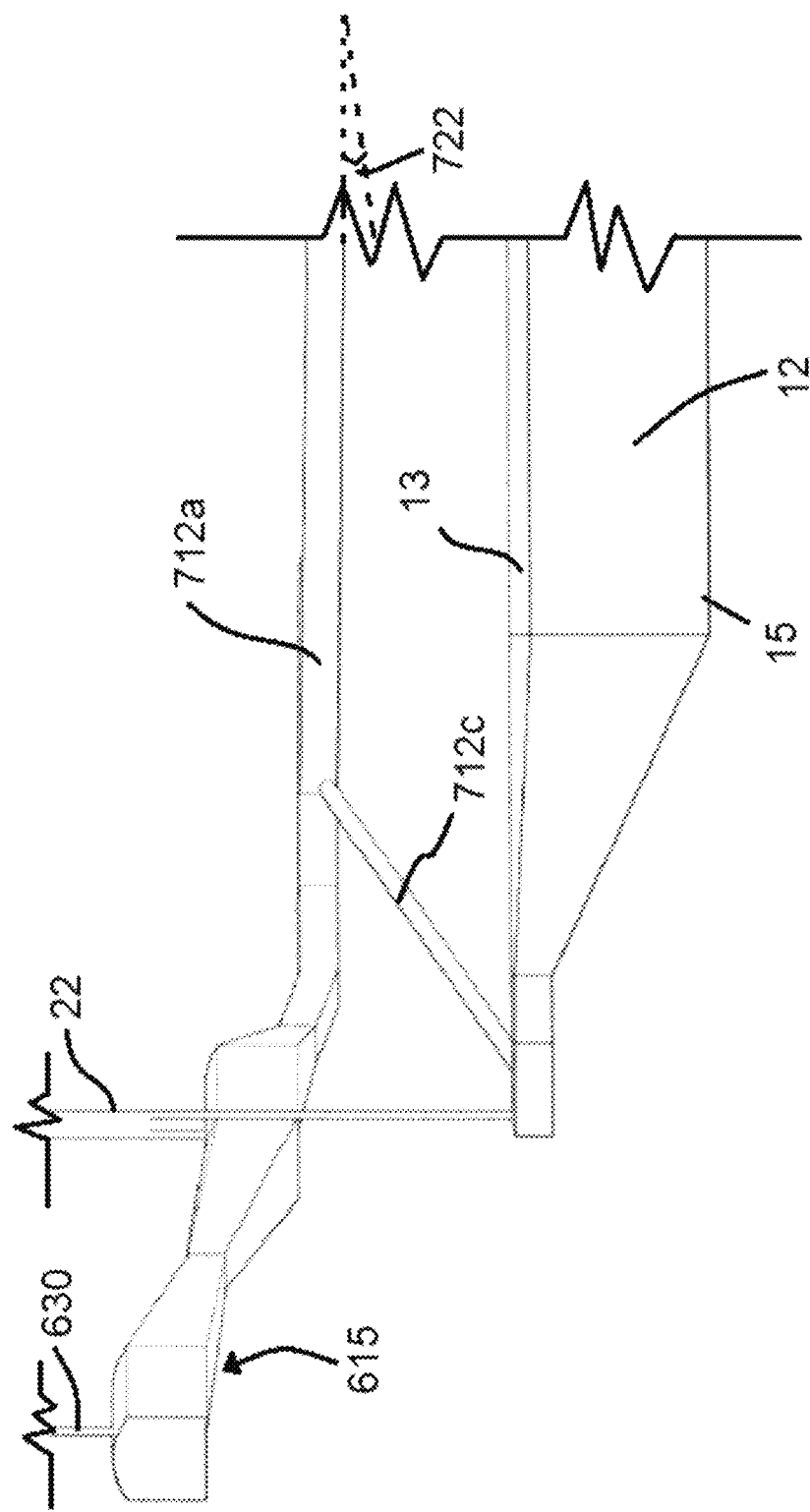
FIG. 13 is an enlarged view of a portion of FIG. 9.
Figure 14:
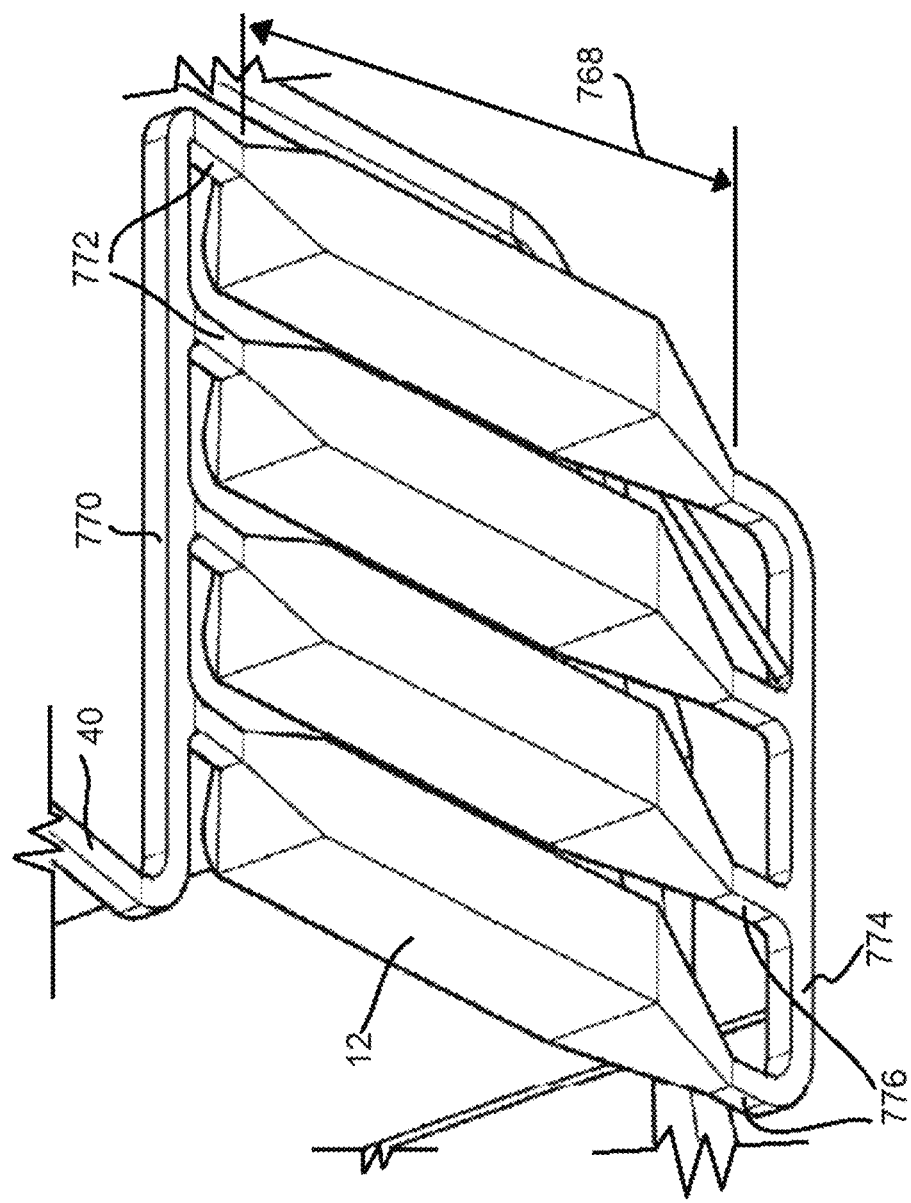
FIG. 14 is a bottom perspective view of a portion of the system of FIG. 9.

Referring also to FIGS. 12 and 13, the thermal storage chamber 615 in this embodiment may be constructed once the access drift 712 reaches the desired thermal storage chamber location. This construction can optionally occur at the same time as the construction of the accumulator.

The cross-sectional dimensions of the thermal storage chamber 615 may be generally greater than or equal to the access drift 712, but preferably will be less than or equal to those of the main accumulators 12 (FIG. 15).

Figure 17:
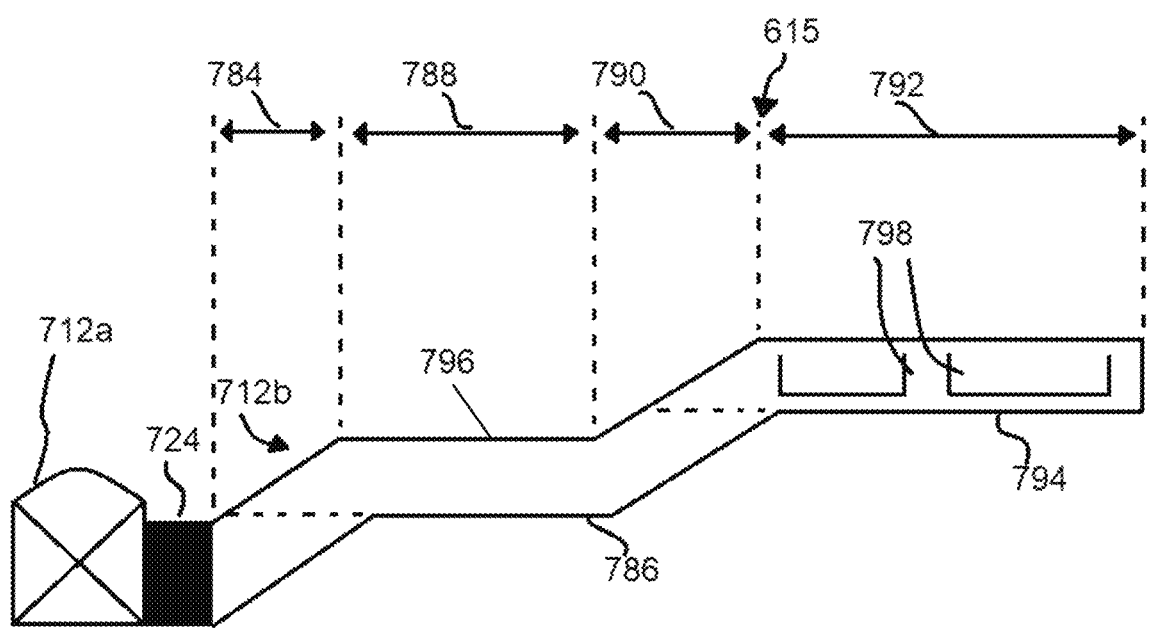
FIG. 17 is a schematic cross-sectional representation of a portion of the system of FIG. 9.

One example of a preferred geometry of the thermal cavern 615 is shown in FIG. 17 and is designed such that a liquid-liquid seal will be maintained across the barrier 724 while the system 10E is in operational modes. For example, to help ensure the liquid-liquid seal is maintained the second branch 712b of the access drift 712 which forms part of the interior of the thermal storage chamber 615 in this example, a first portion 784 can slope generally upwardly such that the bottom surface 786 of a second portion 788 of the thermal storage chamber 615 is at a higher than the top of the barrier 724. While this is the preferred geometry of the thermal storage chamber 615, other geometries are possible, including those where a liquid-liquid seal is not maintained across the barrier 724.

In this embodiment, cold thermal storage fluid may be stored in the portions 784, 788 and 790 and may be the fluid which maintains the liquid seal on the inside of the barrier 724. Section 788 of the thermal cavern need not be sloped, and it is preferential that section II be substantially horizontal with a minimal slope is towards the Section 784 such that there are no low points for water to collect in the thermal storage cavern 615. Section 790 however may be sloped like section 784 such that cold thermal fluid is generally contained in sections 784, 788 and 790 and can be inhibited from entering section 792. Section 790 may be sloped such that the bottom 794 of the portion 792 is at a higher elevation than the top 796 of section 788. Section 788 may be constructed to a sufficient length such that its internal volume is generally equal to or greater than the volume of cold thermal fluid which will be in the thermal cavern after a complete system discharge.

Relatively hot thermal storage fluid may be contained in vessels/tanks 798 provided in section 792 of the thermal storage cavern 615. It is preferred in this embodiment that section 792 be substantially level with a slight slope towards section 790 such that there are no low points for water to collect in the cavern. Section 798 may be constructed to a sufficient length such that the volumes of thermal vessels/tanks 798 required for this embodiment can be constructed inside the thermal storage cavern 615 with sufficient space to thermally insulate the vessels/tanks 798. Optionally, the barrier 724 may be thermally insulated to help reduce heat transfer between the liquid within the thermal storage caver 615 and the water in the shaft 18/access drift 712.

The sloped sections 784 and 790 of the thermal storage chambers 615 should be configured with a sufficiently low grade to allow the transportation of construction equipment in-and-out of the thermal storage chamber 6156 during construction and/or maintenance.

Like the accumulator 12, when excavating the perimeter of the thermal storage chamber 615 techniques such as smooth blasting, tracer blasting, or presplitting may be used to leave the accumulator face as smooth as possible after excavation. A smooth face may be advantageous as it may help improve the ease of shotcrete and liner installation and/or reduces the risk of liner failure.

Optionally, once the excavation of underground void space(s), such as accumulator 12 and chamber 615 have been completed, boreholes can be drilled to provide the desired connections between the sub-surface and surface infrastructure (such as compressor/expander subsystem 100).

For the accumulator 12 in this embodiment, there is only one process connection borehole which is required to be drilled which will become the air supply conduit 22 connection between the compressor/expander subsystem 100 and the gas plenum 774. This borehole will interface with the gas plenum 774 at some point along its roof or other suitable location. The air supply conduit 22 could also be configured to serve as the UAV deployment line for the introduction of unmanned aerial vehicles (UAVs) in to the system, for example during a charged maintenance state (described herein) and or during a partially drained maintenance state. At least one borehole may also be provided for cabling of sensors and other instruments utilized by the system 10E. Optionally, multiple boreholes may be used for sensor connections in different parts of the accumulator 12.

Optionally, two additional optional boreholes may be connected to the accumulators 12, which may be added to some embodiments of the system. For example, if the UAV deployment line is not integrated with the air supply conduit 22, then a separate borehole may be drilled specifically for use as the UAV deployment line. Additionally, depending on the pumping technique which will be used for fulling dewatering the system when in the completely drained maintenance state, a borehole may be drilled for pumping water out of the accumulators 12.

For the illustrated example of the thermal storage chamber 615 there may be 4 process connections provided for the conveyance of: hot thermal storage fluid, hot cover gas, cold thermal storage fluid, and cold cover gas. These process connections can be achieved by 4 separate boreholes (one for each line), or by 2 boreholes if, for example, the hot thermal fluid process connection is nested in the hot head gas process connection and the cold thermal fluid process connection is nested in the cold head gas process connection. Alternatively, 3 boreholes could be used if only one of the hot or cold process connections is 'nested'. Insulation may be used on a hot process connection which is not nested inside of another hot process connection. While any type of insulation which provides sufficient thermal resistance can be used, the current preference is for a pulled vacuum sleeve to be used as insulation. As with the accumulator 12 there may also be at least one borehole to be used for cabling of the sensors. Optionally, multiple boreholes may be used for sensor connections in different parts of the thermal cavern.

Any suitable method can be used to create the desired boreholes including, for example, raised bores, directional drilling, rotary drilling and/or percussion drilling.

Optionally, suitable sensors, such as piezometers and extensometers, pressure sensors and temperature sensors may be installed in the accumulator 12 and/or thermal storage cavern 615 to measure a variety of system parameters, including, for example, water level, pore pressure and rock deformation/movement, local pressure, and local temperature respectively. Such sensors may provide process feedback to the plant controller 118 and SCADA. Optionally, redundant sensors may be installed to enable the system 10E to remain in operation in the case of the first few sensor failures. Optionally, near surface monitoring may also be performed with micro-seismic sensors. These micro-seismic sensors may be installed at the surface, or in boreholes 5-100 m deep. As accumulator access is not required for the installation and maintenance of these sensors, they may be accessed or installed at any time.

In some embodiments, extensometers may be drilled into the rock surface of the accumulator or thermal cavern with specialized rock bolts, and it may be desirable to install such sensors before liner application, while other underground sensors may be installed after liner installation.

Optionally, once all of the infrastructure and sensors have been installed in the thermal storage chamber 615 the thermal barrier 724 may be constructed. It may be desirable to complete the work required within the thermal storage cavern 615 prior to construction of the barrier 724, as the thermal storage chamber 615 may or may not be constructed to have an openable accessway that can be accessed once the barrier 724 is in place.

Optionally, as mentioned herein, the systems 10 may be operated in a variety of different operating modes while in use, including a charging phase, a discharge phase and a storage/standby phase. The systems may also be configured in one, two, three or more different maintenance states, including a charged maintenance state, a discharged maintenance state, a partially drained/dewatered maintenance state and a completely or fully drained/dewatered maintenance state. In some embodiments, the systems may be in one of the operating modes/phases for a majority of the time, with relatively limited periods of maintenance.

In some embodiments, the systems may enter a charging phase/mode when a signal is received from the controller 118 to charge the air accumulator 12. This signal may be received due to actual or forecasted electricity market factors, due to a fixed operation schedule, due to the output of a renewable power source, due to a dispatch signal or any other suitable triggers. Once the signal to enter charging mode is received, the system may begin preparation for operation of the compressor/expander subsystem 100, including, for example, warming up the compressor and lube oil. Air can then be conveyed into the accumulator 12 from the compressor/expander subsystem 100.

Conveying air into the accumulator 12 may slightly increase the storage pressure inside the accumulator 12 and may in turn lower the level of the air water interface (the upper surface of the water layer 16) inside the accumulator 12.

Preferably, the system can be configured to only enter or remain in charging mode if the height 700 of the liquid layer 16 (FIG. 4) air water interface inside the cavern is above a predetermined minimum height (i.e. above the "charge plane").

The system may exit the charging mode when a signal is received from the controller 118 to stop charging the air accumulator 12. This may be due to the air accumulator 12 reaching full capacity, electricity market factors, a fixed operation schedule, a dispatch signal or the like.

Having been charged, the system may be held in a storage/standby mode for a period of time, for example until further charging or discharging is desired. The system may enter storage/standby by default, for example after exiting charging or discharging mode. When in the storage/standby mode, substantially no air or water is conveyed in or out of the accumulator 12, and thus the pressure and charge level of the system may remain substantially constant. The system may be in a storage/standby mode regardless of the level of charge of the system. The system may exit the storage/standby mode when the controller 118 signals the system to enter charging or discharging mode, or when the system is put into one of the maintenance states.

For example, when it is desirable to extract energy from the system, the system may enter a discharge mode. This may be initiated when a signal is received from the controller 18. This signal may be received based on an actual or forecasted electricity market factors, due to a fixed operation schedule, due to a dispatch signal, or any other suitable triggers. When the signal to enter discharging mode is received, the system may be beginning preparation for expander operation including warming up the expander and lube oil and synchronizing to the speed of the load. When the expander has warmed up, air can be conveyed from the accumulator 12 to the compressor/expander subsystem 100 and may be used to drive the expander and generator, sending electricity to the desired load (e.g. the grid). Conveying air out of the accumulator 12 may slightly decrease the storage pressure inside the accumulator 12 and in turn raise the level of the air water interface, i.e. increase the height 700, inside the accumulator 12.

We claim:

1. A hydrostatically compensated compressed air energy storage system comprising:
   a) an accumulator disposed underground and comprising a lower wall, an opposing upper wall and a sidewall extending therebetween cooperating to at least partially bound an accumulator interior for containing a layer of compressed air above a layer of compensation liquid;
   b) a compensation liquid reservoir spaced apart from the accumulator and in fluid communication with the layer of compensation liquid within the accumulator via a compensation liquid flow path comprising a compensation shaft whereby compensation liquid can flow between the accumulator and the compensation liquid reservoir when in use;
   c) an overcharge buffer apparatus disposed underground and in the compensation liquid flow path between a lower end of the compensation shaft and the accumulator interior to inhibit a flow of air from the layer of compressed air to the compensation shaft, the overcharge buffer apparatus comprising:
      i. a lower flow portion that is positioned below the lower wall of the accumulator by at least a buffer height, and
      ii. a transition portion extending upwardly from an overcharge plane between the lower flow portion and a charge plane which defines an interface between the transition portion and the accumulator interior and comprises a buffer portion extending upwardly from the overcharge plane by the buffer height;
   d) a gas compressor/expander subsystem in fluid communication with the accumulator interior via an air flow path; and
   e) a thermal storage subsystem comprising:
      i. at least a first storage reservoir configured to contain a thermal storage liquid at a storage pressure that is greater than atmospheric pressure,
         wherein the first thermal storage reservoir is disposed at least partially underground;
      ii. a thermal liquid passage having an inlet connectable to a thermal storage liquid source and configured to convey the thermal storage liquid to the storage reservoir; and
      iii. a first heat exchanger provided in the thermal liquid passage and in fluid communication between a first compression stage and the accumulator, whereby when the compressed gas energy storage system is in the charging mode thermal energy is transferred from a compressed gas stream exiting the gas compressor/expander subsystem to the thermal storage liquid;
   the system being operable in:
      a charging mode in which the gas compressor/expander subsystem coveys compressed air at a storage pressure into the layer of compressed air within the accumulator which displaces a corresponding amount of compensation liquid from the layer of compensation liquid out of the accumulator via the overcharge buffer apparatus thereby maintaining the layer of compressed air at substantially the storage pressure during the charging mode;

a discharging mode in which air from the layer of compressed air exits the accumulator and drives the gas compressor/expander subsystem and a corresponding amount of compensation liquid flows through the overcharge buffer apparatus and is re-introduced introduced into the layer of compensation liquid within the accumulator thereby maintaining the layer of compressed air at substantially the storage pressure during the discharging mode; and a storage mode in which there is no flow of the compressed air or compensation liquid and the layer of compressed air and the layer of compensation liquid are retained within the accumulator at substantially the storage pressure.

2. The system of claim 1, wherein the buffer height is between about 5 m and about 100 m.

3. The system of claim 1, wherein the compensation shaft extends between an upper end proximate the surface of the ground and the lower end and has a shaft height and wherein buffer height is between about 2% and about 25% of a shaft height.

4. The system of claim 1, wherein the system is chargeable to a fully charged state where the air-liquid interface of the accumulator is at the charge plane and in which at least 80% of the sidewall is exposed above the layer of compensation liquid and the buffer portion is filled with compensation liquid.

5. The system of claim 4, wherein when the system is in the fully charged state where the air-liquid interface of the accumulator is at the charge plane and 100% of the sidewall is exposed above the layer of compensation liquid and the accumulator interior is essentially free of compensation liquid and the buffer portion is filled with compensation liquid.

6. The system of claim 1, wherein the compensation liquid flow path comprises a water port provided in at least one of the lower wall and the sidewall of the accumulator.

7. The system of claim 6, wherein the water port is provided in the lower wall of the accumulator and extends generally perpendicular to the charge plane.

8. The system of claim 1, wherein the air flow path comprises an air port provided toward an upper portion of the accumulator.

9. The system of claim 8, wherein the air port is at a high point of the upper wall of the accumulator.

10. The system of claim 9, wherein the upper wall of the accumulator is generally inclined toward air port such that all the air within the accumulator is recoverable during discharging and cannot be trapped by a pocket bound by a portion of any of the accumulator walls and the compensation liquid.

11. The system of claim 1, wherein the system is configurable in at least three of:

e) a charged maintenance state, in which the accumulator interior is at the storage pressure, at least 80% of the sidewall is exposed above the layer of compensation liquid, the buffer portion is filled with the compensation liquid and a temporary maintenance apparatus, suitable for operation in air at the storage pressure, is insertable within the air-filled portion of the accumulator;

f) a discharged maintenance state, in which the accumulator interior is at the storage pressure, at least 80% of the sidewall is submerged within the layer of compensation liquid, the buffer portion is filled with the compensation liquid and a temporary maintenance apparatus, suitable for operation in the compensation liquid at the storage pressure, is insertable within the compensation liquid-filled portion of the accumulator;

g) a first dewatered maintenance state, in which the accumulator interior is at a service pressure that is less than the storage pressure, at least 80% of the sidewall is exposed above the layer of compensation liquid, the buffer portion is filled with the compensation liquid and a temporary maintenance apparatus suitable for operation in air at the service pressure, is insertable within the air-filled portion of the accumulator; and h) a second dewatered maintenance state, in which the accumulator interior is at a service pressure that is less than the storage pressure and is substantially free of the compensation liquid, and a temporary maintenance apparatus suitable for operation in air at the service pressure, is insertable within the air-filled portion of the accumulator.

* * * * *